| $SC_{14}$ | $SC_{15}$ | $SC_{16}$ | $SC_{17}$ | K15 | K16 | K17 | K18 | K19 |
|---|---|---|---|---|---|---|---|---|
| 0 | 0 | 0 | 0 | E | D | D | D | D |
| 0 | 0 | 0 | 1 | D | E | D | D | D |
| 0 | 0 | 1 | 0 | D | D | E | D | D |
| 0 | 0 | 1 | 1 | D | D | D | E | D |
| 0 | 1 | 0 | 0 | D | D | D | D | E |

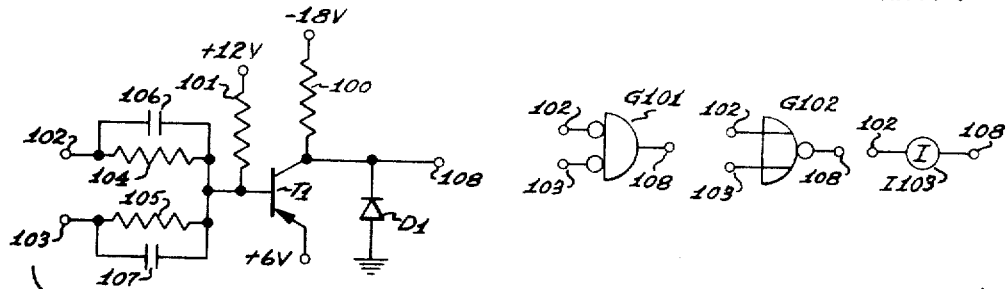
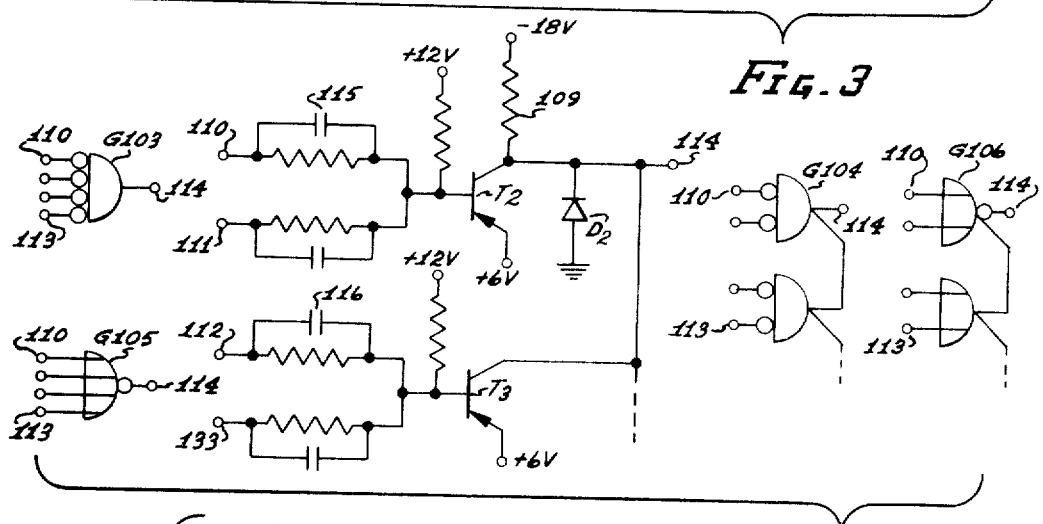
Fig. 3
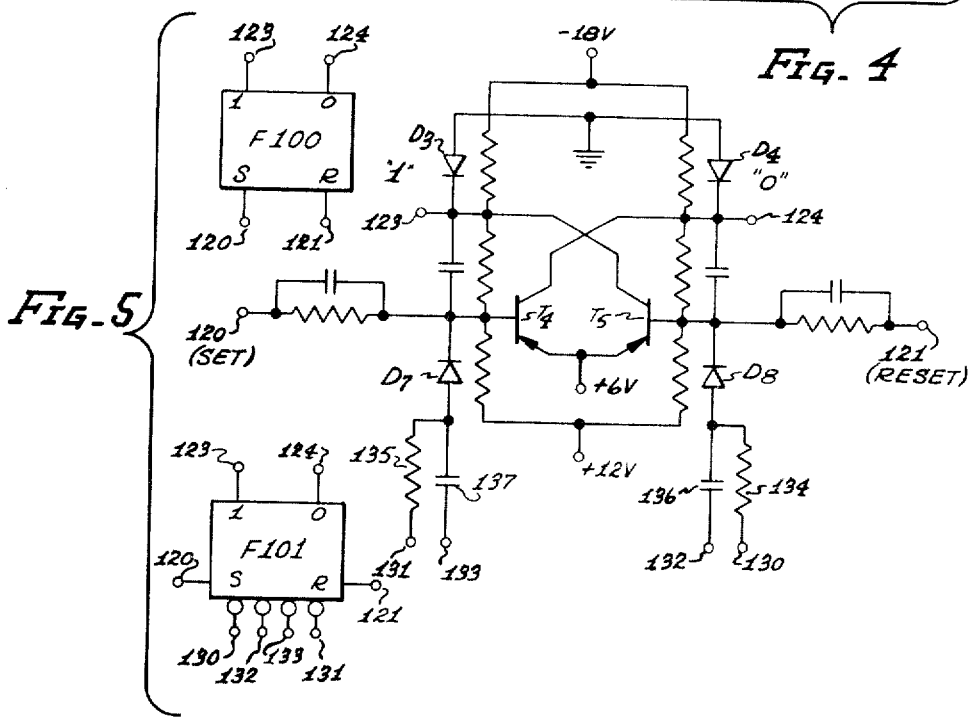
Fig. 4
Fig. 5

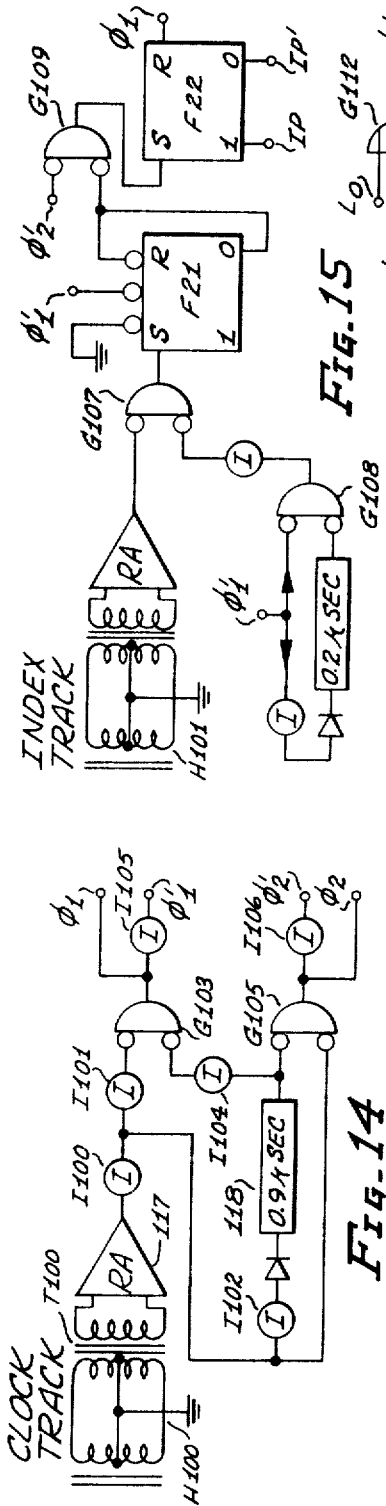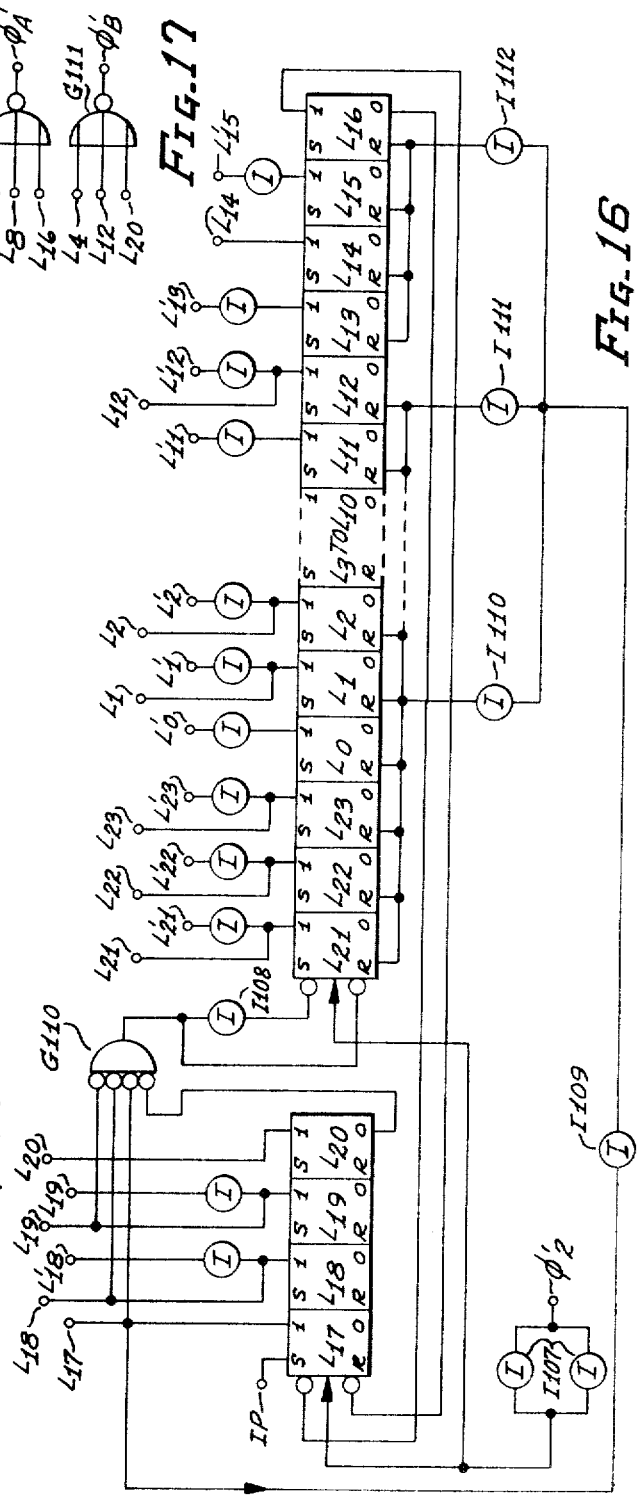

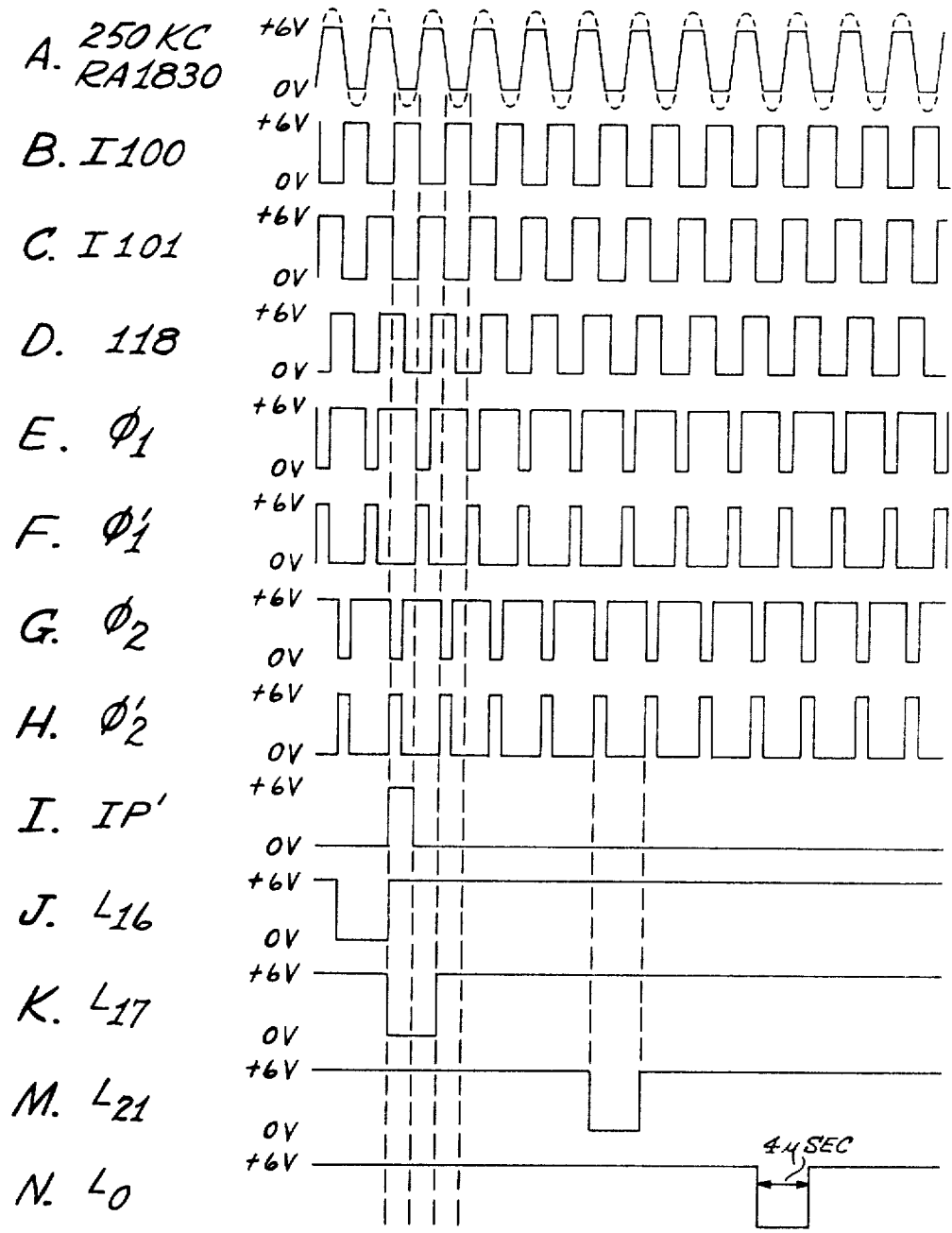
Fig_18

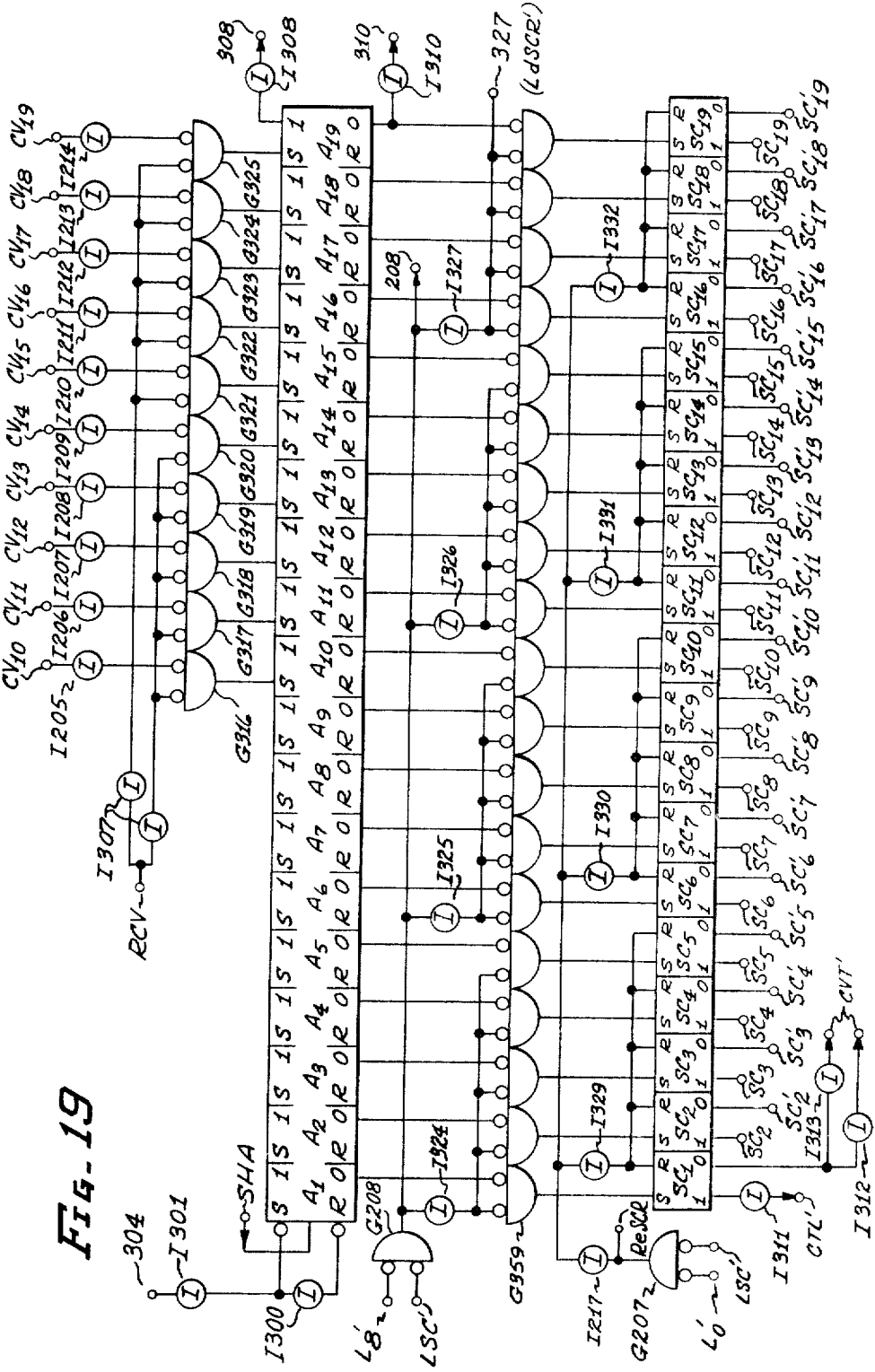

DISTRIBUTING
DIGITAL-TO-ANALOG
CONVERTERS

United States Patent Office 3,267,434
Patented August 16, 1966

3,267,434
INFORMATION HANDLING SYSTEM
Robert E. Clark, Wallace N. Patterson, and Theodore D. Thomas, Phoenix, Ariz., assignors to General Electric Company, a corporation of New York
Filed July 5, 1961, Ser. No. 121,975
16 Claims. (Cl. 340—172.5)

This invention relates to an electronic information handling system and more particularly to apparatus provided as a communication channel, between a digital computer and an industrial process being controlled, for selectively scanning transducers which produce voltage signals that are physical analogies of variables in the industrial process and for selectively distributing control signals to load or control devices.

For a completely automated industrial process, a computer may be provided to monitor the process, make all necessary decisions, and exercise direct control. An analog-type of computer may be most readily adapted to receive voltage signals that are physical analogies of variables in the industrial process and to distribute necessary control signals. However, analog computers are inordinately complex and expensive in applications requiring a variety of functions to be controlled with accuracy. A stored-program, general-purpose, digital computer provides not only accuracy but flexibility in controlling a large variety of functions in an industrial process. If the digital computer is provided with a communication channel for scanning transducers and distributing control signals as required, there is virtually no limit to the number of different functions which may be controlled automatically with the inherent speed and accuracy of a digital computer.

This control is exercized by a program of instructions stored in the memory section of the computer. Each instruction comprises a group of digital signals which cause some operation to be performed by the computer. The operation may be: A transfer of information in the form of a group of coded digital signals from one part of the computer to another; an arithmetic operation on groups of digital signals; a test for a specified condition to determine what the next instruction, or sequence of instructions, shall be; or the transfer of groups of digital signals between the memory section of the computer and input-output devices, such as a typewriter.

In order to control an industrial process, information must be gathered from a large number of transducers, which produce analog signals that reflect conditions of the process being controlled, and control signals must be distributed in analog form, to load or control devices, some of which may be predetermined constant voltage signals employed to switch devices on cr off. The digital computer is employed to calculate from the information gathered the signals required to control the process in a predetermined manner. In order for the computer to accept information for processing and to distribute control signals representing physical quantities, analog-to-digital and digital-to-analog converters must be provided to translate physical quantities represented by voltages into digital form and numerical quantities represented by groups of coded digital signals into voltage signals which may be employed to product corresponding physical changes in load or control devices, such as rotation of a shaft or adjustment of a valve opening.

A particularly significant problem is presented in gathering information in that analog input signals to be converted into digital information often require transformation in magnitude relative to some scale so that every input signal is converted to the same predetermined engineering scale. A separate analog-to-digital converter could be provided for each analog signal input, but that would often be too expensive for the reason that analog-to-digital converters are generally complex and expensive to build. It is more economical to provide a flexible system for gathering information through a common electronic information translating apparatus under programmed computer control and to employ that system for distributing control signals.

The principal object of the invention is to provide for the control of a plurality of analog input and output functions by a digital computer through the utilization of a common communication channel which functions independently of the digital computer once its operation is initiated by an instruction from the digital computer.

Another object is to provide an electronic information handling system for selectively scanning electrical transducers monitoring the physical condition of a number of variable devices.

Still another object is to provide an electronic information handling system for selectively scanning the analog condition of a number of variables manifested by analog signals having amplitudes which may vary within different distinct fullscale ranges and for transforming each analog signal into some relative magnitude by amplifying it to some predetermined full scale before converting it into a digital form for transfer to a digital computer.

Another object of the invention is to provide a means for coupling a selected one of a plurality of voltage sources to a specified one of a plurality of load or control devices under the programmed control of a digital computer.

A further object is to provide programmed time delays in a means for coupling a selected one of a plurality of voltage sources to a specified one of a plurality of load or control devices to maintain the coupling for a specified interval.

Still another object of the invention is to provide a means for transferring a value in digital form as a control signal from a digital computer to a specified one of a plurality of load or control devices, the value being converted to an analog form as part of the transfer operation.

These and other objects of the invention may be realized by a system which, in its broadest aspect, provides for the control of a plurality of analog input and output functions under the control of a digital computer and through the utilization of a novel communication channel wihch functions independently of the digital computer once its operation is initiated by an instruction transferred thereto from the digital computer. The instruction may be of either one of two basic types which may be distinguished in the communication channel by a binary digit in a particular position in the instruction. Once an instruction has been transferred from the digital computer to the communication channel, an operation conforming to one of two basic modes of operation is initiated and completed automatically so that the digital computer is free for other operations. The instruction includes an address portion which specifies the source of an analog signal for an input function and the destination of an analog or control signal for an output function. A randomly addressable relay-selecting matrix is provided to selectively couple a specified analog signal input source or output device to the communication channel. If the operation specified by the instruction is to scan a specified analog signal source, when the relay matrix connects the communication channel to the source, the analog signal therefrom is amplified in order to transform its magnitude relative to a predetermined full scale which may be specified by the instruction. In addition, the analog signal is reversed in polarity if specified by the instruction so that the absolute magnitude of the scaled analog signal may be converted into digital form. After the analog-to-digital conversion is complete, the communication channel signals to the digital computer that the digital value of the analog signal may be transferred to the computer for processing under programmed control. The portion of the instruction employed to specify the scaling function is employed for another purpose if the instruction transferred to the communication channel is of a second type requiring the distribution of a control signal to a load or control device. The control signal to be distributed may be either a voltage from one of a plurality of sources or an analog signal. If the latter, it is provided by the computer in digital form and a digital-to-analog converter having its own memory device for storing a group of digital signals transferred thereto is provided for each load device to convert it to an analog form. If an instruction of the second type to be executed requires that a predetermined voltage be applied to a specified load or control device for a given interval, the portion of the instruction employed to specify a scaling function of an instruction of the first type is employed to selectively connect a source of the voltage specified to the device through the relay matrix and to initiate the operation of a delay counter for measuring the interval during which the voltage source is to be connected to the device.

Although features of the invention to be protected are pointed out in the appended claims, an illustrative embodiment of the invention is described by reference to the drawings in which:

FIG. 3 illustrates a diagram of a basic functional circuit employed for the logical AND, OR and inverting functions and symbols employed to represent the circuit;

FIG. 4 illustrates a circuit diagram of a multi-input gate which may be employed for both AND and OR functions and the symbols employed to represent a multi-input gate;

FIG. 5 illustrates a circuit diagram of a flip-flop which may be employed as either a simple flip-flop or a steered flip-flop and the symbols employed to represent the two types of flip-flops;

FIG. 14 illustrates a logic diagram of a circuit employed to derive clock pulses $\phi_1$ and $\phi_2$ from a clock track in a computer having a magnetic drum memory;

FIG. 15 illustrates a logic diagram of circuits employed to derive an index pulse for the memory section of a magnetic drum computer;

FIG. 16 illustrates a logic diagram of circuits employed to generate timing pulses $L_0$ to $L_{23}$;

FIG. 17 illustrates a logic diagram of circuits employed to derive clock pulses $\phi A$ and $\phi B$;

FIG. 18 is a timing diagram illustrating the time relationship between the various synchronizing pulses;

FIG. 19 illustrates a logic diagram of an SC-register and the manner in which it is loaded from an A-register;

Figure 26:
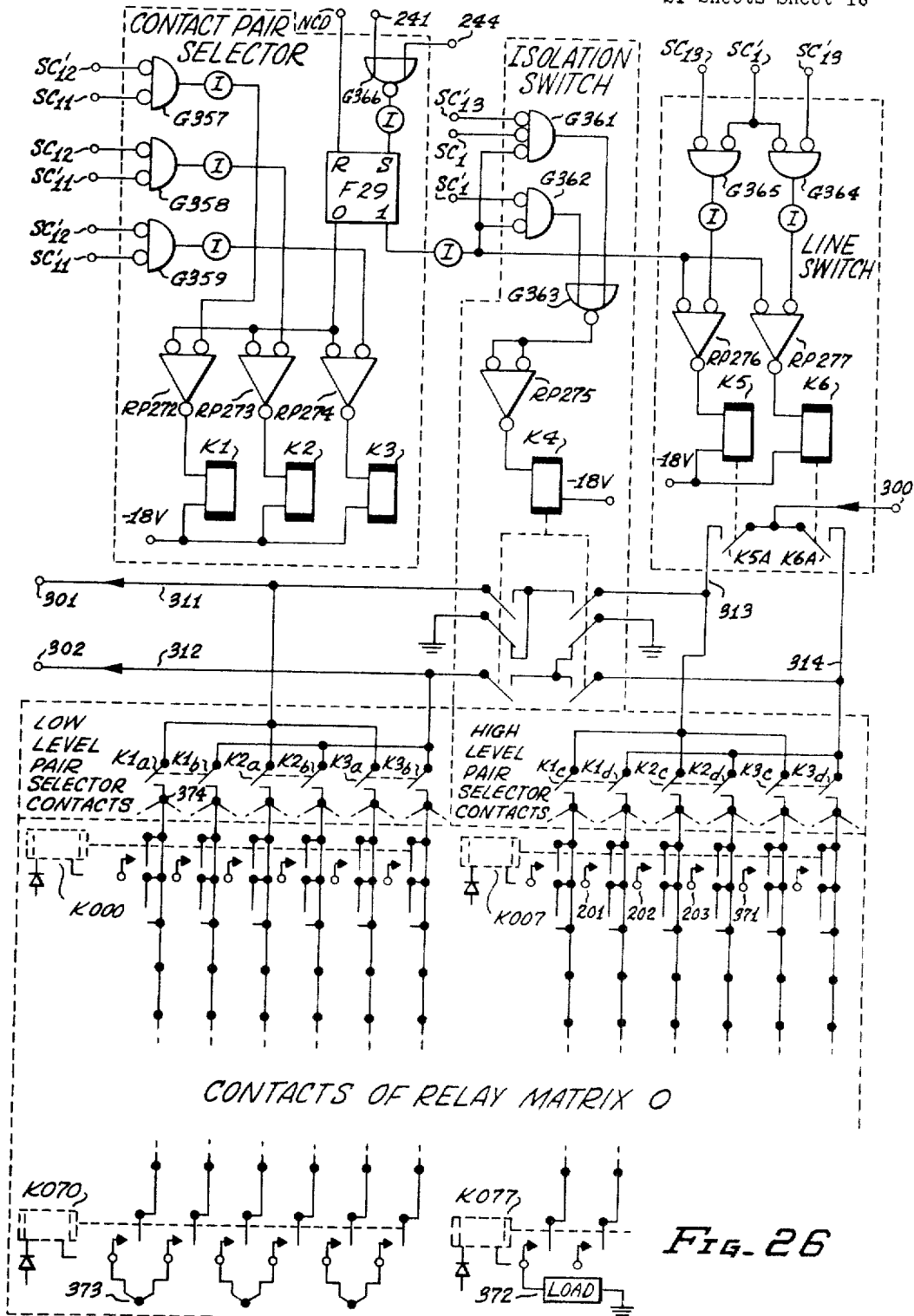
Figures 27, 28:
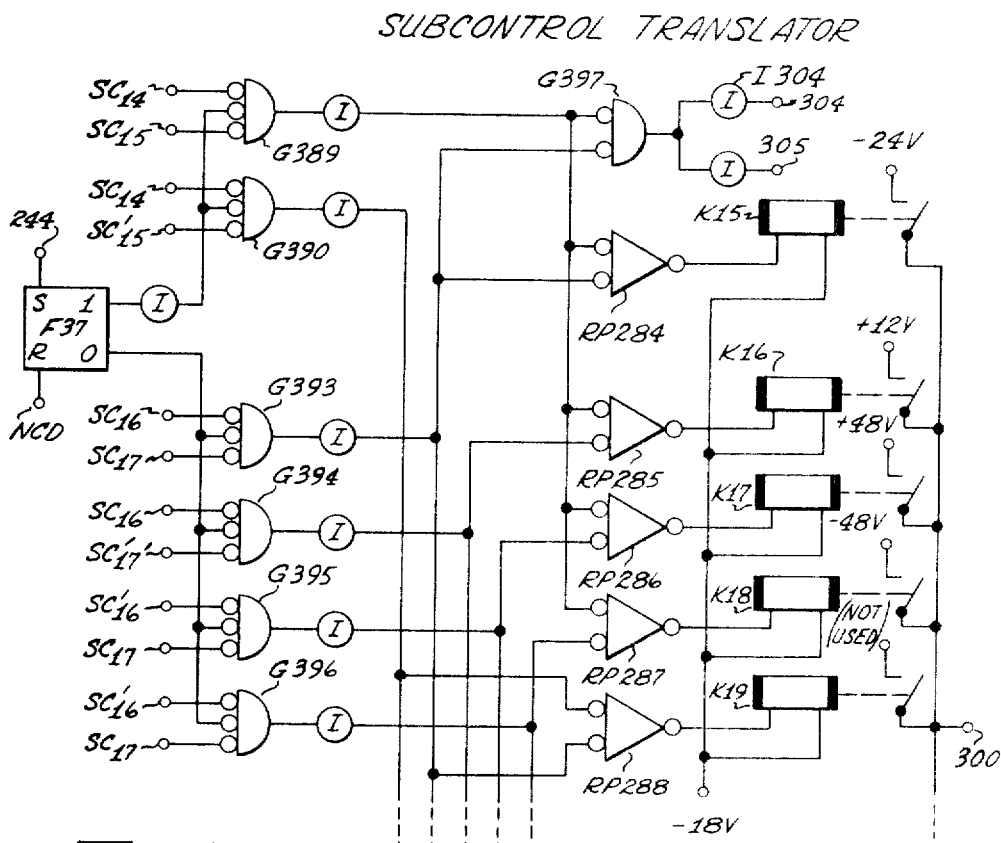
Figure 29:
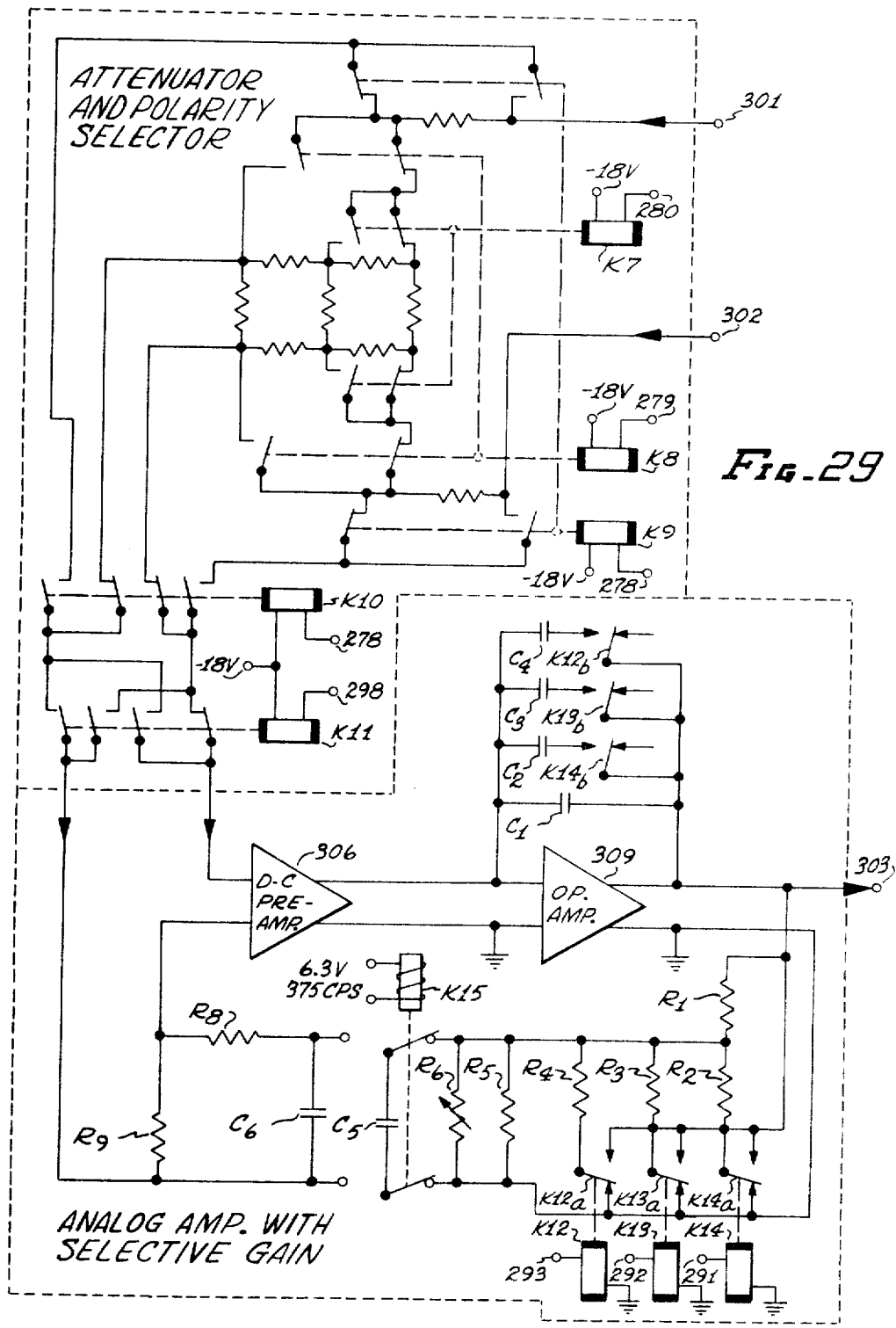
Figures 30, 31, 32:
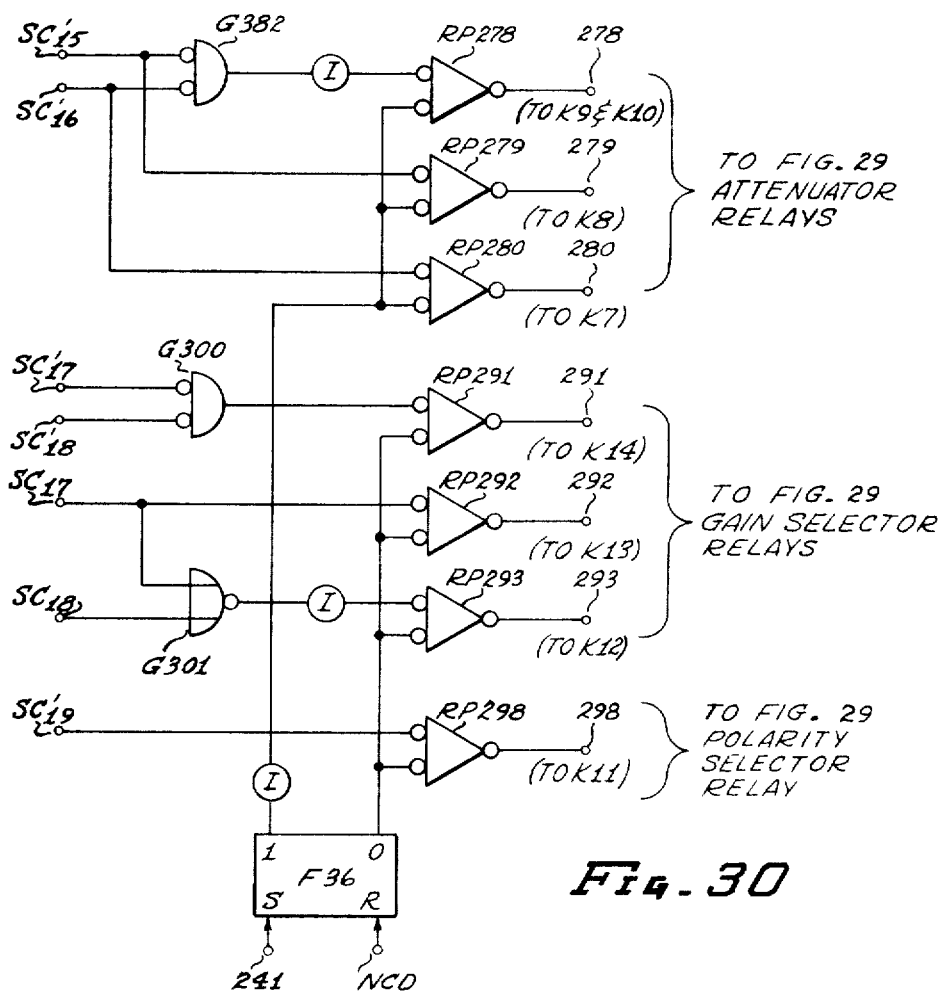
Figure 33:
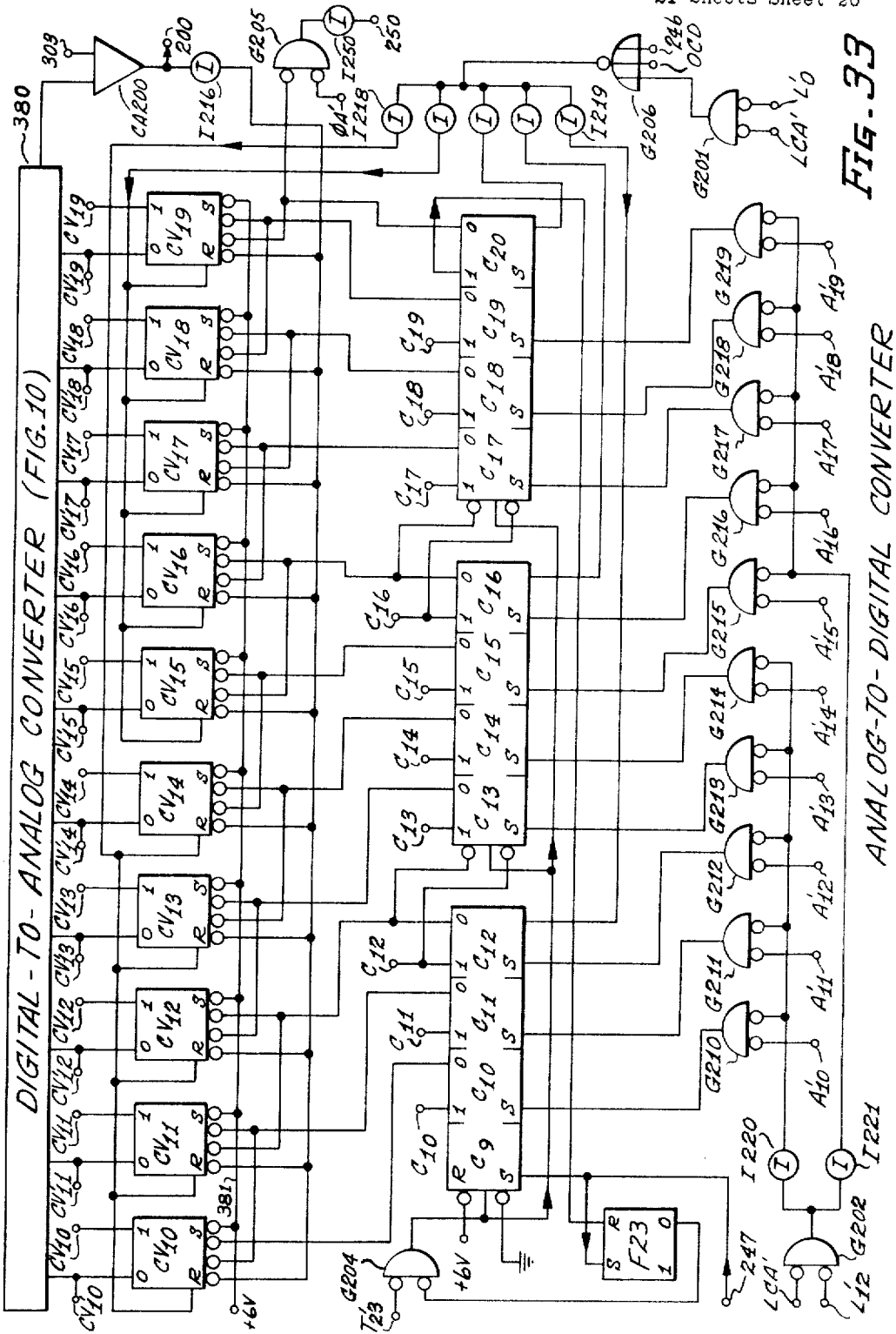

FIG. 26 illustrats a logic diagram of a contact-pair-selector section, an isolation switch, a line switch, and low- and high-level signal pairs of relay contacts;

FIG. 27 illustrates a logic diagram of a sub-control translator;

FIG. 28 illustrates a decoding table for the sub-control translator;

FIG. 29 is a schematic diagram of an analog amplifier with selective gain and of an attenuator and polarity selector;

FIG. 30 is a logic diagram of circuits for selecting attenuation, gain and polarity for the circuit schematically illustrated in FIG. 29;

FIG. 31 illustrates a decoding table for the selective energization of gain-selecting relays in FIG. 29;

FIG. 32 is a decoding table for selectively energizing attenuator relays illustrated in FIG. 29;

FIG. 33 is a logic diagram of an analog-to-digital converter; and

Figure 34:
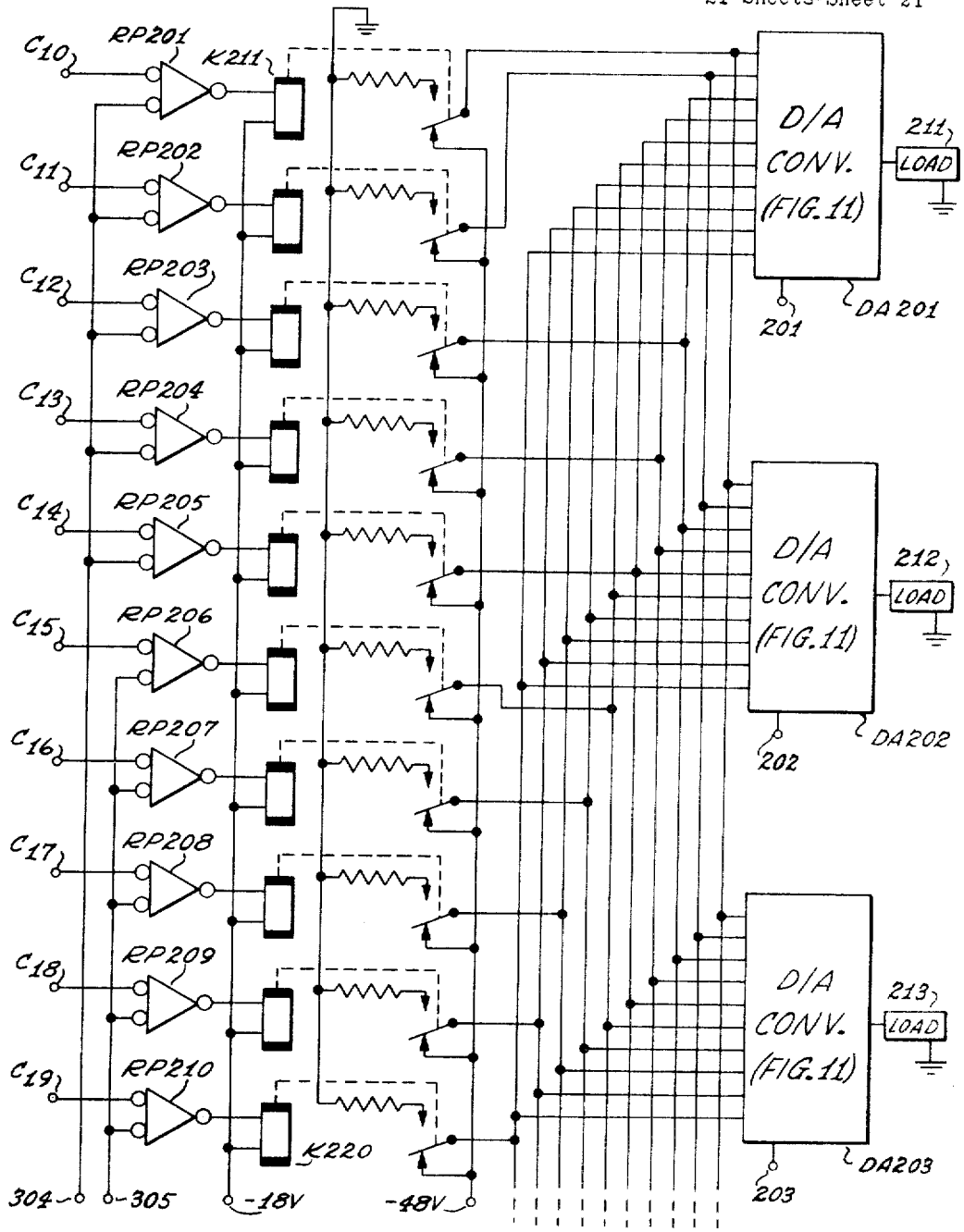

FIG. 34 is a logic diagram of a circuit for distributing a group of digital signals to a selected one of a plurality of digital-to-analog converters.

GENERAL DESCRIPTION

Figure 1:
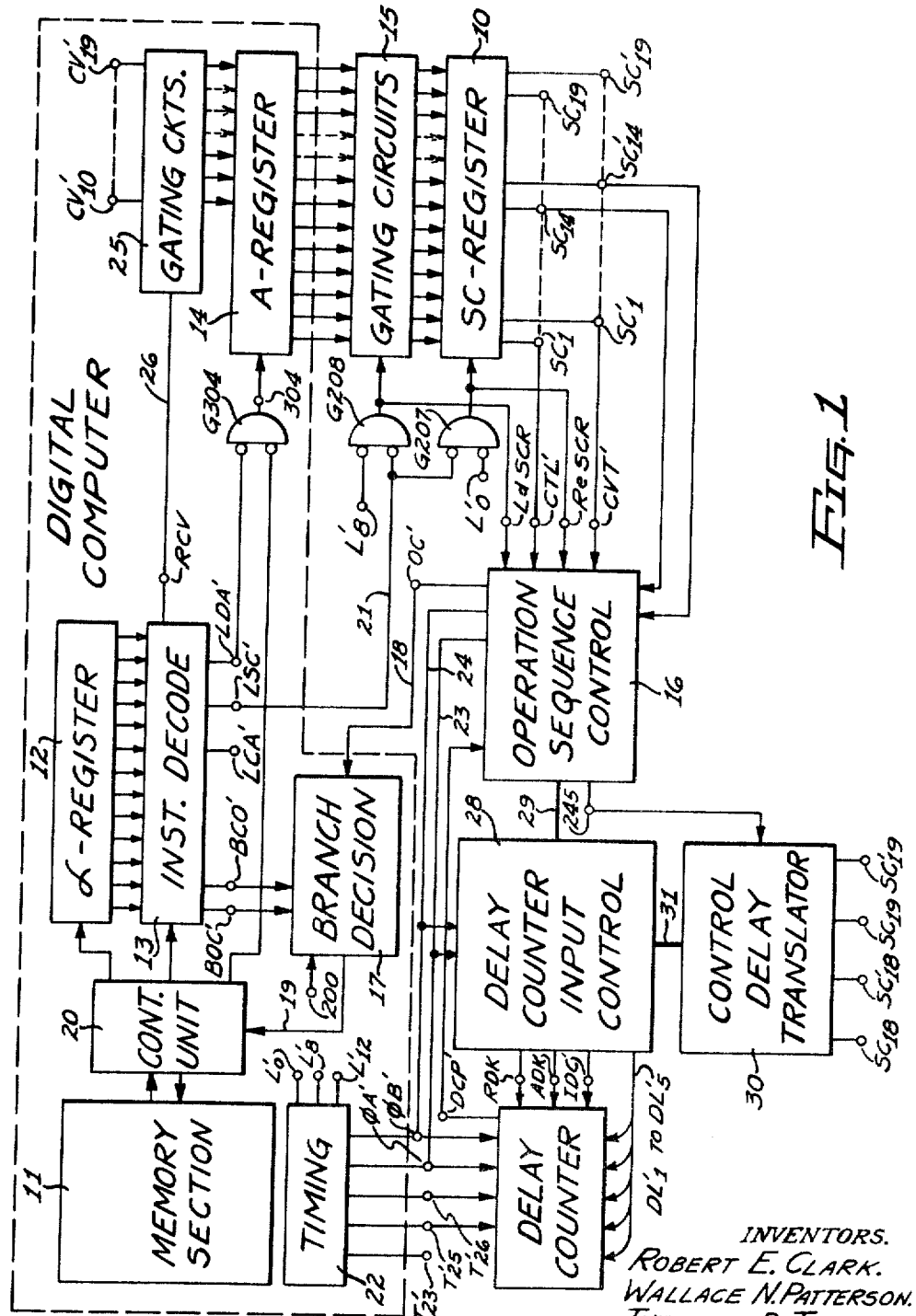
FIG. 1 is a block diagram of a portion of the invention illustrating the manner in which a digital computer communicates with and controls an analog input-output communication channel for gathering and distributing analog signals.
Figure 2:
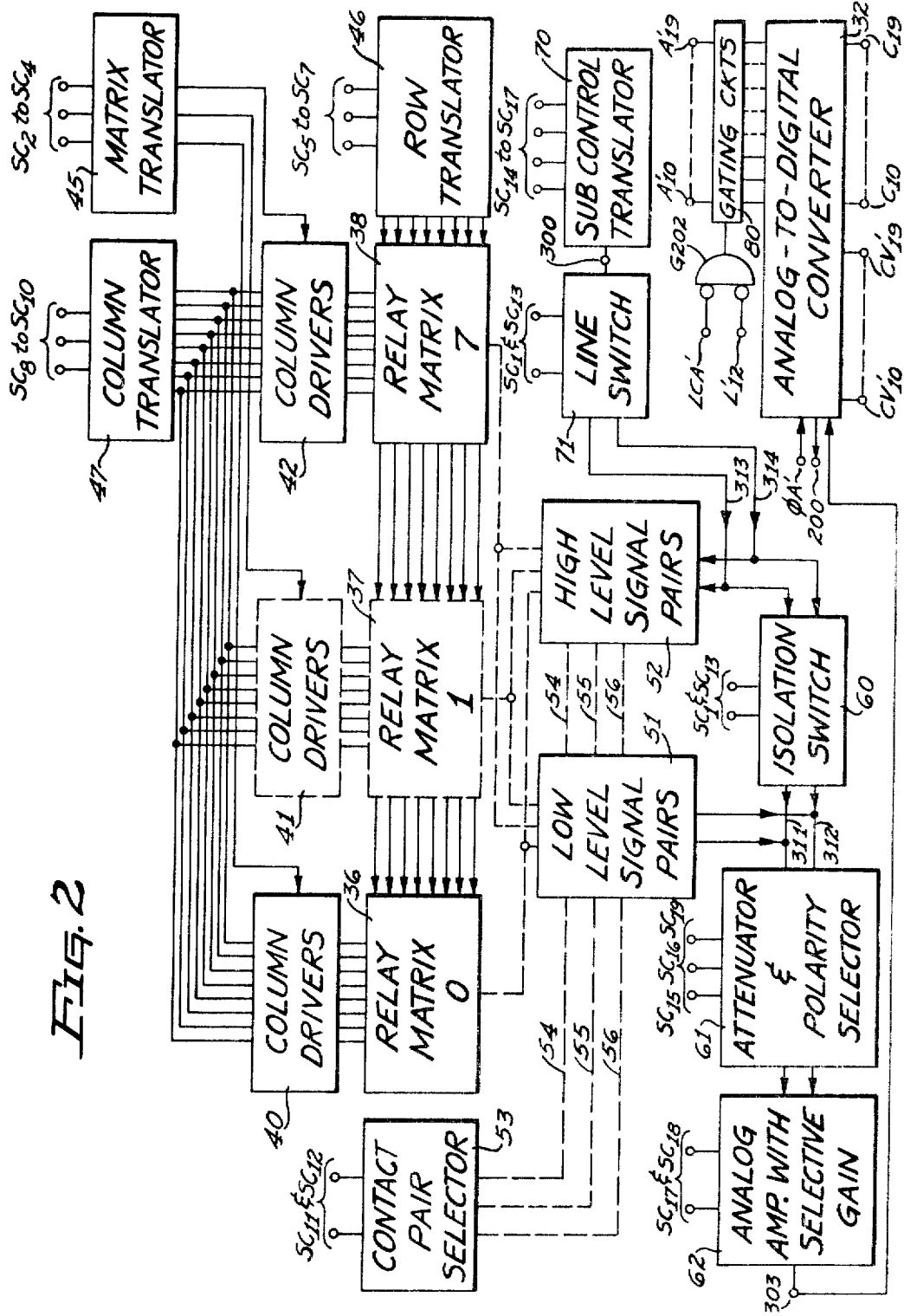
FIG. 2 is a block diagram of the remaining portion of the invention illustrating the manner in which a common communication channel may be employed to gather and distribute analog signals.

The communication channel for selectively gathering information and distributing control signals in order that a digital computer may control an industrial process is illustrated in a block diagram in FIGS. 1 and 2. It includes control circuits which enable it to function as a special purpose information-handling apparatus having an SC-register 10 as its own instruction register. As noted hereinbefore, it is capable of executing two types of instructions, each of which may have several variations.

One general type of instructions is employed to selectively scan a variable analog signal source and transfer its value to the digital computer in digital form. The other type of instructions is employed to distribute control signals to control or load devices. The control signal may be a voltage from a source or an analog signal derived from a group of digital signals. In view of the two general classes of operations which are to be performed, the communications channel is referred to hereinafter as a scanner-distributor.

The instructions for the scanner-distributor originate in a memory section 11 of the computer and are transferred to the SC-register in response to a group of digital signals in an instruction register 12 referred to hereinafter as the α-register. The group of digital signals constitute an instruction which is decoded by a decoder 13 to provide an LSC' command signal to cause the SC-register to be loaded from an A-register 14 through gating circuits 15. Once an instruction has been transferred into the SC-register from the A-register, the scanner-distributor proceeds to operate independently of the computer.

An operation sequence control section 16 sequences the steps required to interpret and execute the instruction in the SC-register by providing appropriately timed signals to circuits throughout the scanner-distributor. When the operation specified by the instruction has been completed, an OC' signal indicating that the operation is complete is transmitted over a line 18 to a branch decision section 17 in the computer which is programmed to test for the presence of an OC' signal. To accomplish that, an instruction to branch if an operation in the scanner-distributor is complete is transferred from the memory section to the α-register.

The instruction decoder 13 transmits a BOC' signal in response to such a branch instruction to cause the branch decision section 17 to make a test for the presence of an OC' signal. If an OC' signal is present, a control signal is transmitted over a line 19 to a control unit 20 to cause the computer to branch to some other sequence of instructions as required by the program being executed which is determined by the application of the computer controlled industrial process. Thereafter, a new instruction for the scanner-distributor may be transferred to the SC-register.

To transfer an instruction to the SC-register, an instruction to load the A-register from a memory location is first transferred into the α-register from some other memory location. Upon being executed, the instruction to load the A-register causes a serial transfer of the instruction for the SC-register from a specified memory location to the A-register via an AND-gate G304 and the control unit 20 in response to an LDA' command signal. After that instruction has been serially transferred into the A-register, an instruction to load the SC-register is transferred into the α-register and executed. When the instruction to load the SC-register is decoded, an LSC' command signal is transmitted over a line 21 to enable a pair of AND-gates G207 and G208. The enabled AND-gate G207 transmits an $L_0'$ timing pulse to the SC-register to reset it before the enabled AND-gate G208 transmits an $L_8'$ timing pulse to the gating circuits 15 which in turn enables the instruction to be transferred from the A-register to the SC-register in parallel. Both of the timing pulses $L_0'$ and $L_8'$ are generated by a timing section 22 of the computer.

The manner in which an instruction is transferred into the SC-register to be executed may best be understood by an example of the execution of an instruction to scan a variable analog signal source, such as a strain gauge or thermocouple. That instruction is referred to hereinafter by the mnemonic code CVT for convenience since an important part of its operation is to convert an analog signal to a digital form. That mnemonic code is also employed to identify the command signal CVT' of the instruction and the terminals to which it is applied throughout the scanner-distributor. Other instructions and command signals are similarly associated, such as the command signals LDA', LSC' and BOC' referred to hereinbefore which are associated with the respective instructions LDA to load the A-register from a memory location, LSC to load the SC-register from the A-register and BOC to branch when the operation is complete in the scanner-distributor. An LDA instruction is first transferred into the α-register and executed by the computer in order to transfer the CVT instruction from a memory location to the A-register. Following that, an LSC instruction is transferred into the α-register and executed by the computer in order to transfer the CVT instruction from the A-register into the SC-register. Once the LSC instruction has been executed, the computer is free to perform other operations while the CVT instruction is being executed by the scanner-distributor.

When the LSC' command signal enables the AND-gates G207 and G208, $L_0'$ and $L_8'$ pulses are translated by the respective AND-gates to reset the SC-register and then load it from the A-register. An output signal ReSCR from the AND-gate G207 also resets the operation sequence control section 16 and an output signal LdSCR from the AND-gate G208 also resets an OC flip-flop in the operation sequence control section 16. Synchronizing pulses $\phi A'$ and $\phi B'$ transmitted over lines 23 and 24 from the timing section 22 are employed to advance the operation sequence control section through the steps required to execute the CVT instruction. When the operation specified by the CVT instruction has been completed, the OC flip-flop in the operation sequence control section is set and an operation complete signal OC' is transmitted over the line 18 to the branch decision section 17. Thereafter, a BOC instruction may be executed to introduce another sequence of LDA and LSC instructions in order to transfer another instruction to the scanner-distributor for execution.

After execution of a CVT instruction has been completed, the digital signals which represent the variable scanned are stored in the analog-to-digital converter 32 (FIG. 2) until another CVT instruction is executed or until one sort of the other type of instructions used for controlling a load or control device is executed. An instruction of the other type is referred to hereinafter by the mnemonic code CTL. Only that sort of CTL instructions employed to provide analog signals to control or load devices from groups of digital signals transferred to the scanner-distributor from the computer, as described hereinafter, interfere with the storage of a group of digital signals in the analog-to-digital converter.

Before executing another LDA and LSC sequence of instructions for the purpose of transferring a CVT or CTL instruction which interferes with the result of the last CVT instruction executed, the result should be tansferred into the computer by an instruction to read into the A-register the result manifested as a group of digital signals $CV_{10}'$ to $CV_{19}'$ present at input terminals of a gating circuit 25 which are identified by the reference characters $CV_{10}'$ to $CV_{19}'$ and which are connected to corresponding output terminals of the analog-to-digital converter 32 (FIG. 2). To accomplish that, an RCV instruction is transferred from the memory section to the α-register under stored-program control. When the instruction is decoded, an RCV command signal is transmitted over a line 26 to enable the gating circuits 25 to transfer the group of digital signals $CV_{10}'$ to $CV_{19}'$ into the A-register. Then the content of the A-register is stored in a memory location or some other computer register under stored-program control so that it may be available for processing after another instruction is transferred into the SC-register via the A-register.

The digital computer may be any stored-program, general-purpose-type computer having an instruction register and at least one working register. Such a computer is described in a United State patent application Serial No. 70,549 filed Nov. 21, 1960, by Charles H. Propster, Jr., and assigned to the same assignee as the present invention. That computer employs a rotating magnetic drum in the memory section; consequently, in the detailed description which follows hereinafter it will be assumed that the memory section 11 includes a magnetc drum and that the timing section 22 employs clock pulses recorded thereon as the basic source of timing signals. However, the computer employed may utilize other forms of memory devices, such as magnetic core memories, and all timing signals empolyed in connection with the independent operation of the scanner-distributor may be from an independent source not synchronized with the digital computer. Only the $L_0'$ and the $L_8'$ pulses employed to enable the AND-gates G207 and G208 require synchronization with the timing of the digital computer besides an $L_{12}'$ pulse applied to an AND-gate G202 in FIG. 2 which must be synchronized with the timing of the digital computer in order to transfer a group of digital signals from the ten most significant stages $A_{10}$ to $A_{19}$ of the A-register to the analog-to-digital converter 32 through gating circuits 80.

The execution of the different instructions may require different time intervals between the various steps required to complete specified operations. A delay counter 27 in FIG. 1 is provided to measure the different time-delay intervals required. When a given delay interval is complete, a delay-complete signal DCP' is transmitted from the delay counter 27 to the operation sequence control section 16 to enable it to advance operation of the scanner-distributor to the next step in sequence. Control signals for the delay counter are provided by a control section 28 which is controlled by appropriate signals from the sequence control section 16 transmitted over separate lines in a cable 29. The provision of some delay intervals, and the duration of each, is determined largely by the industrial installation in which the scanner-distributor is employed. Other delay intervals are required in the present embodiment of the invention due to the extensive utilization of relatively slow relay switches. The delay counter 27 consists of a binary counter which counts timing pulses $T_{25}'$ to $T_{26}'$ from the timing section 22, depending upon the interval being provided at the time, the difference between the timing signals being their frequency and therefore their time increments.

Instructions to distribute a selected voltage signal to a specified control device are executed by selectively coupling one of a plurality sources to one of a plurality of control devices. Such an instruction also includes a definition of the control-delay interval during which that coupling is to be maintained for control of the specified device. That definition of a control-delay interval is provided by the configuration of the digital signals in positions 18 and 19 of the instruction word stored in the SC-register.

Each instruction transferred to the SC-register consists of a group of nineteen digital signals stored in stages of the SC-register numbered from left to right so that the digital signal in the least significant position on the right is stored in the $SC_{19}$ stage. Two output terminals from each stage provide the requisite input signals for a control-delay translator 30. For example, the least significant position has two output terminals $SC_{19}$ and $SC_{19}'$. As is described more fully hereinafter, the terminal designated by reference characters followed by an apostrophe, such as the terminal $SC_{19}'$, are associated with the false output terminal of the flip-flop to which it is connected and which is to be designated by the same reference characters. The other terminal designated by the reference characters without an apostrophe is to be associated with the true output terminal of the same flip-flop.

An output terminal 245 of the sequence control section 16 is connected to the control-delay translator 30 to initiate translation of the control-delay interval specified by the instruction in the SC-register at the appropriate time during the execution of a CTL instruction. A group of lines in a cable 31 transmit the translated signals required to effect the specified delay from the control delay translator 30 to the delay counter input control 28. Output terminals RDK, ADK', IDC' and a group of output terminals $DL_1'$ to $DL_5'$ of the delay counter input control section 28 are provided to control the delay counter 27 and to determine when the delay interval specified has elapsed in a manner described hereinafter in more detail.

An analog signal source and a control or load device is selected by the address portion of a CVT and a CTL instruction, respectively, through a random access relay-selecting system comprising a plurality of relay matrices. Three of the eight relay matrices which may be provided in the present embodiment are illustrated as relay matrices 36, 37 and 38 in FIG. 2. Bit positions $SC_2$ to $SC_4$ of an instruction are employed to select one of the relay matrices provided by enabling a selected one of a plurality of column driver sections 40, 41 and 42. A matrix translator 45 decodes the bit configuration of bit positions $SC_2$ to $SC_4$ to enable only the specified column drivers associated with the specified one of the relay matrices.

The relays in a given matrix are arranged in rows and columns so that to address a specified relay in a given matrix, the row and column of the relay are selected and energized with appropriate voltage signals through electrical conductors with define the row and column of the matrix, the specified relay coil having one terminal connected to one electrical conductor and the other terminal connected to the other electrical conductor. The electrical conductors which define the rows of all of the matrices are selectively energized by a row translator 46 which decodes the digital configuration of positions $SC_5$ to $SC_7$ of the instruction. The digital configuration of bit positions $SC_8$ to $SC_{10}$ which specify the column of the selected matrix to be selectively energized is decoded by a column translator 47. All of the column driver sections 40 to 42 associated with the respective relay matrices 36 to 38 are connected to parallel to the column translator 47. However, only the specified columnar electrical conductor in the relay matrix selected by the matrix translator 45 is energized since the matrix translator selectively enables only one of the column driver sections 40 to 42. Since only three binary digits are employed to specify a row and three binary digits to specify a column, each relay matrix may have a maximum of sixty-four relays. The voltage signals selectively applied to the conductors which define the row and column of a relay to be selected are of sufficient voltage and relative polarity to enable the relay to be energized only when both are present.

Each relay has six transfer contacts which are simultaneously closed upon being energized and which are arbitrarily separated into three pairs which may be denominated first, second and third pairs. All of the pairs of all of the relays are separated into two groups represented by the functional blocks 51 and 52. The pairs in the functional group 51 are employed only for two-wire, low-level, analog voltage signal sources which are scanned by selecting and energizing only one of three relays in a contact pair selector 53 in response to the digital configuration of positions $SC_{11}$ and $SC_{12}$ of the instruction. The transfer contacts of the relays in the contact pair selector are included in the functional group 51 and the functional group 52. Thus, the contact pair selector 53 includes three relays for selectively closing one of three pairs of transfer contacts in the group of low-level signal pairs 51 and a corresponding pair of transfer contacts in the group of high-level signal pairs 52. Three dotted lines 54, 55 and 56 in FIG. 2 represent the armature which mechanically actuates transfer contacts functionally included in the groups 51 and 52 when corresponding relays are energized in the contact pair selector 53.

The signal pair selection just described may be better understood from an example. Having selectively energized a given relay in the matrix 36 (relay matrix 0), six pairs of transfer contacts are closed. Assuming that half are grouped with the low-level signal pairs 51 and the other half are grouped with the high-level signal pairs 52, and further assuming that the instruction being executed requires scanning a low-level analog signal source, such as a strain gauge, connected by two wires to a pair of transfer contacts of the selected relay in the group of low-level signal pairs 51, one of the three relays in the contact pair selector 53 is energized to connect only the first, second or third pairs of transfer contacts of the selected relay of the relay matrix to conductors 311 and 312 as specified by positions $SC_{11}$ and $SC_{12}$ of the instruction.

The analog signal source could be connected to a pair of transfer contacts in the group of high-level signal pairs 52 even though it is a low-level signal source. To scan a source connected that way, position $SC_1$ and $SC_{13}$ of a CVT instruction are decoded by an isolation switch 60 which is closed only when a signal source connected to a pair of transfer contacts in the group of high-level signal pairs 52 is to be scanned as specified by the presence of a binary digit 1 in position $SC_{13}$ and a binary digit 0 in position $SC_1$.

The lines 311 and 312 couple a selected analog signal source to the analog-to-digital converter 32 through a signal conditioning channel comprising an attenuator and polarity selector 61 and an analog amplifier 62 having selective gain. The signal-conditioning channel converts the analog signal to a single-wire scaled signal at the output terminal 303 of the analog amplifier 62. The digital signals in positions $SC_{15}$ and $SC_{16}$ of the instruction select a predetermined attenuation for the two-wire analog signal which, in conjunction with the selective gain specified by the digital signals in positions $SC_{17}$ and $SC_{18}$ of the instruction, provide the appropriate scaling factor for the analog signal so that, upon conversion to a group of digital signals by the analog-to-digital converter 32, its value represented by the configuration of the digital signals at output terminals $CV_{10}'$ to $CV_{19}'$ has been appropriately scaled for the engineering units associated with the physical condition which the analog signal represents.

In the present embodiment to the invention, the analog amplifier and the analog-to-digital converter are designed to function with analog signals of only one polarity. If a given analog signal source being scanned provides a signal of the opposite polarity, or if the analog signal source provides signals of both polarities, depending upon whether the value being represented by the signal is positive or negative, the polarity of the signal must be changed so that it conforms with the polarity for which the analog amplifier and analog-to-digital converter are designed. The necessity for reversing the polarity of a given signal is anticipated and is provided for by a binary digit 1 in position $SC_{19}$ of the instruction.

If the instruction in the SC-register is a CTL instruction, as specified by binary digit 1 in the position $SC_1$, the isolation switch 60 is held open so that a signal on a line 313 or a line 314 cannot be conducted over the lines 311 and 312 to the signal conditioning channel. Thus, the isolation switch is open for the execution of all CTL instructions in order to protect the analog amplifier. If the CTL instruction is intended to provide a voltage signal to a load or control device for a specified period of time, positions $SC_{14}$ to $SC_{17}$ are decoded by a sub-control translator 70 to provide a connection of the specified voltage source to an output terminal 300 which is connected to a line switch 71. The line switch 71 decodes the digital signals in positions $SC_1$ and $SC_{13}$ of the instruction to connect only one of the two lines 313 and 314 to the output terminal 300. In that manner, a voltage signal is transmitted over a specified one of the two lines 313 and 314 and thereby through only one of a pair of transfer contacts selected by the address portion (positions $SC_2$ to $SC_{12}$) of the instruction. The selected voltage is thus applied to a control or load device through a single wire, the return to the voltage source being provided through ground.

Since the isolation switch 60 is intended to isolate the analog amplifier from high-level signals during the execution of a sub-control instruction, its operation is not important during the execution of a CVT instruction except to the extent that if the analog signal source is connected to a contact pair in the group of high-level signal pairs 52, the isolation switch must be closed in response to the configuration of positions $SC_1$ and $SC_{13}$, as described hereinbefore, in order that the pair of transfer contacts may be connected to the lines 311 and 312.

If the CTL instruction is to distribute a group of digital signals to a designated one of a plurality of digital-to-analog converters (not shown in FIGS. 1 and 2 but illustrated in FIG. 34), the address portion of the instruction is employed together with the sub-control translator 70 and the line switch 71 to momentarily connect a voltage signal to a relay switch which transfers the group of digital signals into the specified digital-to-analog converter which has its own memory for storing the digital signals until a new group is selectively transferred therein in a similar manner.

The group of digital signals to be transferred into a selected one of a plurality of digital-to-analog converters is first transferred through gating circuits 80 into a register which may be denominated the C-register in the analog-to-digital converter 32. That register is employed for that sort of CTL instruction on a time-sharing basis with CVT instruction in order to get maximum utilization out of the register which is part of the analog-to-digital converter. An instruction to transfer a group of digital signals into the C-register, which may be identified by the mnemonic code LCA, is decoded by an instruction decoder 13 in the digital computer to provide an LCA' command signal that enables an AND-gate G202 to transmit $L_{12}'$ timing pulse to the gating circuits 80 for the synchronous transfer of a group of digital signals from positions $A_{10}$ to $A_{19}$ of the A-register into the C-register of the analog-to-digital converter.

Before a CTL instruction of that sort may be executed, the computer must execute a sequence of instructions to store the group of digital signals in the A-register: The first is an LDA instruction which must be executed by the digital computer to transfer the group of digital signals into the A-register; and the second is an LCA instruction. When the CTL instruction itself is finally executed, the group of digital signals present at output terminal $C_{10}$ to $C_{19}$ of the C-register in the analog-to-digital converter is transferred into a selected one of a group of digital-to-analog converters DA201 to DA203 in FIG. 34 is response to the selective energization of an associated relay through a selected one of the lines 313 and 314 and a transfer contact of a relay in a matrix specified by the address portion of the CTL instruction.

CIRCUITS

Before proceeding with a description of an illustrative embodiment of the present invention, functional circuits which may be employed to implement its logic diagrams will first be described. Symbols employed to represent the functions which the circuits provide in the logic diagrams will be illustrated and described with reference to their associated circuits. It should be understood that the specific circuits shown are only illustrative; other conventional circuits may be successfully employed for the same functions if preferred.

Since the present invention is a digital device, it processes data in response to configurations of discrete digital values in the conventional binary system of notation. Accordingly, the logic diagrams employ functional circuits the output signals of which may have only two voltage levels denominated binary digits often referred to as bits. The voltage levels which represent the binary digits 1 and 0 are arbitrarily defined as 0 volt and +6 volts, respectively. The binary complements of the bits 1 and 0 are 0 and 1, respectively, and are represented by the respective signal levels of +6 volts and 0 volt. Accordingly, a 0-volt signal represents a binary digit 1 which is the same as the complement of a binary digit 0 and a +6-volt signal represents a binary digit 0 which is the same as the complement of a binary digit 1. Whether a given signal represents a true binary digit or its complement may depend upon its position or level in the logic diagram. For instance, a +6-volt signal which represents a bit 0 at an input terminal of an inverter appears at its output terminal as a 0-volt signal representing the binary complement of the bit 0.

Each signal appearing at an input or output terminal of a functional circuit may be given a symbol by which it may be conveniently identified. For example, a signal having the binary value of one applied to an input terminal of an inverter may be identified by a symbol W. The output signal from the inverter is the complement of the input signal and may be identified by either the symbol $\overline{W}$ or the symbol W' since either a bar or prime may be employed to represent the complement of a specified signal. If the signal $\overline{W}$ read as "not W" is again complemented by an inverter, the signal may be represented by the symbol $\overline{\overline{W}}$'. Since the recomplemented signal is equal to W, the symbol by which the recomplemented signal may be identified may be written as simply W.

Each symbol employed in the detailed description of the logic diagrams to refer to a given signal will generally be associated with the output terminal of the functional circuit originating it. For instance, the signal at the true output terminal of a flip-flop circuit Z storing a binary digit 1 will be designated Z, the same as the reference character employed to identify the flip-flop. Accordingly, the symbol Z represents not only the signal but also the functional circuit generating it and the output terminal from which it is derived. The false or complementary output terminal of such a flip-flop Z and its output signal is designated by the symbol Z'. If the output signals derived from the true and false output terminals of such a flip-flop Z are translated by inverters, the symbol for a signal derived from the output terminal of the inverter connected to the true output terminal of the flip-flop is designated Z' and the signal derived from the output terminal of the inverter connected to the false output terminal of the flip-flop is designated Z.

The circuit elements employed to provide the AND and OR functions inherently provide an inverting or complementing function so that in order to derive a logical AND signal (AB) of two signals A and B at the output terminal of an AND-gate, it is necessary to energize its input terminals with the complementary signals A' and B'. Only a complementary logical OR signal $(A'+B')$ may be derived from an OR-gate. To obtain a true logical OR signal $(A+B)$, it is necessary to connect an inverter in cascade with the OR-gate and derive the logical OR signal $(A+B)$ from the output terminal of the inverter.

Logic circuits having an inherent inverting function have often been referred to in literature as NOR circuits, presumably because a given logic circuit is intrinsically neither an AND-gate nor an OR-gate. When NOR logic circuits are pyramided, the inherent inverting function at each level is often canceled since pyramided logic normally consists of alternate levels of AND and OR functions. For example, to obtain a signal which is represented by the expression $(A+B)(C+D)$ read as "A or B and C or D," two OR-gates each having two input terminals are connected to drive two separate input terminals of an AND-gate. The respective input terminals of the OR-gates are energized by the signals A, B, C and D. The signal output of one OR-gate may be represented by the expression $A'+B'$ and the output signal of the other OR-gate may be represented by the expression $C'+D'$. The two expressions $A'+B'$ and $C'+D'$ are combined in the AND-gate to derive the desired expression $(A+B)(C+D)$. Because of the double inversion through the two levels of logic, the inverting functions inherent in the OR-gates and the AND-gate cancel each other.

*Basic functional circuit.*—The basic functional circuit from which many of the various circuits employed in the illustrated embodiment are constructed consists of a common-emitter transistor amplifier which, when employed by itself, may provide an AND function, an OR function or an inverting function. A circuit diagram of the basic functional circuit and three distinct symbols employed to represent its three different functions are illustrated in FIG. 3. The circuit includes a PNP junction transistor $T_1$ of a type suitable for general digital circuit purposes having its emitter connected to a source of +6 volts, its collector connected to a source of −18 volts through a load resistor 100 and its base connected to a bias source of +12 volts through a resistor 101. The collector of the transistor is clamped to ground by a germanium diode $D_1$ so that it does not go below ground potential when the transistor is cut off. When the transistor conducts, its collector potential increases to substantially +6 volts. Two input terminals 102 and 103 are coupled to the base of the transistor by resistors 104 and 105 having respective capacitors 106 and 107 connected in parallel with them. Depending upon the logic signal levels applied to the input terminals, the basic circuit functions as either an AND-gate or an OR-gate, with signal inversion in each instance, and as a conventional inverter.

Throughout the present system, each basic functional circuit will have applied to its input terminal either a 0-volt signal or a +6-volt signal to produce at its output terminal either a +6-volt signal or a 0-volt signal. The 0-volt signal output is established by conduction of current through the clamping diode $D_1$ when the transistor is cut off and the +6-volt output signal is established through the transistor when it conducts. Since both the diode and transistor have some internal impedance, the output signal levels will not be at exactly 0 and +6 volts, but for convenience they will nevertheless be referred to hereinafter as 0 and +6 volts. As noted hereinbefore, the +6-volt signal level represents a bit 0 and the 0-volt level represents a bit 1.

Symbols G101 and G102 in FIG. 3 represent elements which perform the respective AND and OR logic functions. The logic AND function is derived from the AND-gate G101 when the input signals at both of the input terminals 102 and 103 are at a +6-volt level for only then may the output terminal 108 be driven to a 0-volt level because if either one of the input terminals 102 or 103 is at a 0-volt level, the base of the transistor $T_1$ will be driven sufficiently negative with respect to the emitter to cause the transistor to conduct at saturation and clamp the output terminal 108 to a +6-volt level. When both of the input terminals 102 and 103 are at a +6-volt level, the base of the transistor $T_1$ will be at substantially the same potential as the emitter so that the transistor is cut off and the diode $D_1$ is forward biased by −18 volts through the load resistor 100 to clamp the output terminal 108 to ground potential. Accordingly, if the signal applied to either the input terminal 102 or the input terminal 103 is at a 0-volt level, the output terminal 108 is driven to +6 volts. Since the 0-volt level represents a binary value of one, a bit 1 signal A or a bit 1 signal B will produce an A' or B' signal at the output terminal 108. Similarly, since a +6-volt signal represents a binary value of zero or the complement of a signal having a binary value of one, to obtain a signal representing the logical AND of signals A and B, the complements A' and B' must be applied to the input terminals 102 and 103.

A symbol I103 in FIG. 3 represents a basic functional circuit employed only for an inverting function. Only one input terminal is required for inversion, such as the input terminal 102. When a signal is applied to an input terminal, the signal at the output terminal 108 will be the complement of the input signal.

*Multi-Input logic gates.*—When logic gates are required to combine more than two input signals, a plurality of two-input gates may be connected in parallel to provide the required number of input terminals; however, all of the basic circuit elements connected in parallel must have a common load resistor connecting the collector electrodes of all the parallel circuits to a source of −18 volts. A circuit diagram of a multi-input gate is illustrated in FIG. 4. Four input terminals 110 to 113 are connected to the base electrodes of PNP transistors $T_2$ and $T_3$ each of which is provided with a common load resistor 109. Only one diode $D_2$ is required to clamp the output terminal 114 to ground potential when all of the transistors $T_2$ and $T_3$ are cut off. If more than four input terminals are required, additional basic circuit elements may be connected in parallel, each with the common load resistor 109 and the common clamping diode $D_2$.

Two different symbols G103 and G104 are employed to represent a multi-input gate which provides an AND function. Similarly, two different symbols G105 and G106 are employed to represent a multi-input gate which provides an OR function.

*Simple flip-flop.*—Two basic functional circuits are cross-coupled to provide a simple and conventional flip-flop circuit by connecting an input terminal of one basic circuit directly to the output terminal of the second basic circuit and connecting an input terminal of the second basic circuit directly to the output terminal of the first circuit. A symbol F100 which is employed to represent a simple flip-flop is illustrated in FIG. 5. Such a simple flip-flop constitutes the fundamental circuit of a steered flip-flop schematically illustrated in FIG. 5. It consists of two transistors $T_4$ and $T_5$ and includes all of the circuit schematically illustrated except steering circuits which are coupled to the base electrodes of the transistors $T_4$ and $T_5$ by diodes $D_7$ and $D_8$.

An input terminal 120 coupled to the base electrode of the transistor $T_4$ is arbitrarily denominated the set input terminal. When the set input terminal is energized by a 0-volt signal, the transistor $T_4$ is driven into conduction and the transistor $T_5$ is cut off. When the transistor $T_4$ is conducting, the flip-flop is in its "set" state and its true or "one" output terminal 123 is clamped at 0 volt by a diode $D_3$. The false or "zero" output terminal 124 is then clamped to a source of $+6$ volts by the conducting transistor $T_4$. If a 0 volt-signal is applied to a reset input terminal 121, the transistor $T_5$ is driven into conduction and the transistor $T_4$ is cut off thereby driving the flip-flop to its "reset" state and causing its true output terminal 123 to be clamped to a source of $+6$ volts by the conducting transistor $T_5$. Since the output terminal 121 is the true output terminal, the reset flip-flop is said to be storing a binary value of zero when it is at a $+6$ volt level. Conversely, when the true output terminal 121 is clamped to 0 volt by the diode $D_3$, the set flip-flop is said to be storing a binary value of one. The false output terminal 124 is always at a voltage level which represents the complement of the true binary value stored in the flip-flop.

*Single-Steered flip-flop.*—A single-steered flip-flop is represented by a symbol F101 illustrated in FIG. 5. It has a set steering input terminal 130, a reset steering input terminal 131 and a pair of trigger input terminals 132 and 133. A positive-going (0 to $+6$ volts) pulse is applied to the trigger input terminal 132 to set the flip-flop F101 when the signal level applied to the steering input terminal 130 is $+6$ volts. Similarly, if the reset steering input terminal 131 is at a $+6$-volt level, a positive-going pulse applied to the trigger input terminal 133 will reset the flip-flop.

When a $+6$-volt signal is applied to the input terminal 130, a $+6$-volt signal is coupled by a resistor 134 to the anode of a diode $D_8$ the cathode of which is at about $+6$ volts so that a positive-going trigger pulse applied to the trigger input terminal 132 and coupled to the anode of the diode $D_8$ by a capacitor 136 is transmitted to the base of the transistor $T_5$ to cut it off and drive the flip-flop into its set state. If a $+6$-volt signal is not applied to the input terminal 130, the trigger pulse applied to the anode of the diode $D_8$ is insufficient to drive the flip-flop into its set state.

The reset steering input terminal 131 is coupled to the anode of the diode $D_7$ by a resistor 135 so that when it is at a $+6$-volt level, a $+6$-volt trigger pulse applied to the trigger input terminal 133 and coupled to the anode of the diode $D_7$ by a capacitor 137 is transmitted to the base of the transistor $T_4$ to cut it off and drive the flip-flop into its reset state. The complement of a binary signal applied to the set steering input terminal 130 is normally applied to the reset steering input terminal 131.

Figure 6:
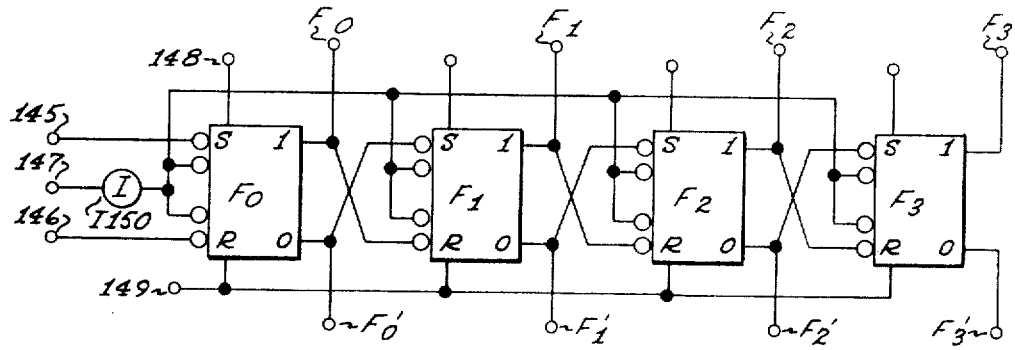
FIG. 6 is a schematic diagram of a shift register.

*Shift register.*—A shift register having as many stages as required may be provided by connecting in cascade a plurality of four-stage shift registers one of which is illustrated in FIG. 6. It includes four steered flip-flops $F_0$ to $F_3$. If an odd number of stages is required in a shift register, or a number which is not a multiple of four, some stages may be removed from the last of the cascaded four-stage shift registers.

The steering input terminals of each flip-flop are connected to output terminals of a preceding flip-flop so that a trigger pulse applied to all stages in parallel will drive each stage to the stable state of its preceding stage. A steering input terminal 145 of the first flip-flop $F_0$ is connected to a source of data; a second steering input terminal 146 is connected to a source of the complement of the data signals applied to the input terminal 145. The trigger input terminals of each of the flip-flops $F_0$ to $F_3$ are coupled to a common input terminal 147 by an inverter I150. If a second four-stage shift register is connected in cascade, another inverter couples its trigger input terminals to the common input terminal 147. By employing inverters to couple the common trigger input terminal 147 to the trigger input terminals of the steering circuits in the various stages of a large shift register, simultaneous triggering of each stage is provided without overloading the trigger pulse source connected to the input terminal 147.

Figure 7:
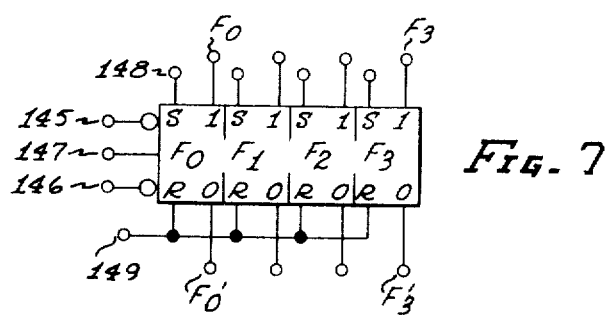
FIG. 7 illustrates the symbol employed to represent a shift register.

The inverters are to be considered an integral part of a shift register so that negative-going ($+6$ to 0 volt) shift pulses are required at the input terminal 147. For convenience, a shift register like the one illustrated in FIG. 6 is represented as shown in FIG. 7.

Each shift register is identified by the same letter employed to identify its flip-flop stages. In the illustrated example of FIG. 7, the shift register may be identified as the "F-register," the stages of which are identified by the letter F with subscripts that specify the order of the flip-flops in a decreasing order of significance such that the binary order of a flip-flop $F_n$ is one greater than of a flip-flop $F_{n+1}$.

A shift register may be employed for serial-to-parallel or parallel-to-serial conversion. For serial-to-parallel conversion, data is serially entered into the first stage $F_0$ one binary digit at a time and shifted to the right as successive binary digits are entered. After the data has been fully registered, the static data may be transferred in parallel from output terminals, such as the output terminal $F_0$ of the first stage, and the one's complement of the static data may be transferred in parallel from false output terminals, such as the output terminal $F_0'$ of the first stage.

For parallel-to-serial conversion, a configuration of binary coded signals may be transferred in parallel into corresponding stages of a shift register by applying a 0-volt signal to the set input terminal of each stage that is to receive and store a bit 1, such as the set input terminal 148 of the first flip-flop $F_0$. Data registered may thereafter be serially transferred to another functional circuit or device. Before data may be registered in parallel, it is necessary to reset each stage of the shift register by either applying a 0-volt signal to the common reset input terminal 149 or by serially shifting a bit 0 into all stages. The latter may be done while serially transferring out previously registered data.

Figure 8:
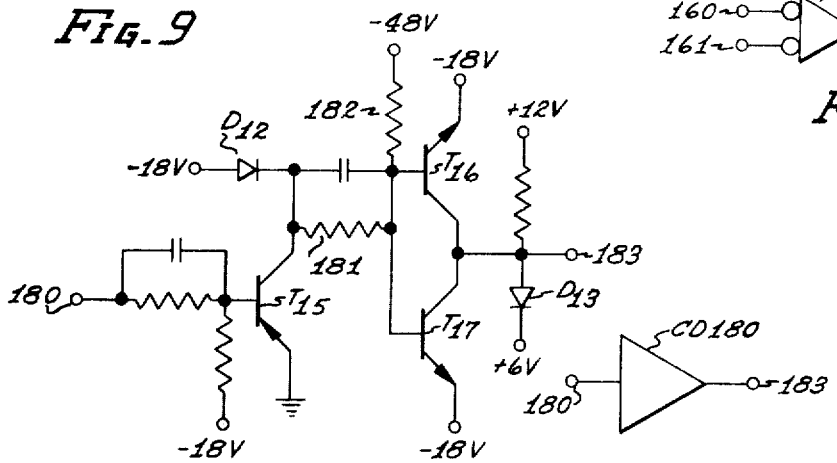
FIG. 8 illustrates a circuit diagram of a relay puller and the symbol employed to represent a relay puller.

*Relay puller.*—The functional circuit illustrated in FIG. 8 is a relay puller capable of operating one relay. It consists of one transistor $T_6$ connected in a common-emitter amplifier configuration and one AND-gate G160. Whenever the voltage at the base of the transistor $T_6$ drops below the emitter supply voltage of $+6$ volts, the transistor is biased for conduction of current from the emitter supply voltage through the coil of a relay to a source $-18$ volts. A diode $D_9$ is connected in parallel with the relay to protect the transistor $T_6$ from a surge of reverse current when the relay is de-energized. It is assumed that the relay energized by a relay puller is designed for energization with twenty-four volts.

The AND-gate G160 has two input terminals both of which must simultaneously be at +6 volts in order to drive the transistor $T_6$ into conduction. When the AND-gate G160 is not enabled by a +6-volt signal at both input terminals, its output terminal is at +6 volts. Two resistors 162 and 163 provide proper bias to hold the transistor $T_6$ cut off until the output of the AND-gate is 0 volt. An output terminal 164 is connected to the relay which is not part of the functional circuit represented by the symbol RP160 in FIG. 8.

Figure 9:
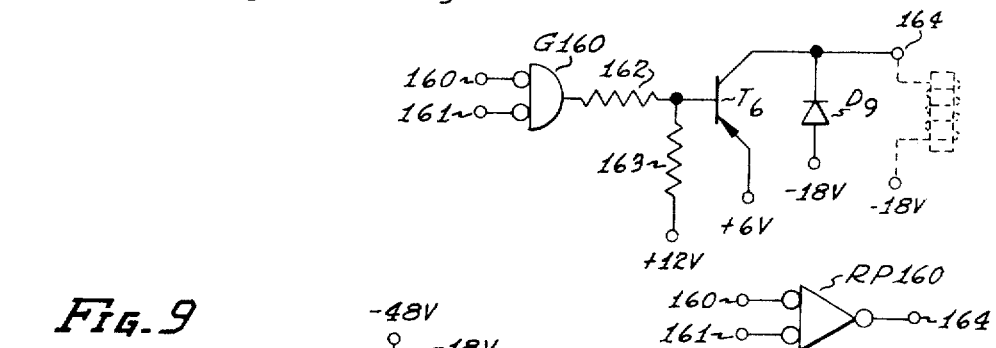
FIG. 9 illustrates a circuit diagram of a column driver and a symbol employed to represent a column driver.

*Column driver circuit.*—A column driver circuit illustrated in FIG. 9 may be employed to selectively provide 150 milliamperes of current at −18 volts to a group of relay coils. An input terminal 180 is normally maintained at a +6-volt level to hold a PNP transistor $T_{15}$ cut off. When the transistor $T_{15}$ is cut off, current is conducted from a source of −18 volts through two resistors 181, 182 and a diode $D_{12}$ to a source of −48 volts in order to bias the base electrode of a pair of NPN transistors $T_{16}$ and $T_{17}$ to a potential more negative than a −18 volts. Under that condition, both of the transistors $T_{16}$ and $T_{17}$ are cut off and their collector electrodes connected to a common output terminal 183 are clamped to a substantially +6-volt level by a conducting diode $D_{13}$. When a 0-volt signal is applied to the input terminal 180, the transistor $T_{15}$ is rendered conductive in order to bias the base electrodes of both transistors $T_{16}$ and $T_{17}$ to a potential more positive than −18 volts so that both transistors $T_{16}$ and $T_{17}$ conduct. Under that condition, the output terminal 183 is clamped to a −18-volt potential by the transistors $T_{15}$ and $T_{16}$ which are connected in parallel in order to provide 150 milliamperes of current at −18 volts to a group of relays which are to be simultaneously energized. A symbol CD180 illustrated in FIG. 9 is employed to represent a column driver circuit.

Figure 10:
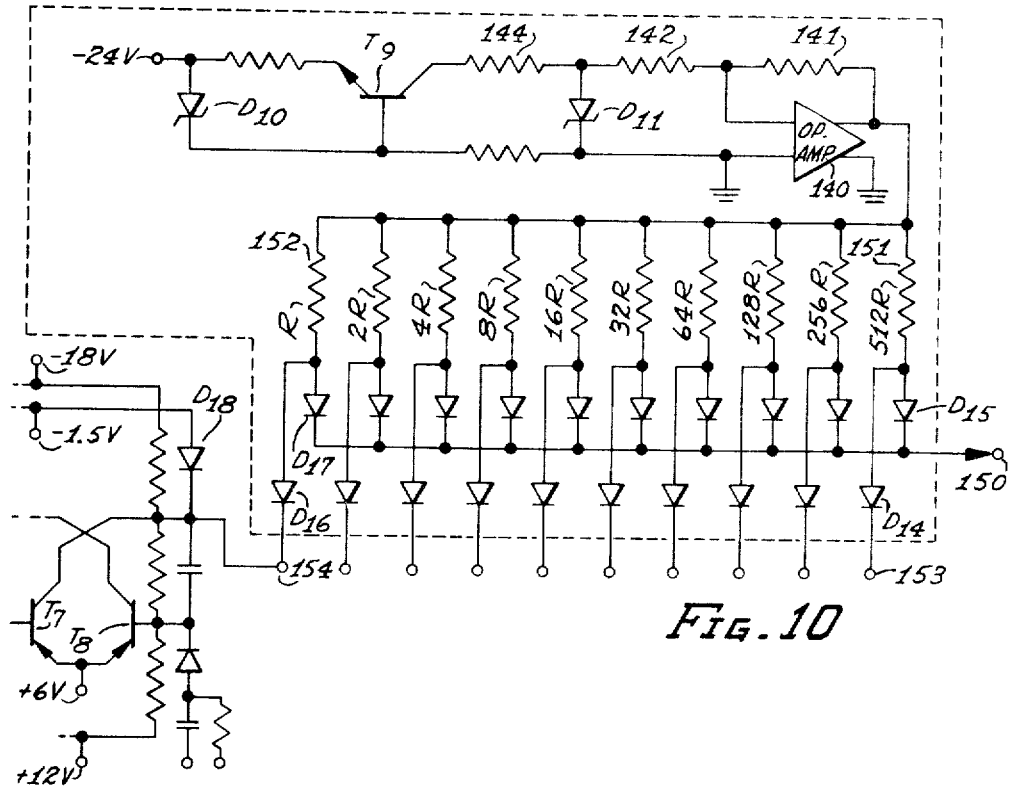
FIG. 10 is a circuit diagram of a digital-to-analog converter.

*Digital-to-Analog converters.*—Two types of digital-to-analog converters are employed in the system. The first to be described with reference to FIG. 10 is employed in the system to convert binary coded digital signals into analog signals of known digital value to be compared with an unknown analog signal so that a process of converting an unknown analog input into a binary coded configuration of digital signals may be carried out. That type of digital-to-analog converter does not include a memory element for each binary digit of a group to be converted since the group is stored in a special register which is part of the analog-to-digital converter. Accordingly, it consists only of a constant voltage source and ten weighted current switches, one switch for each bit of a group to be converted.

The constant voltage source comprises an operational amplifier 140 having a negative feedback resistor 141 and a resistor 142 coupling the input terminal of the operational amplifier 140 to a regulated voltage source. The regulated voltage is produced by two constant voltage devices comprising Zener diodes $D_{10}$ and $D_{11}$ and a transistor $T_9$. The Zener diode $D_{10}$ provides substantially constant base-to-emitter current through the transistor $T_9$ which produces a substantially constant current in the collector circuit, including a resistor 144 and the voltage-regulating Zener diode $D_{11}$.

The ten current switches are arranged to provide distinct values of current to a summing point, the values being arranged in binary progression. For instance, the least significant current switch selectively provides a current of unit value to an output terminal 150. That current switch consists of two diodes $D_{14}$, $D_{15}$ and a resistor 151 having a resistance value of 512 times the resistance value of a corresponding resistor 152 in the most significant current switch which includes the diodes $D_{16}$ and $D_{17}$. In order to provde the desired weighted current values, the resistors of all ten current switches have resistance values inversely proportionate to the binary value of binary digits associated with their switching diodes such as the diode $D_{14}$ for the least significant digit and the diode $D_{16}$ for the most significant binary digit.

The input terminal of a given current switch is normally maintained at a −1.5-volt potential so that its associated switching diode is forward biased. For instance, the input terminal 153 is maintained at a −1.5-volt potential so that the diode $D_{14}$ is forward biased, thereby reverse biasing the diode $D_{15}$ and shunting the weighted current passing through the resistor 151. When a bit 1 in the least significant bit position of a ten-digit binary number is to be converted into an analog signal, its complementary signal (+6 volts) is applied to the input terminal 153, thereby reverse biasing the diode $D_{14}$ and allowing the diode $D_{15}$ to conduct the weighted current to the output terminal 150.

As noted hereinbefore, a register comprising a bank of ten flip-flops is employed to store the binary digits of a ten-digit binary number to be converted into an analog signal. Accordingly, each flip-flop has its false output terminal connected to its corresponding current switch. For instance, a flip-flop comprising a pair of transistors $T_7$ and $T_8$ has its false output terminal connected to the input terminal 154 of the most significant current switch. Normally, the clamping diode $D_{18}$ connected to the collector electrode of the transistor $T_7$ clamps the false output terminal to ground as described hereinbefore with reference to FIG. 5. However, in order that the switching diode $D_{16}$ may be forward biased while the flip-flop is reset, a potential source of −1.5 volts is connected to the anode of the clamping diode $D_{18}$ instead of a 0-volt potential source. However, only the clamping potential of the memory flip-flops associated with the digital-to-analog converter illustrated in FIG. 10 is changed.

The second type of digital-to-analog converter employed in the system is relay actuated. It includes ten current switches arranged to provide currents in a binary progression to a load 155. Each switch includes a bi-stable relay circuit responsive to an associated digital signal assigned a different binary order of value to effectively connect a weighted current source to the load 155.

Each weighted current source includes a resistor connected to the load having a resistance proportionate to the binary order of the associated digital signal. For instance, in the least significant current switch, a pair of resistors 156 have a combined value of resistance which is 512 times the combined resistance of a corresponding pair of resistors 157 in the most significant current switch.

When the relay in a given current switch is de-energized, such as the relay K50 in the most significant current switch, its transfer contact connects the associated pair of weighted resistors in series to allow a weighted current to flow through the load 155 to a regulated source of −72 volts. When the relay K50 is energized, the transfer contact breaks the junction between the pair of resistors 157 and connects a source of 0 volt to the junction thereby causing substantially no current to flow through the load. In that manner, a de-energized relay representing a bit 1 causes a weighted current to flow through the load and an energized relay representing a bit 0 causes no current to flow through the load.

As noted hereinbefore, each relay of a weighted current switch is a bistable relay switch. When the relay is de-energized, an associated diode, such as the diode $D_{20}$ in the most significant current switch, is reverse biased so that the relay remains de-energized. When the relay is energized by connecting to it a source of 0 volt through a transfer contact K51a of a relay K51, the transfer contact of the relay switch provides a 0-volt potential which forward biases its associated diode thereby holding the relay energized. Once the relay is energized, the relay K51 may be de-energized since the holding current through the associated diode holds the relay K50 energized. Accordingly, a 0-volt signal applied to a given current switch through the transfer contact of the relay K51 represents a binary digit 0.

In order to de-energize a relay in a given current switch, a source of −48 volts is connected to its through its associated transfer contact K51a. Once the associated relay K50 is de-energized, its associated diode $D_{20}$ is reverse biased so that after the relay K51 is de-energized, no current will flow through it.

Figure 11:
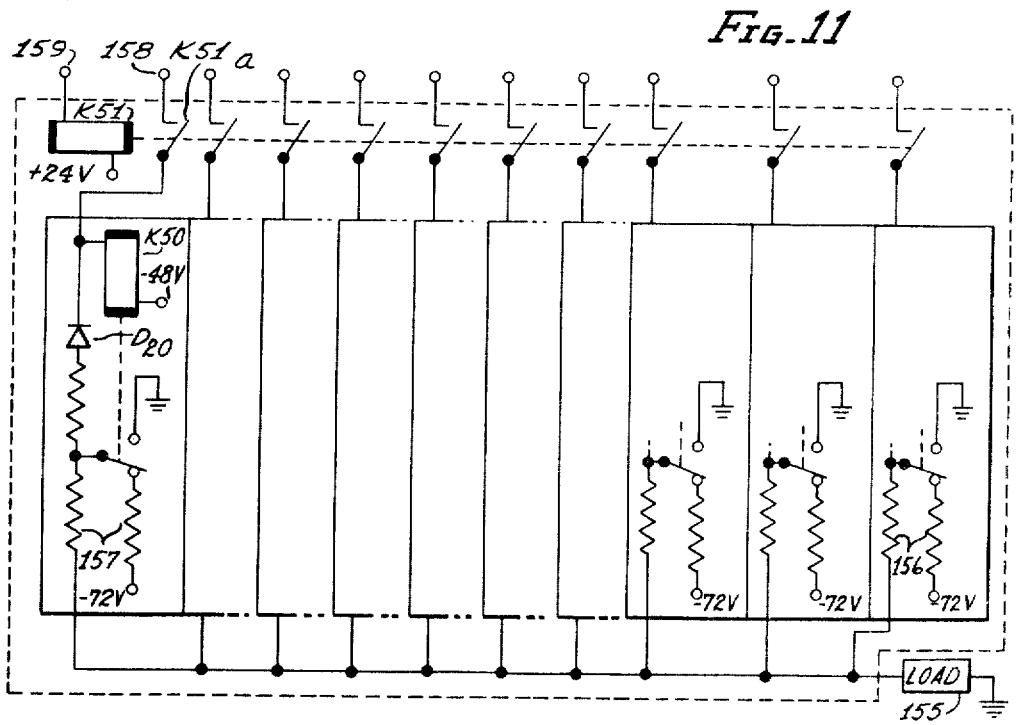
FIG. 11 is a circuit diagram of a digital-to-analog converter utilizing bistable relay switches as memory devices.

An example will best illustrate the operation of the digital-to-analog converter illustrated in FIG. 11. Since all channels are alike except for the value of the weighting resistors, only the current switch of the most significant bit position of a ten-digit binary number to be converted will be described. As noted hereinbefore, the binary digits 0 and 1 are represented in the system by signal levels of +6 volts and 0 volt, respectively; however, as just noted in the preceding paragraphs, digital signals to be employed with the digital-to-analog converter to represent the respective bits 0 and 1 are 0 volt and −48 volts. Therefore, translating circuits are employed to convert the digital signals from the system into the appropriate voltage levels to be employed with the current switches.

An input terminal 158 associated with the most significant current switch is assumed to be connected to a voltage-translating circuit so that a bit 0 presents a 0-volt signal and a bit 1 presents a −48 volt-signal at the input terminal 158. It it to be assumed that the translating circuit is connected to a register which presents a group of digital signals in parallel.

The momentary energization of the relay K51 by a −24-volt signal at an input terminal 159 transfers the digital signal present at the input terminal 158 to the relay K50 of the associated current switch. If that digital signal represents a bit 0 the relay K50 is energized. Since the relay switch is bistable, the relay K50 remains energized after the relay K51 is de-energized.

If a subsequent group of digital signals transferred to the digital-to-analog converter includes a digital signal representing a bit 1 in the most significant bit position, when the relay K51 is again energized to transfer that group of digital signals into the digital-to-analog converter, a −48 volts present at the input terminal 158 is connected to the relay K50, thereby de-energizing it. Once the relay K50 is de-energized, it remains de-energized until a digital signal representing a bit 0 present at the input terminal 158 is again connected to it by the relay K51.

Since the relay K51 is selectively energized only at the moment the group of digital signals is to be transferred to the digital-to-analog converter, a plurality of digital-to-analog converters connected to the same signal-translating circuits through respective selecting relays may be driven on a time-sharing basis from the same source of binary coded digital signals. The advantage of doing so it that only one source is required to selectively distribute groups of digital signals to digital-to-analog converters. It should be noted that since each digital-to-analog converter employs bistable relay switches, a group of digital signals transferred to a given digital-to-analog converter is stored therein in order to provide a continuous analog output signal until a different group of digital signals is transferred into it.

The relay K51 is selectively energized by applying a negative 24-volt signal to its input terminal 159 through a selected transfer contact of a selectively energized relay in a particular relay matrix. As is described in more detail hereinafter, the negative 24-volt signal is applied to a plurality of lines when a group of digital signals is to be converted to an analog signal by a predetermined digital-to-analog converter connected to a particular load. Relay logic circuits are employed to assure that a closed circuit is provided for the negative 24-volt signal through only one closed transfer contact in the particular matrix.

For convenience, the distributing digital-to-analog converter illustrated in FIG. 11 has been described as having bistable relay current switches which are energized in response to a 0-volt signal applied to associated input terminals, such as the input terminal 58. However, other voltage signals could be employed. In the present system, distributing digital-to-analog converters are actually designed to operate with a negative 24-volt signal at the digital input terminals to energize associated bistable relay switches comprising relays designed to operate with a 24-volt signal. Consequently, the binary digits 0 and 1 are represented by negative 24-volt and negative 48-volt signals, respectively.

Both types of digital-to-analog converters illustrated in FIGS. 10 and 11 are employed in the present system represented by functional blocks bearing an identifying legend which includes a reference to the appropriate one of the figures. It should be noted, however, that other types of digital-to-analog converters could be employed in the system.

Figure 12:
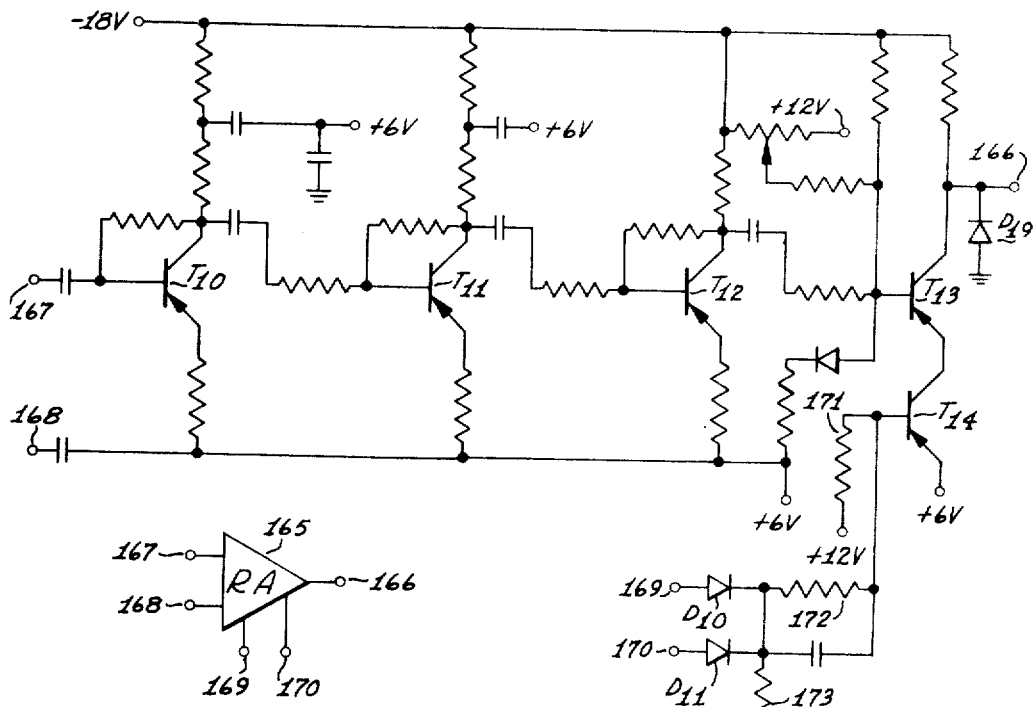
FIG. 12 illustrates a circuit diagram of a read amplifier and a symbol employed to represent it.

*Read amplifier.*—A symbol 165 which represents a read amplifier in the drum memory section of the computer and its circuit diagram are illustrated in FIG. 12. It is provided with one output terminal 166 and two capacitively coupled input terminals 167 and 168. A pulse recorded on a track of the drum is detected by a read head (not shown) which produces a signal that is transformer coupled to the input terminals 167 and 168. The read amplifier consists of three amplifier stages which produce a positive-going (0 to +6 volts) signal at the output terminal 166 in response to each recorded pulse detected. The three amplifier stages include transistors $T_{10}$, $T_{11}$ and $T_{12}$. The output signal from the third transistor $T_{12}$ is capacitively coupled to the base electrode of a fourth transistor $T_{13}$ which functions as an inverter when emitter supply voltage is applied to it by a gating transistor $T_{14}$ under control of two input signals applied to input terminals 169 and 170. If either control input signal is at a +6-volt level, the transistor $T_{14}$ is cut off and the read amplifier is inhibited because the output transistor $T_{13}$ cannot conduct and the signal at the output terminal 166 is clamped at 0 volt by a diode $D_{19}$.

When the amplifier is employed to selectively read data from a given memory track, the inhibiting input terminals 169 and 170 are maintained at +6 volts except when data is to be read, at which time 0-volt signals are applied to both input terminals 169 and 170. However, when it is employed to continuously read timing pulses, as from the clock track or index track, the inhibiting input terminals are left as open terminals so that the transistor $T_{14}$ is continuously biased conductive by resistors 171, 172 and 173. The amplifiers employed to continuously read the clock and index tracks are represented by the symbol 165 without the inhibiting input terminals 169 and 170.

Figure 13:
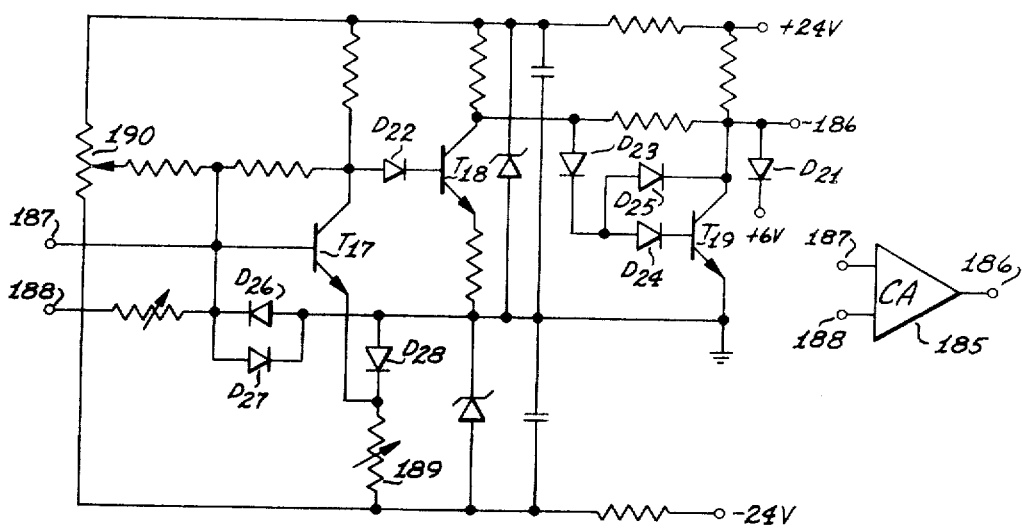
FIG. 13 illustrates a circuit diagram of a comparator amplifier and a symbol employed to represent it.

*Comparator amplifier.*—A symbol 185 which represents a comparator amplifier is illustrated in FIG. 13 with its circuit diagram. It is provided with one output terminal 186 and two input terminals 187 and 188 to which two analog signals are applied for comparison of their absolute amplitudes. The signal applied to the input terminal 187 is positive with respect to a reference potential (ground) and the signal applied to the input terminal 188 is negative with respect to the reference potential. Both input terminals 187 and 188 are direct-current coupled to the base electrode of a transistor $T_{17}$ in the first of three amplifier stages so that the comparator amplifier effectively amplifies only the difference between the two input signals. If the negative signal applied to the input terminal 188 is equal to or greater in absolute amplitude than the positive signal applied to the input terminal 187, the output terminal 186 of the comparator amplifier is clamped by a diode $D_{21}$ to +6 volts. When the positive signal exceeds the negative signal in absolute amplitude, the output terminal 186 is clamped at substantially ground potential by a transistor $T_{19}$ in the third stage which is rendered conductive by the amplified signal from the first two stages. In order to provide rapid transition of the transistor $T_{19}$ from cutoff to conduction, the comparator amplifier is designed as a high-gain amplifier having a sensitivity of approximately a 6-volt swing at its output terminal for one microampere change in net input current.

The comparator amplifier is employed in an analog-to-digital converter to determine when conversion is complete. The analog signal to be converted is applied to the input terminal 188 and a positive output signal from the analog-to-digital converting circuits is applied to the input terminal 187. When the negative signal is greater than or equal to the positive signal, the voltage at the base of the transistor $T_{17}$ is negative. The inverted output signal at the collector of the transistor $T_{17}$ is coupled by a diode $D_{22}$ to the base of a transistor $T_{18}$ in the second stage. The amplified and inverted signal at the collector of the transistor $T_{18}$ is more negative than the negative signal at the base of the transistor $T_{17}$. That amplified negative signal is sufficient to maintain the transistor $T_{19}$ cut off so that the output terminal 186 remains clamped at +6 volts by the diode $D_{21}$. When the positive signal is greater than the negative signal, the first two stages provide a positive signal to the base electrode of the transistor $T_{19}$ through coupling diodes $D_{23}$ and $D_{24}$ to render the last stage conductive so that the output terminal 186 is clamped to approximately ground potential by the conducting transistor $T_{19}$.

A diode $D_{25}$ and the diode $D_{24}$ provide a clamping circuit commonly referred to as a Baker clamp, between the collector and base electrodes of the transistor $T_{19}$. For that purpose, the diode $D_{24}$ is selected to be a silicon diode and the diode $D_{25}$ is selected to be a germanium diode. This back-clamping technique converts the last stage of the amplifier into a non-saturating inverter in order to provide high-speed switching from conduction to cutoff. Since the clamping diodes prevent the transistor $T_{19}$ from saturating, the output terminal 186 only approaches ground potential within approximately one volt when the transistor $T_{19}$ is conducting so that the advantage of providing high-speed switching is offset by limiting the voltage swing of the output terminal to about five volts from +1 to +6 volts. However, an inverter of the type shown in FIG. 3 which is driven by the signal at the output terminal 186, will function properly as intended in the manner described hereinbefore.

Clamping diodes $D_{26}$ and $D_{27}$ are connected to the base electrode of the transistor $T_{17}$ to prevent an excessive excursion of the voltage applied to the base electrode. A silicon diode $D_{28}$ is connected in the emitter circuit of the transistor $T_{17}$ for temperature compensation. A variable resistor 189 couples the emitter of the transistor $T_{17}$ to a source of negative potential to provide a voltage which compensates for the voltage drop across the base-to-emitter junction of the transistor $T_{17}$. A potentiometer 190 is provided to adjust the base bias of the transistor $T_{17}$ for initially adjusting the comparator amplifier by first adjusting the potentiometer 190 to zero volts and then adjusting the variable resistor 189 so that the voltage drops across the compensating diode $D_{28}$ and the base-to-emitter junction of the transistor $T_{17}$ are equal. Then with a +10 milliwatts input signal at the input terminal 188 and a 0-volt signal at the input terminal 187, the potentiometer 190 is adjusted so that the signal at the output terminal 186 is approximately 3 volts. A variable resistor 191 is also employed for that final adjustment.

TIMING

For the purpose of describing an embodiment of the invention, it is assumed that the internal memory section provided for storing instructions and data words in the computer comprises a magnetic drum revolving at about 4800 r.p.m. The drum (not shown) consists of a cylindrical surface coated with a metallic oxide which can be locally magnetized to store digital signals representing 0 and 1 bits. Magnetic heads are placed close to the drum surface at regular intervals in the axial direction in order to provide a plurality of memory tracks, a track being that drum surface area which passes beneath a given head.

Each track is divided into 128 sectors called memory locations each of which can store a single word consisting of twenty bits plus an odd-parity checking bit. Each bit is stored in a segment called a memory cell. Three extra cells are provided in each memory location in order to allow a buffer area between stored words.

Since the drum revolves at about 4800 r.p.m., approximately ninety-six microseconds are required to scan one memory location as it passes beneath an associated head. Accordingly, a word-time is approximately ninety-six microseconds and a bit-time, the time required to scan one memory cell, is approximately four microseconds.

So that sections of the computer may allow events to take place in proper sequence with respect to word-times and at the correct bit-times within a given word-time, synchronizing signals are provided. The basic synchronizing signals which are recorded on the drum itself consist of a 250 kc. sine wave on one track and an index pulse on another. They are read continuously and employed to derive all of the specific synchronizing signals required in a manner described in the following paragraphs.

The analog input-output system provided in accordance with the present invention to enable the digital computer to gather data from the industrial process being controlled and distribute control signals thereto derives its synchronizing signals from the computer for convenience only. The operation of the input-output system is initiated by the execution of instructions in the computer; but it proceeds independently after it is started while the computer executes other instructions. Accordingly, an independent source of synchronizing signals may be employed in the input-output system if more convenient for any reason.

$\phi_1$ *and* $\phi_2$ *Clock pulses.*—The basic timing signal of the computer recorded on a clock track as a 250 kc. sine wave is read by a magnetic head H100 illustrated in FIG. 14 and coupled by a transformer T100 to a read amplifier 117 which provides at its output terminal a continuous series of substantially square pulses, each about four microseconds long, as illustrated in graph A of FIG. 18.

Two inverters I100 and I101 are employed to obtain oppositely phased square wave signals which are illustrated in graphs B and C of FIG. 18 to alternately enable AND-gates G103 and G105. The signal from the inverter I100 is also transmitted through an inverter I102 and a 0.9 microsecond delay line 118 to the AND-gate G105 to disable it 0.9 microsecond after it has been enabled. In that manner 0.9 microsecond $\phi_2$ pulses illustrated in graph G are generated. The $\phi_2$ pulses are inverted by an inverter I106 to provide $\phi_2'$ pulses which are illustrated in the graph H of FIG. 18. An inverter I104 couples the output of the delay line 118 to the AND-gate G103 to disable it 0.9 microsecond after it has become enabled in order to produce $\phi_1$ pulses as illustrated in graph E and to produce $\phi_1'$ pulses illustrated in graph F through an inverter I105. The $\phi_1$ and $\phi_2$ pulses, and their inversions or complements $\phi_1'$ and $\phi_2'$, are distributed throughout the computer by a network of inverters not shown.

*Index pulse.*—One track of the drum is employed for the storage of an index pulse which effectively provides a reference mark on the drum in order that a given one of the 128 memory locations on a given track may be located. Accordingly, only one pulse is recorded on the index track. It is detected by a read head H101 illustrated in FIG. 15 and coupled by a transformer T101 to a read amplifier 119. A shortened $\phi_1'$ pulse enables an AND-gate G107 when an index pulse is present to set a flip-flop F21 in substantial time coincidence with a $\phi_1'$ pulse. A flip-flop F22 is then set in substantial time coincidence with the leading edge of a $\phi_2'$ pulse through an AND-gate G109 which is enabled by the set flip-flop F22. The next $\phi_1'$ pulse to occur resets both of the flip-flops F21 and F22. The output terminals of the flip-flop F22 provide the index pulses IP and its complement IP' illustrated in graph I of FIG. 18.

*Bit timing.*—The correct timing of each operation within a given word-time throughout the computer is assured by bit-timing pulses $L_0$ and $L_{23}$ generated by a bit-time ring counter illustrated in FIG. 16. Each unique bit-timing pulse generated within a given word-time constitutes a basic timing period of four microseconds which corresponds to a memory cell on the drum. As noted hereinbefore, data and instruction words consist of twenty bits. The twenty bits of a word may be arbitrarily associated with bit-timing pulses $L_1$ to $L_{20}$. It should be noted that the association of a given bit with a bit-timing pulse is a time coincidence relationship only after the particular bit has been read from memory and is available for the execution of an operation. The least significant bit is designated bit 19 so that when a word is read from memory into a register, such as the A-register comprising stages $A_0$ to $A_{19}$, only stages $A_1$ to $A_{19}$ of which are shown, the least significant bit 19 is present in the nineteenth stage $A_{19}$.

The bit counter which generates the bit-timing pulses $L_0$ and $L_{23}$ comprises a shift register having twenty-four stages $L_0$ to $L_{23}$ connected in a ring, as illustrated in FIG. 16, and operated as a ring counter in that an IP pulse which sets the stage $L_{17}$ is cyclically transferred from stage to stage in a ring fashion 128 times during a single drum revolution in response to $\phi_2'$ pulses applied to trigger input terminals through a pair of inverters I107. Transfer of a bit 1 from stage $L_{20}$ to stage $L_{21}$ is not made directly but through a lock-out circuit consisting of an AND-gate G110 and an inverter I108. The AND-gate 110 is enabled only when stages $L_{17}$ to $L_{19}$ are reset and stage $L_{20}$ is set. When it is enabled, a bit 1 is transferred to stage $L_{21}$ in response to the next $\phi_2'$ pulse.

Each bit-timing pulse, such as the pulse $L_{16}$ illustrated in graph J of FIG. 18, is a four microsecond 0-volt signal persisting from the leading edge of one $\phi_2$ pulse to the leading edge of the next $\phi_2$ pulse as illustrated in FIG. 18. Other representative bit-timing pulses are illustrated in FIG. 18. Inverters are connected to output terminals, such as an inverter I122 connected to the output terminal $L_2$, to provide a complementary output pulse wherever necessary.

Input terminals of functional circuits in sections of the computer and the input-output system which are to be synchronized by different ones of the bit-timing pulses generated by the bit counter of FIG. 16 are indicated by the requisite bit-timing pulse designation. This convention is employed throughout but it should be understood that input terminals of functional circuits are not necessarily connected directly to output terminals of the bit counter.

*$\phi A$ and $\phi B$ clock pulses.*—The specific embodiment of an analog input-output system for a digital data processing system described hereinafter is largely implemented with relay switches. Accordingly, the functional circuits in the input-output system are synchronized at a slower clock rate than the 250 kc. rate of the $\phi_1$ and $\phi_2$ pulses employed in the computer. The clock pulses at the slower rate, denominated $\phi A'$ and $\phi B'$ pulses, are derived from OR-gates G111 and G112 illustrated in FIG. 17. The bit-timing pulses $L_0$, $L_8$, and $L_{16}$ are applied to the OR-gate G111 to derive the $\phi A'$ pulses. Similarly, the bit-timing pulses $L_4$, $L_{12}$ and $L_{20}$ are applied to the OR-gate G112 to derive the $\phi B'$ pulses. Both $\phi A'$ and $\phi B'$ pulses are transmitted to input terminals of the analog input-output system as required. Those input terminals are identified by the legends $\phi A'$ and $\phi B'$, according to which timing pulse is to be applied to the associated functional circuit. It should be noted that since negative-going (+6 to 0 volt) signals are applied to the OR-gates G111 and G112, the $\phi A'$ and $\phi B'$ pulses derived are positive-going (0 to +6 volts) pulses of four microseconds duration.

DETAILED DESCRIPTION

*SCR-Register loading.*—As noted hereinbefore with reference to FIG. 1, the SC-register is the instruction register of the scanner-distributor which functions as a special-purpose information-handling apparatus capable of independent operation. In response to an LCS instruction, a CTL or CVT instruction is transferred into the SC-register from the A-register of the computer. The A-register functions as an input-output buffer register for the transfer of information between the computer and the scanner-distributor. A logic diagram of the SC-register and the manner in which an instruction is transferred therein from the A-register is illustrated in FIG. 19.

After a CTL or CVT instruction comprising nineteen digital signals has been located in a memory location specified by an LDA instruction present in the $\alpha$-register of the computer, the group of nineteen digital signals is serially transferred into the stages $A_1$ to $A_{19}$ of the A-register through an input terminal 304 in response to shift-control pulses SHA generated by the control unit 20 (FIG. 1) of the computer. The input terminal 304 is connected to the output terminal of the AND-gate 304 as shown in FIG. 1. An inverter I301 is provided as a functional circuit between the input terminal 304 and the A-register in order that a positive-going (0 to +6-volts) signal may be applied to the set steering input terminal of the first stage $A_1$ when a digital signal representing a bit 1 is to be transferred therein. An inverter I300 couples the complement of a digital signal being transferred into the A-register to the reset steering input terminal of the first stage $A_1$.

After a CTL or CVT instruction to be executed by the scanner-distributor has been stored in the A-register, it may be transferred into the SC-register comprising stages $SC_1$ to $SC_{19}$ in response to an LSC instruction stored in the $\alpha$-register of the digital computer which, upon being decoded, causes an LSC' command signal to enable the AND-gates G207 and G208 as described hereinbefore. An $L_0'$ pulse is translated by the enabled AND-gate G207 through a group of distributing inverters I217, and I329 to I332. Thereafter, an $L_8'$ pulse is translated by the enabled AND-gate G208 to a group of nineteen AND-gates, such as an AND-gate G359, through a plurality of distributing inverters I324 to I327 to cause the digital content of $A_1$ to $A_{19}$ of the A-register to be transferred in parallel into respective stages $SC_1$ to $SC_{19}$ of the SC-register.

Figure 20A:
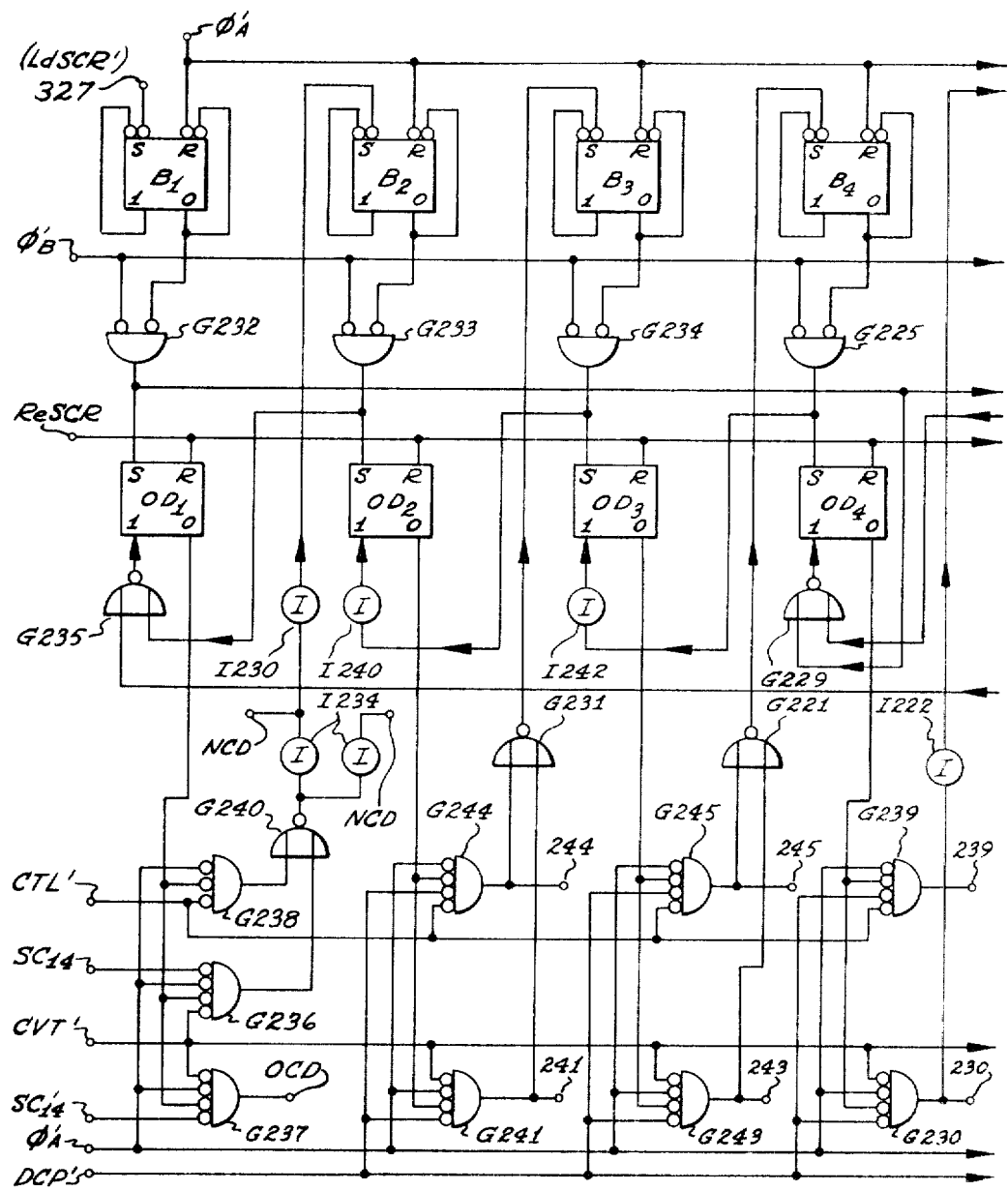
FIGS. 20a and 20b illustrate a logic diagram of an operation-sequence-control section and FIG. 20c illustrates the manner in which FIGS. 20a and 20b may be combined to form a complete logic diagram of the operation-sequence-control section.
Figure 20B:
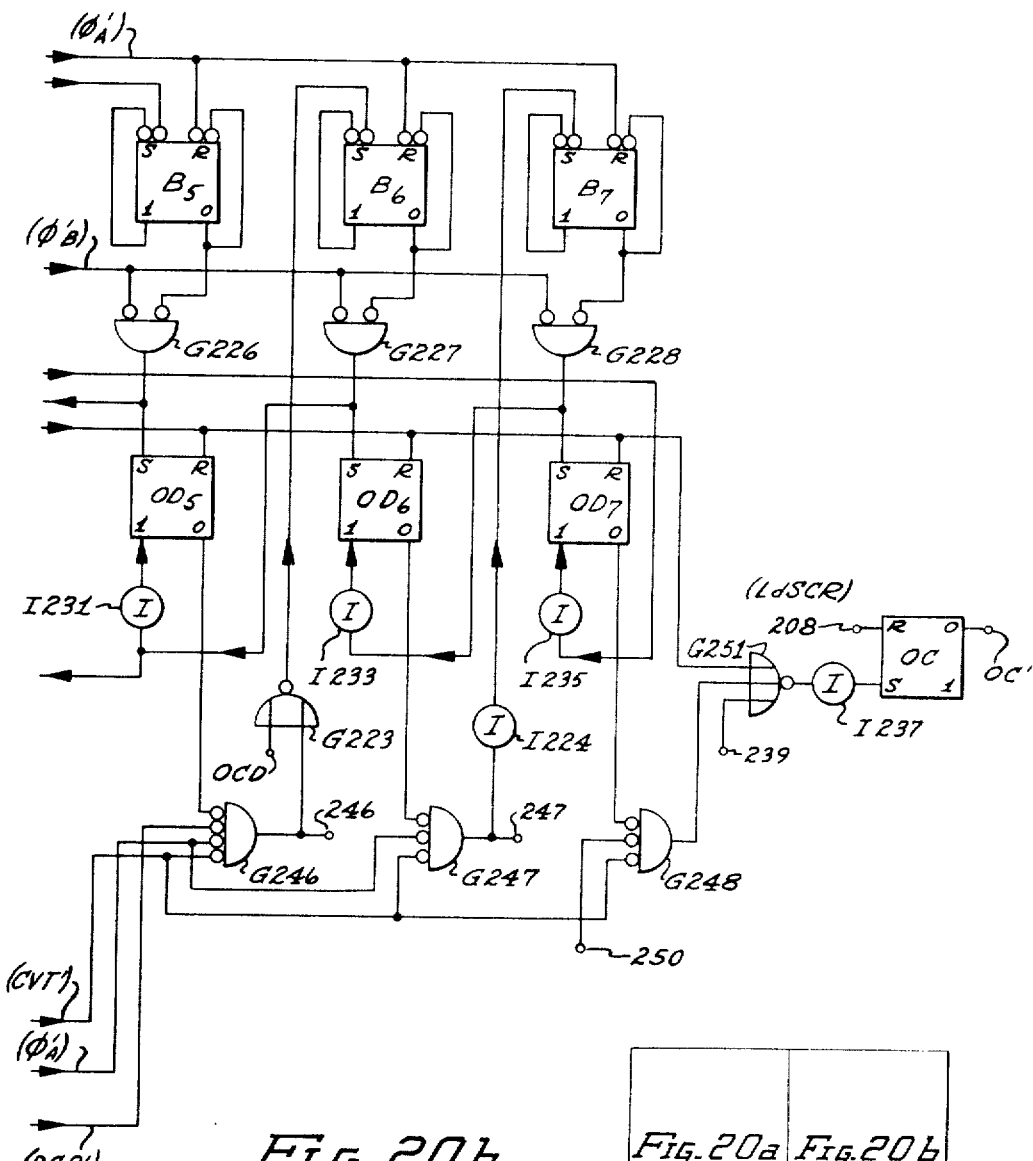

An output terminal R$e$SCR of the AND-gate G207 provides a signal, which may be denominated the R$e$SCR signal, to reset the operation-sequence-control section 16 as described hereinbefore with reference to FIG. 1. A logic diagram of the operation-sequence-control section is illustrated in FIGS. 20a and 20b. An output terminal 208 of the AND-gate G208 is connected to a reset input terminal of the operation-complete flip-flop OC (FIG. 20b) to reset it and an output terminal 327 of the inverter I327 is connected to the set steering input terminal of a buffer flip-flop $B_1$ (FIG. 20a) to initiate operation of the sequence-control section.

As noted hereinbefore, the instructions which may be executed by the communication channel are of two general types. A bit 0 in the most significant position of the instruction transferred into the $SC_1$ stage specifies that the instruction to be executed is a CVT instruction. While the $SC_1$ stage is storing a bit 0, it transmits from its false output terminal a 0-volt signal to a pair of inverters I312 and I313 which transmit a +6-volt CVT' command signal to the operation-sequence-control section for the purpose of defining its mode of operation and thereby causing the steps necessary to scan an analog signal source, to scale an analog signal from that source and to convert the scaled analog signal to digital form to be carried out. If a bit 1 is stored in the $SC_1$ stage of the SC-register, a 0-volt signal is applied to an inverter I311 which transmits a +6-volt CTL' command signal to the operation-sequence-control section in order to define its other mode of operation and thereby sequence the steps necessary to either distribute an analog signal to a load or control device or to connect a selected voltage source to a specified load or control device.

If the instruction transferred into the SC-register is a CVT instruction, after the analog signal from a selected source has been scaled and converted into a digital form by the analog-to-digital converter illustrated in FIG. 33, the group of digital signals which represent the value of the analog signal is transmitted from output terminal $CV_{10}$ to $CV_{19}$ of the analog-to-digital converter through a group of inverters I205 or I214 to a group of AND-gates G316 to G325. When an RCV instruction is being executed by the computer, a 0-volt RCV command signal from the instruction decoding section of the digital computer is translated by a pair of inverters I307 to the AND-gates G316 to G325, thereby enabling the AND-gates G316 to G325 to transfer the group of digital signals present at the terminals $CV_{10}$ to $CV_{19}$ into the stages $A_{10}$ to $A_{19}$ of the A-register. Thereafter, the information in the A-register may be serially transferred to a memory location or some other register in the computer through a pair of inverters I308 and I310 for processing under computer program control.

Figure 20C:
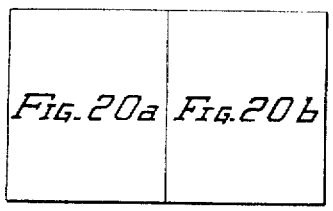

*Operation sequence control, general.*—The operation sequence control section is illustrated in FIGS. 20a and 20b which may be combined as shown in FIG. 20c. It consists of a seven-stage counter comprising a group of seven flip-flops $OD_1$ to $OD_7$ and a group of buffer flip-flops $B_1$ to $B_7$. An ReSCR signal from the output terminal of the AND-gate G207 (FIG. 19) resets all of the flip-flops $OD_1$ to $OD_7$ in order to prepare the sequence-control section for a new cycle of operation which is initiated by an LdSCR' signal at the terminal 327 that sets the buffer flip-flop $B_1$ when the instruction to be executed is transferred into the SC-register. At the same time, a flip-flop OC (FIG. 20b) is reset.

After execution of the instruction is complete, the flip-flop OC is set via on OR-gate G251 and in inverter I237, either under control of the last stage $OD_7$ in the counter $OD_7$ for a CVT instruction or via terminal 239 under control of the fourth stage $OD_4$ for a CTL instruction. The OR-gate G251 has a third input terminal connected to the output terminal of the AND-gate G207 in FIG. 19 so that the flip-flop OC is reset when the flip-flops $OD_1$ to $OD_7$ are reset by an ReSCR signal in order to assure that an OC' signal is transmitted to the computer before execution of the next instruction in the SC-register is begun. The OC flip-flop is reset in response to an LdSCR signal from the output terminal 208 of the AND-gate G208 in FIG. 19 as the new instruction is being transferred into the SC-register.

*CTL instruction sequencing.*—If the new instruction transferred into the SC-register includes a binary digit 1 in the most significant position $SC_1$, the instruction is a CTL instruction, as noted hereinbefore. A CTL' command signal from the output terminal of the inverter I311 in FIG. 19 is transmitted to AND-gates G238, G244, G245 and G239 in FIG. 20a to enable the flip-flops $OD_1$, $OD_2$, $OD_3$ and $OD_4$ to be set sequentially and thereby control the execution of the instruction in four steps.

During the first step, while the $OD_1$ flip-flop is set, the matrix translator and the row translator are disabled by having a control flip-flop EM (FIG. 24) reset by an NCD signal through an OR-gate G250 from one of the inverters I234 (FIG. 20a). The contact-pair selector, isolation switch and line switch (FIG. 26) are similarly disabled by resetting a control flip-flop F29 in response to the NCD signal. A control flip-flop F37 (FIG. 27) is similarly reset by the NCD signal to disable the subcontrol translator and a flip-flop F36 (FIG. 30) is similarly reset by the NCD signal to disable the attenuator, polarity and gain selectors.

The NCD signal is produced in response to a $\phi A'$ pulse applied to AND-gates G236 and G238 (FIG. 20a) associated with the $OD_1$ flip-flop. Only the AND-gate G238 is enabled for a CTL instruction, however, by a CTL' command signal so that the $\phi A'$ pulse is translated through it and an OR-gate G240 to the inverters I234 to provide the NCD signal. NCD is a mnemonic code for the phrase "new command," a phrase which has significance only with regard to CVT instructions as will be described hereinafter.

The NCD signal is transmitted through an inverter I230 to the steered input terminal of the buffer flip-flop $B_2$ to set it. At the same time, the $\phi A'$ pulse is applied to the flip-flop $B_1$ to reset it. After the buffer flip-flop $B_2$ is set, a $\phi B'$ pulse is transmitted through an AND-gate G233 to set the $OD_2$ flip-flop and reset the $OD_1$ flip-flop. The latter flip-flop is accomplished by a 0-volt signal translated through an OR-gate G235 into a +6-volt signal which is applied to the set-output terminal of the $OD_1$ flip-flop thereby forcing it into a reset state.

At the same time that the buffer flip-flop $B_2$ is set, the NCD signal is applied to an OR-gate G119 (FIG. 21) of the input-control section for the delay counter (FIG. 22) to initiate a 9.22 millisecond delay before the $OD_3$ flip-flop can be set. The purpose of that delay is to assure that all of the circuits disabled by the NCD signal, as described hereinbefore, have settled before the addressing portion of the instruction is decoded, a control or load device is selected, and the execution of the instruction is continued. The reason for such a relatively long period of delay is that a relay matrix is employed for selectively distributing a control signal to a device, the exact delay being determined by the drop-out time of the relays employed.

Once the flip-flop $OD_2$ is set, AND-gates G241 and G244 are partially enabled and when the 9.22 millisecond delay period initiated by the NCD signal has been completed, a DCP' signal from a flip-flop F8 in the delay counter (FIG. 23) is applied to both of the AND-gates G241 and G244 to further enable them. However, only the letter is completely enabled to transmit a $\phi A'$ signal since the CTL' command signal is only applied to one of its input terminals.

Upon the occurrence of the next $\phi A'$ pulse, a 0-volt signal is transmitted from an output terminal 244 of the AND-gate G244 through an OR-gate G231 to set the buffer flip-flop $B_3$. The output terminal 244 is connected to an input terminal of an OR-gate G120 in the input-control section of the delay counter (FIG. 21) so that as the buffer flip-flop $B_3$ is set, a 3.072 millisecond delay is initiated. That delay period is provided so that, when the flip-flop $OD_3$ is set by a $\phi B'$ pulse through an enabled AND-gate G234 and the flip-flop $OD_2$ is reset via an inverter I240, sufficient time is allowed to enable the contact pair selector, the isolation switch, the line switch and the subcontrol translator (FIGS. 26 and 27) before AND-gates G243 and G245 are enabled and execution of the instruction is continued. The contact pair selector, isolation switch and line switch are enabled by setting the flip-flop F29 through an OR-gate G366 (FIG. 26) which has an input terminal 244 connected to the AND-gate G244 (FIG. 20a). The subcontrol translator is similarly enabled by setting the flip-flop F37 (FIG. 27).

Figure 24:
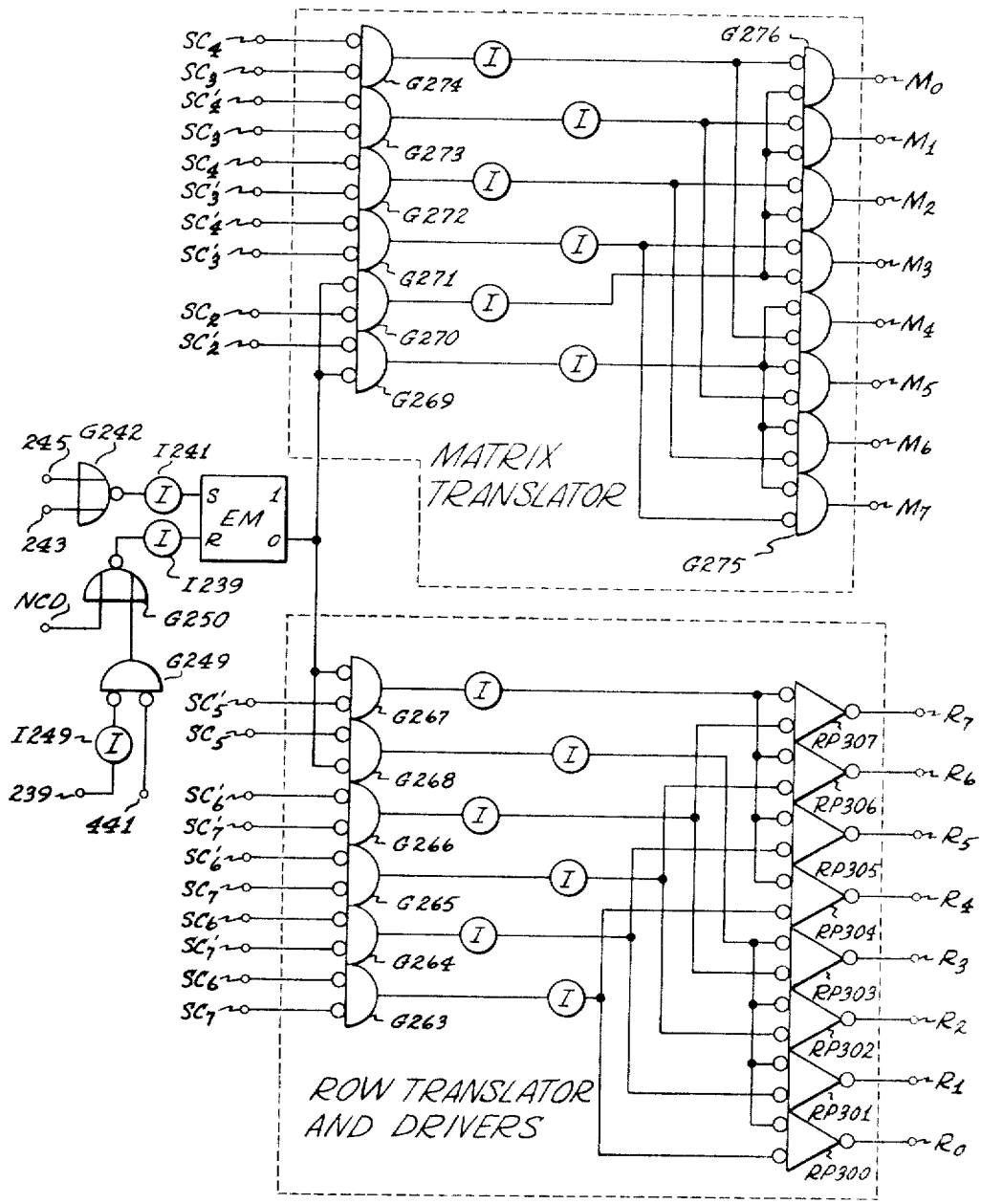
FIG. 24 illustrates a logic diagram of a row translator and drivers and of a matrix translator.

Upon completion of the 3.072 millisecond delay, a DCP' signal enables the AND-gates G243 and G245; but only the latter is completely enabled to transmit the next $\phi A'$ pulse through an OR-gate G221 to set the buffer flip-flop $B_4$ and to set a flip-flop EM (FIG. 24).

It should be noted that the column translator (FIG. 25) does not require an enabling signal in order to decode positions $SC_8$ to $SC_9$ of the instruction in the SC-register but that the column drivers associated with the matrix specified, such as the matrix 0, must be enabled by a signal from the matrix translator. For instance, when the EM flip-flop (FIG. 24) is set, the matrix translator decodes positions $SC_2$ to $SC_4$ of the instruction in the SC-register to provide a 0-volt signal at an output terminal of one of a plurality of AND-gates, such as an AND-gate G276. Assuming that the matrix 0 is to be selected, the AND-gate G276 transmits a 0-volt signal $M_0$ through a pair of inverters I273 and I274 to enable only the column drivers (FIG. 25) associated with the matrix 0.

Once the flip-flop $B_4$ is set, the next $\phi B'$ signal is transmitted through an enabled AND-gate G225 to reset the flip-flop $OD_3$ via an inverter I242 and to set the flip-flop $OD_4$. The flip-flop $OD_4$ remains set for a period specified by the binary configuration of the digital signals in positions $SC_{18}$ and $SC_{19}$ of the instruction in the SC-register. That period is initiated in response to a 0-volt signal from the output terminal 245 of the AND-gate G245 which is translated by an inverter I135 (FIG. 21) to enable a group of AND-gates G146 to G149 in the control-delay translator.

The control-delay translator includes a group of AND-gates G141 to G144 which decode positions $SC_{18}$ and $SC_{19}$ to determine the delay period specified by the instruction. In that manner, the relay selectively actuated remains energized until the delay counter (FIG. 23) has measured the delay period specified and produced a DCP' signal to enable AND-gates G230 and G239 (FIG. 20a). When a CTL instruction is being executed, only the AND-gate G239 is completely enabled to translate a $\phi A'$ signal to transmit a 0-volt signal present at an output terminal 239 through an OR-gate G251 and an inverter I237 (FIG. 20b) to set the operation-complete flip-flop OC. At the same time, the 0-volt signal at the output terminal 239 of the AND-gate G239 is transmitted through an inverter I249 and an AND-gate G249 (FIG. 24) to reset the flip-flop EM, thereby disabling the matrix translator and the row translator and drivers so that the relay selectively actuated in the matrix is de-energized. In that manner, when the instruction is completed, the flip-flop EM is reset and the $OD_4$ and OC flip-flops are set until another instruction is transferred into the SC-register for execution.

From the foregoing it may be seen that a full cycle of the operation-sequence-control section for a CTL instruction includes only four steps during which the successive flip-flops $OD_1$ to $OD_4$ are successively set. A fixed delay period of 9.22 milliseconds is provided for the second step while the $OD_2$ flip-flop is set. Similarly, a 3.072 millisecond delay period is provided while the flip-flop $OD_3$ is set. However, a programmed delay period is provided during which the actual operation specified is performed; namely, the application of a specified voltage through the transfer contact of a relay selectively actuated. The $OD_4$ flip-flop is not reset at the conclusion of that programmed period; but, as just noted, the EM flip-flop is reset thereby virtually terminating operation of the instruction. The $OD_4$ flip-flop is reset when execution of a new instruction is initiated.

The EM flip-flop may also be reset by an NCD signal when the flip-flop $OD_1$ is set during the initial step of the execution of a new instruction if it has not already been reset through the AND-gate G249 (FIG. 24). It sometimes is desirable to maintain the selectively actuated relay in the energized condition until execution of a new instruction is initiated. That may be accomplished under programmed control by providing a binary 11 configuration in position $SC_{18}$ and $SC_{19}$ of the CTL instruction currently being executed. When that binary configuration is decoded by the AND-gate G144 in the control-delay translator (FIG. 21), a 0-volt signal is present at an output terminal 441 which is connected to a control terminal of the AND-gate G249 (FIG. 24) so that it remains disabled when a 0-volt signal is present at the output terminal 239 of the AND-gate G239 (FIG. 20a). Thus, when the 11 binary configuration is present in positions $SC_{18}$ and $SC_{19}$ and the delay period of 15.36 milliseconds specified by that binary configuration has been completed, the flip-flop EM cannot be reset and the relay selectively actuated remains energized until an NCD signal resets it through the OR-gate G250.

*CVT instruction sequencing.*—If the new instruction transferred into the SC-register includes a binary digit 0 in the most significant position $SC_1$, the instruction is, as noted hereinbefore, a CVT instruction employed to scan an analog sensor having both of its terminals connected to a pair of contacts of a relay in one of the matrices, such as a pair of contacts associated with a relay K070 in the matrix 0 shown in FIG. 26, and to convert an analog signal therefrom into a group of digital signals representative of the value of the analog signal. A CVT' command signal from the output terminal of the inverter I312 or the inverter I313 (FIG. 19) is transmitted to AND-gates G237, G241, G243, G230, G246, G247 and G248 in FIGS. 20a and 20b to enable the flip-flops $OD_1$ to $OD_7$ to be set sequentially and thereby control the execution of a CVT instruction in seven steps.

During the first step, while the $OD_1$ flip-flop is set, the matrix translator and the row translator are disabled in the same manner as when the $OD_1$ flip-flop is set during the execution of a CTL instruction if the CVT instruction is a new instruction, since an AND-gate G236 is also connected to the inverter I312 or I313 (FIG. 19) and only the AND-gate G236 is completely enabled to transmit a $\phi A'$ signal due to a bit 0 present in position $SC_{14}$ of the instruction in the SC-register. If the CVT instruction to be executed is the same as its immediately preceding instruction, a bit 1 in position $SC_{14}$ is provided by the programmer so that only the AND-gate G237 is enabled instead. The AND-gate G237 translates a $\phi A'$ signal into an old-command signal OCD at its output terminal which is also identified by the mnemonic code characters OCD.

The OCD signal is transmitted through an OR-gate G223 (FIG. 20b) to set the buffer flip-flop $B_6$ directly, thereby skipping from the first step to the sixth step of the normal sequence for a CVT instruction. At the same time, the OCD signal resets the analog-to-digital converter as described in more detail hereinafter so that conversion of an analog signal may be initiated immediately after the flip-flop $OD_6$ is set and flip-flop $OD_1$ is reset. The steps sequenced by the intervening flip-flops $OD_2$ to $OD_5$ are only required to selectively couple an analog signal source to the analog-to-digital converter and to select the appropriate attenuation, polarity and gain to be employed in the signal-conditioning channel as described in detail hereinafter with reference to FIGS. 29 to 32. Thus, by designating whether a given CVT instruction is the same as the immediately preceding CVT instruction executed, a considerable saving in time may be achieved.

Assuming that the current CVT instruction to be executed is a new instruction, upon the occurrence of a $\phi A'$ pulse the buffer flip-flop $B_2$ is set as the matrix translator and the row translator are disabled as noted hereinbefore. Following that, a $\phi B'$ signal sets the flip-flop $OD_2$ and resets the flip-flop $OD_1$ thereby enabling the AND-gate G241 to transmit a $\phi A'$ pulse after the delay of 9.22 milliseconds initiated by the $OD_1$ stage has been completed.

When a $\phi A'$ pulse occurs, after the $OD_2$ flip-flop is set and a DCP' signal is present, a 0-volt signal from the output terminal 241 of the AND-gate G241 applied to the OR-gate G366 (FIG. 26) enables the contact pair selector and isolation switch by setting the flip-flop F29 in the same manner as described hereinbefore with reference to a CTL instruction. A 0-volt signal at the output terminal 241 also sets a flip-flop F36 (FIG. 30) to enable the selection of specified attenuator and gain-selector relays and to selectively energize a polarity selector relay, thereby selecting the appropriate signal-conditioning-channel setting specified by the instruction. In addition, the 0-volt signal at the terminal 241 initiates a 3.072 microsecond delay through an OR-gate G120 (FIG. 21) in a manner similar to that described with reference to the execution of a CTL instruction.

The 0-volt signal at the output terminal 241 is translated by an OR-gate G231 to set the buffer flip-flop $B_3$. Upon the occurrence of the next $\phi B'$ pulse, the AND-gate G234 is enabled to reset the flip-flop $OD_2$ and to set the flip-flop $OD_3$. Upon the completion of the 3.072 microsecond delay initiated by a $\phi A'$ signal translated through the AND-gate G241, a $\phi A'$ signal is translated through the AND-gate 243 to set the buffer flip-flop $B_4$ through an OR-gate G221 and to enable the matrix translator and the row translator and drivers by setting the flip-flop EM (FIG. 24) through the OR-gate G242. At the same time a second 3.072 microsecond delay period is initiated through the OR-gate G120 (FIG. 21) to allow time for the relay-selecting circuits associated with the matrix translator and row translator and drivers to settle. Following that, a $\phi B'$ pulse sets the flip-flop $OD_4$ through the AND-gate G225 and resets the flip-flop $OD_3$ through the inverter I242.

While the flip-flop $OD_4$ is set, the AND-gate G230 is enabled to transmit the next $\phi A'$ pulse to occur after a DCP' signal is received at the conclusion of the 3.072 millisecond delay period. That $\phi A'$ signal is transmitted by an inverter I222 to set the buffer flip-flop $B_5$. It also is transmitted to the delay-counter input control section (FIG. 21) in initiate a 46.08 millisecond relay period. That relatively long period of delay is provided in order to allow sufficient time for switching transients in the analog amplifier to settle.

The next $\phi B'$ signal to occur after the buffer flip-flop $B_5$ is set is transmitted through an enabled AND-gate G226 to reset the flip-flop $OD_4$ and to set the flip-flop $OD_5$. While that flip-flop is set, the AND-gate G246 is enabled to transmit the next $\phi A'$ pulse after a DCP' signal is received at the conclusion of the 46.08 millisecond period of delay. The transmitted $\phi A'$ pulse sets the buffer flip-flop $B_6$ through an OR-gate G223 and provides a 0-volt signal to initiate conversion of the analog signal to a group of digital signals by setting a flip-flop F23 (FIG. 33). The terminal 247 which connects the AND-gate G247 (FIG. 20b) to the flip-flop F23 is also connected to the set-input terminal of the most significant stage of a C-register. Following that, conversion of the analog signal into a group of binary-coded digital signals representing a numerical value of the analog signal is accomplished automatically in response to eleven successive $T_{23}'$ signals from a counter illustrated in FIG. 22. Conversion is complete after approximately 6.3 milliseconds.

At the same time that analog-to-digital conversion is initiated, the buffer flip-flop $B_7$ is set through an inverter I224. Following that, the next $\phi B'$ pulse sets the flip-flop $OD_7$ through an AND-gate G228. The flip-flop $OD_7$ remains set until the analog-to-digital conversion is complete, at which time a +6-volt signal is applied to an input terminal 250 of the AND-gate G248 (FIG. 20b) from the analog-to-digital converter to set the OC flip-flop via the OR-gate G251 and inverter I237. The operation-complete signal OC' from the false output terminal of the flip-flop OC is then transmitted to the digital computer to enable a branch instruction to introduce a sequence of instructions for reading the output of the converter into the A-register and storing or otherwise processing the information.

As noted hereinbefore, if the next instruction to be executed by the scanner-distributor is a CVT instruction for converting an analog signal from the same source as the previous instruction to a group of digital signals, a bit 1 is written in position $SC_{14}$ to enable only the AND-gate G237 so that the flip-flop $OD_6$ is set next in sequence after the flip-flop $OD_1$ thereby directly reinitiating the digital-to-analog conversion without cycling through the intermediate steps controlled by the flip-flops $OD_2$ to $OD_5$. As soon as conversion is complete, the flip-flop OC is set in the same manner as before.

Figure 23:
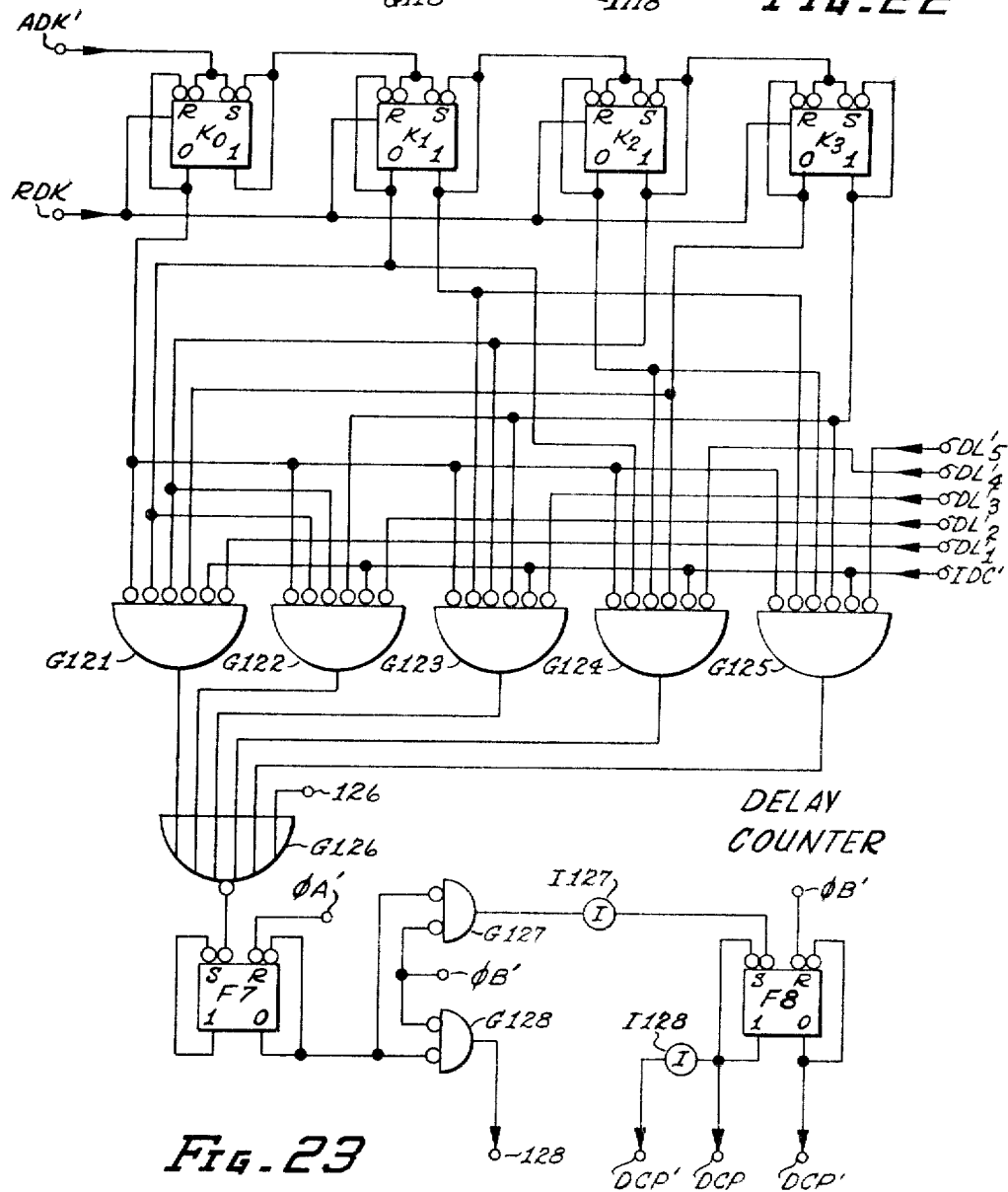
FIG. 23 illustrates a logic diagram of a delay counter.

*Delay counter and control.*—The delay counter illustrated in FIG. 23 comprises four steered flip-flops $K_0$ to $K_3$ connected in cascade and a group of AND-gates G121 to G125 employed to decode predetermined binary numbers. As such the delay counter functions as a digital clock to measure periods of time by counting ADK' signals generated by the delay counter input control section illustrated in FIG. 21 at the rate of one ADK' signal either every 3.07 milliseconds or 6.14 milliseconds as will be explained.

The longest period to be measured in the illustrated embodiment of the present invention is 67.6 milliseconds. For measuring that period, ADK' pulses generated every 6.14 milliseconds is employed to drive the delay counter. An AND-gate G121 is employed to detect a binary count of eleven by detecting the presence of the binary configuration 1011 in the counter, the least significant bit being in the stage $K_0$. The AND-gate G121 includes two additional input terminals, both being connected to the input-control section (FIG. 21) of the delay counter, one terminal $DL_1'$ being employed to enable the AND-gate G121 only when a 67.6 millisecond delay period is to be measured. The IDC' terminal is employed to provide an interrogating signal to determine when the delay is complete.

The AND-gates G122 to G125 are connected to input terminals $DL_2'$ to $DL_5'$, respectively, and to the terminal IDC' to decode other binary configurations of the delay counter for other specified periods of delay. It should be noted that all of the gates G121 to G125 may be connected to the flip-flops $K_0$ to $K_3$ of the delay counter in other configurations to decode other binary numbers for any desired measure of elapsed time. The gates G122 and G125 are connected in the present embodiment for the measurement of the elapsed times of 9.22 milliseconds, 3.072 milliseconds, 46.08 milliseconds and 15.36 milliseconds, respectively.

When a specified count has been detected by a given AND-gate enabled by one of the input signals $DL_1'$ to $DL_5'$, an IDC' signal is translated through an OR-gate G126 to set a flip-flop F7. The IDC' signal occurs substantially in time coincidence with a $\phi A'$ timing signal so that the flip-flop F7 remains set for a period between two $\phi A'$ pulses after which it is reset. In the intervening period a $\phi B'$ pulse is translated by AND-gates G127 and G128. The output terminal 128 of the AND-gate G128 is connected to the delay counter input control section (FIG. 21) so that when a $\phi B'$ pulse is translated, the delay-counter input-control section is reset.

The output of the AND-gate G127 is translated through an inverter I127 to set a flip-flop F8 in substantial time coincidence wtih a $\phi B'$ pulse. Thereafter, the flip-flop F8 is reset by a $\phi B'$ pulse. The output signals DCP and DCP' of the set flip-flop F8 are employed to allow the operation-sequence-control section to be advanced by a $\phi A'$ pulse from one step to the next and to reset a counter (FIG. 22) through an OR-gate G118 and inverters I118 and I121. That counter is employed as a frequency divider to derive $T_{23}'$, $T_{25}'$, and $T_{26}'$ pulses from $L_{23}'$ pulses. It comprises a binary counter having seven flip-flops $T_{21}$ to $T_{27}$ connected in cascade. The $L_{23}'$ pulses from the bit-timing ring counter (FIG. 16) occur at the end of each word time of the digital computer as described hereinbefore so that the counter is advanced every 96 microseconds. The $T_{23}'$ pulses derived from the third flip-flop $T_{23}$ which occur every 576 microseconds are employed to time the sequence of operations of the analog-to-digital converter (FIG. 33). The $T_{25}'$ pulses derived from the fifth flip-flop $T_{25}$ occur every 3.072 milliseconds and the $T_{26}'$ pulses derived from the sixth flip-flop $T_{26}$ occur every 6.144 milliseconds.

The $T_{25}'$ pulses are employed in the delay-counter input-control section (FIG. 21) to generate ADK' pulses which occur every 3.072 milliseconds when any one of a plurality of flip-flops $DL_2$ to $DL_5$ is set. That is accomplished by allowing a flip-flop F6 to be continually set by $T_{25}'$ pulses and reset by $\phi A'$ pulses. When the flip-flop F6 is reset, a positive-going (0 to +6 volts) signal from its true output terminal sets a flip-flop F5 which is subsequently reset by the next $\phi A'$ pulse. While the flip-flop F5 is set, an AND-gate G116 is enabled to translate an intervening $\phi B'$ pulse through an inverter I116 as an ADK' pulse. Thus, the time between ADK' pulses generated while any one of the flip-flops $DL_2$ to $DL_5$ is set is 3.072 milliseconds.

When a $DL_1$ flip-flop is set, the AND-gate G103 is disabled and an AND-gate G104 is enabled to transmit a $T_{26}'$ pulse through the OR-gate G102 to set the flip-flop F6 once every 6.144 milliseconds. In that manner, $\phi B'$ pulses are translated by the AND-gate G116 and the inverter I116 as ADK' pulses which occur at 6.144 millisecond intervals. As noted hereinbefore, the $T_{26}'$ pulses are employed to derive ADK' pulses only for measuring a 67.6 millisecond delay period.

Each ADK' pulse sets a flip-flop F4 in substantial time coincidence with the $\phi B'$ pulse. The next $\phi B'$ pulse resets flip-flop F4. In the intervening period, an AND-gate G114 is enabled to translate a $\phi A'$ pulse through an inverter I114 into an IDC' pulse which is applied to the AND-gates G121 to G125 (FIG. 23) in order to interrogate or test for completion of a specified delay period each time the delay counter is advanced by an ADK' pulse. When a delay period being measured is complete, a 0-volt signal at an output terminal 128 of the delay counter resets the control flip-flops $DL_1$ to $DL_5$.

Some delays are specified and initiated automatically by the operation-sequence-control section as noted hereinbefore. The first of those delays to occur during the execution of a given instruction is initiated by an NCD signal from the first stage $OD_1$ of the instructions sequencing section if the instruction to be executed is a new instruction as defined hereinbefore. The NCD signal sets the flip-flop $DL_2$ through the AND-gate G119 and an inverter I119 and, through an OR-gate G117 and an inverter I117, resets the delay counter flip-flop $K_0$ to $K_3$ (FIG. 23). The period of delay associated with the flip-flop $DL_2$ is 9.22 milliseconds.

Figure 21:
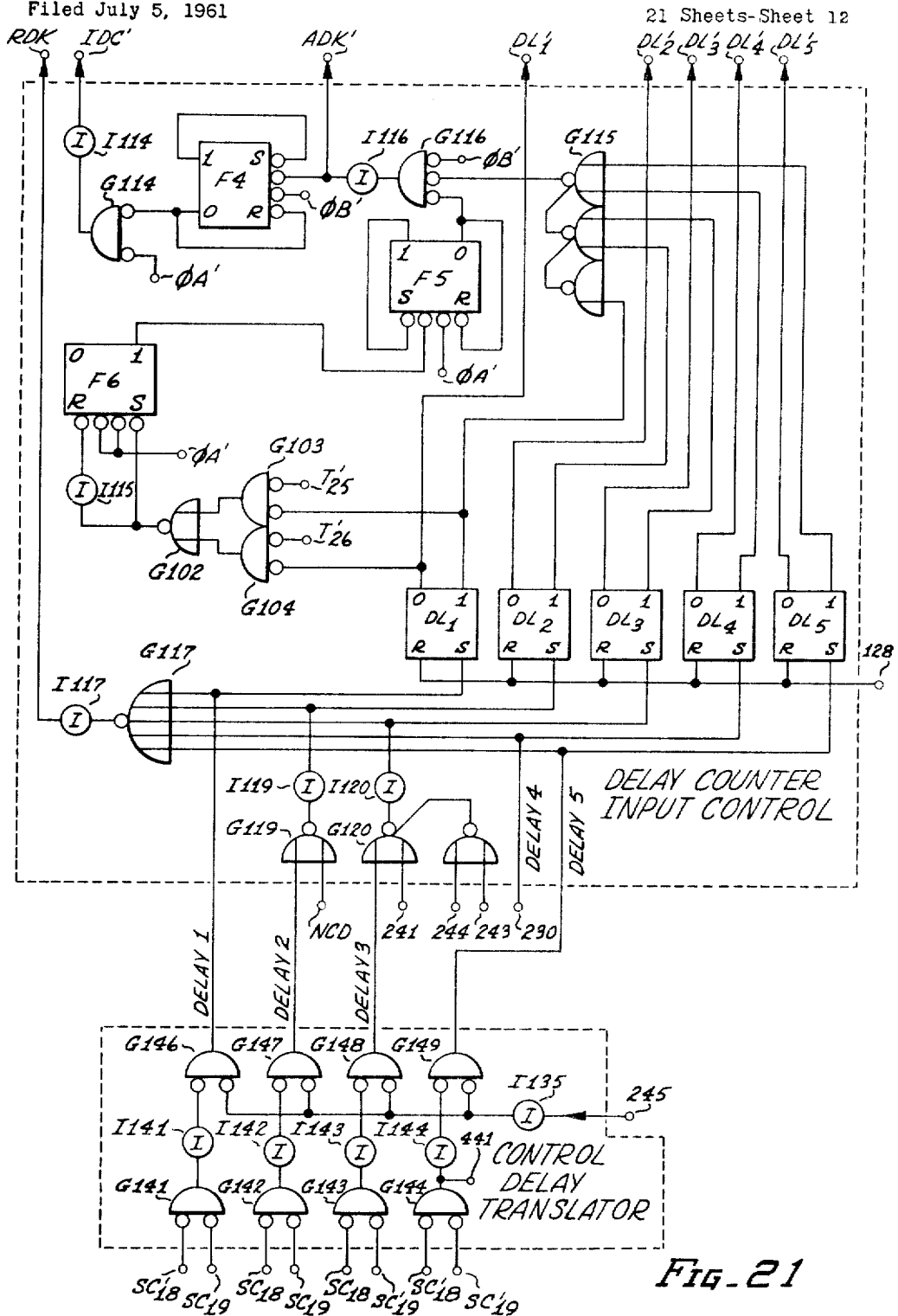
FIG. 21 illustrates a logic diagram of a control-delay-translator section and of a delay-counter-input-control section.
Figure 22:
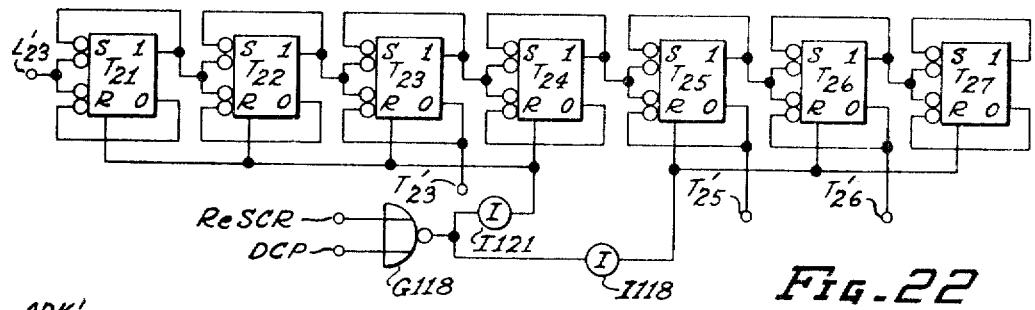
FIG. 22 illustrates a logic diagram of a timing pulse generator for a delay counter.

The next period of delay initiated during the execution of a given instruction is controlled by the second stage $OD_2$ of the instruction sequencing section (FIG. 20a) through the OR-gate G120 and an inverter I120 connected to the set input terminal of the flip-flop $DL_3$ (FIG. 21). The delay period associated with the flip-flop $DL_3$ is 3.07 milliseconds. If the instruction is a CVT instruction, a 3.07 millisecond delay is initiated by a 0-volt signal from the third stage $OD_3$ which is applied to an input terminal 243 of the OR-gate G120.

If the instruction being executed is a CTL instruction, a programed delay period is initiated by the third stage $OD_3$ in response to a 0-volt signal applied to an input terminal 245 which is translated to a +6-volt signal by an inverter I135 to enable a plurality of AND-gates G146 to G149 that are coupled by inverters I141 to I144 to respective AND-gates G141 to G144. The AND-gates G141 to G144 are connected to the flip-flops $SC_{18}$ and $SC_{19}$ of the SC-register in order to decode the configuration of the binary digits in those flip-flops which specify one of four programmed delay periods that are controlled by the flip-flops $DL_1$, $DL_2$, $DL_3$ and $DL_5$.

If a programmed delay associated with the flip-flop $DL_5$ is specified by a CTL instruction, the AND-gate G144 provides a 0-volt signal at an output terminal 141 which is connected to the AND-gate G249 (FIG. 24) in order to inhibit the flip-flop EM from being reset in response to a 0-volt signal at a terminal 239 connected to the AND-gate G239 of the fourth stage $OD_4$ in the instruction sequencing section (FIG. 20a). In that manner a relay selected through the matrix is not de-energized at the time that the operation is complete and the flip-flop OC is set but remains energized until the next instruction is transferred into the SC-register, thereby making available an indefinite period of delay for a subcontrol operation to be used as required under programmed control.

From the foregoing it may be seen that delay periods are automatically allowed for activation and de-activation of relays as determined by the operation-sequence-control section and to allow for programmed delay periods for subcontrol operation as determined by positions $SC_{18}$ and $SC_{19}$ of a CTL instruction. The delay periods illustrated in the present embodiment may be changed for different applications of the invention and a greater selection of delay periods for subcontrol operations under programmed control may be provided by providing a greater number of AND-gates than is illustrated (AND-gates G121 to G125 of FIG. 23) and by further providing additional control flip-flops, such as the flip-flops $DL_1$ to $DL_5$. However, additional positions in the instructions must be provided if more than four distinct delay periods are to be provided under programmed control. The manner in which the delay counter, the delay counter input control and the control delay translator may be expanded for a greater number of delay periods to be selectively provided under programmed control is obvious from the disclosure of the present embodiment of the invention.

*Relay selection.*—Positions $SC_2$ to $SC_{10}$ of a CVT or CTL instruction are employed to selectively energize a specified relay in a specified matrix. The first three positions $SC_2$ to $SC_4$ of the SC-register are connected to decoding AND-gates G269 to G274 in FIG. 24 to select one of eight possible matrices. For instance, if the matrix 0 is specified, a bit 0 is present in positions $SC_2$ to $SC_4$ of the instruction to enable an AND-gate G276 the output of which provides an output signal $M_0$. Position $SC_2$ is decoded by AND-gates G269 and G270 which are enabled only when the flip-flop EM is set. Accordingly, the matrix translator is enabled to select a matrix only when the EM flip-flop is set. The output signal of the matrix translator, such as the signal $M_0$ in the foregoing instruction, is applied to the column drivers associated with the specified matrix, such as the column drivers CD308 to CD315 in FIG. 25 associated with the matrix 0.

Positions $SC_5$ to $SC_7$ of the SC-register are employed to select a specified row of a selected matrix in which the particular relay to be energized is located. AND-gates G263 to G267 are connected to flip-flops $SC_5$ to $SC_7$ to enable one of a group of relay pullers RP300 to RP307 as specified by the binary configuration of the digital signals stored in the flip-flops $SC_5$ to $SC_7$. Only the relay puller associated with the specified row is enabled to transmit a +6 volts. The remaining relay pullers continue to transmit a −18-volt signal, as described heerinbefore with reference to FIG. 8. It should be noted that the puller of the relay to be selectively energized is enabled to transmit a +6-volt signal only when the appropriate one of the AND-gates G267 and G268 is enabled by the flip-flop EM upon being set in a manner similar to the way matrix selection is controlled.

Figure 25:
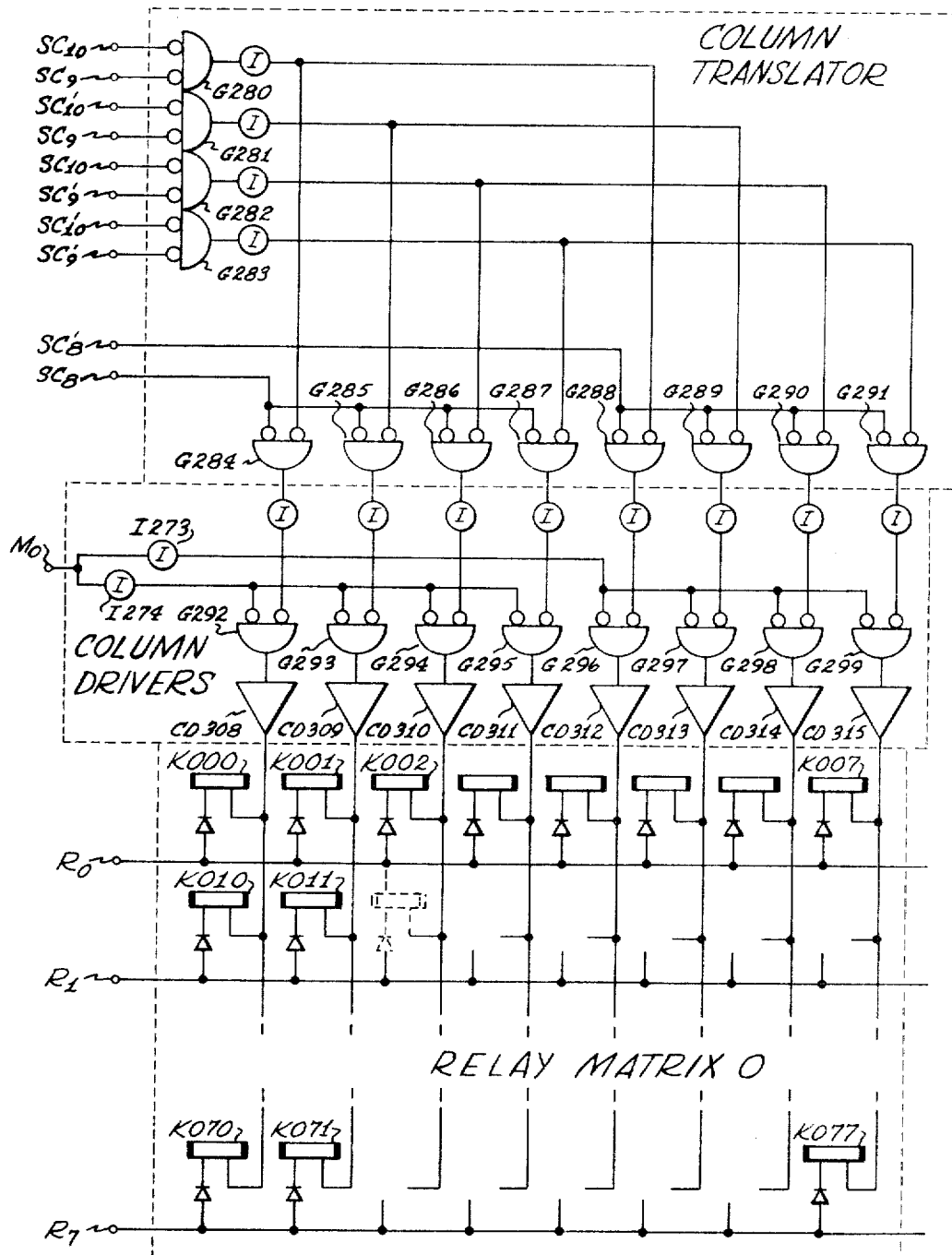
FIG. 25 illustrates a logic diagram of a column translator, column drivers, and a relay matrix.

To complete selection of a specified relay, positions $SC_8$ to $SC_{10}$ are decoded by AND-gates G280 to G291 in the column translator illustrated in FIG. 25. Only one of the AND-gates G284 to G291 is enabled at a time in accordance with the binary configuration of the digital signals in the flip-flops $SC_8$ to $SC_{10}$. The output terminals of AND-gates G284 to G291 are connected to the column drivers of all the relay matrices, such as the column drivers of the relay matrix 0. However, only the column drivers of the matrix specified by positions $SC_2$ to $SC_4$ of the instruction are energized.

The column drivers associated with the column specified by positions $SC_8$ to $SC_{10}$ of the instruction transmits a negative 18-volt signal to the associated relays. For instance, if a relay K077 in the last row and column of the matrix 0 is to be selectively energized, a bit 1 present in each of the flip-flops $SC_5$ to $SC_{10}$ enables the AND-gate G299 to transmit a 0-volt signal to the column driver CD315 which is responsive to a 0-volt signal to transmit a negative 18-volt signal while the remaining column drivers CD308 to CD314 continue to transmit a +6-volt signal. A bit 1 in positions $SC_5$ to $SC_7$ enables the relay puller RP307 (FIG. 24) to transmit a +6-volt signal to the last row of the matrix 0 while the remaining relay pullers RP300 to RP306 continue to transmit a negative 18-volt signal. In that manner, only the relay K077 is energized, diodes in series with each of the remaining relays being reverse biased to prevent energizing current from flowing through them.

*Subcontrol translation and operation.*—If the instruction currently being executed is a CTL instruction as specified by the presence of a bit 1 in position $SC_1$ of the instruction, a subcontrol translator illustrated in FIG. 27 is enabled when a 0-volt signal from the output terminal 244 of the AND-gate G244 (FIG. 20a) controlled by the second stage $OD_2$ of the operation-sequence-control section sets a flip-flop F37 (FIG. 27).

The subcontrol translator decodes the binary configuration of positions $SC_{14}$ to $SC_{17}$ of the instruction to selectively energize one of a plurality of relays K15 to K19 through relay pullers RP284 to RP288, thereby selectively connecting a specified voltage source to a terminal 300. FIG. 28 is a chart illustrating the manner in which positions $SC_{14}$ and $SC_{15}$ are decoded to selectively energize relays $K_{15}$ to $K_{19}$. For illustrative purposes, voltage sources of $-24$ volts, $+12$ volts, $+48$ volts, and $-48$ volts, are connected to a contact of the respective relays K15, K16, K17 and K18. The remaining relay K19 may be similarly connected to any desired voltage source.

The terminal 300 is connected to transfer contacts $K5_a$ and $K6_a$ (FIG. 26) of the line switch which is controlled by the binary configuration of positions $SC_1$ and $SC_{13}$. The line switch is not operative to connect the terminal 300 to a line 313 or a line 314 unless a position $SC_1$ contains a bit 1 specifying that the instruction being executed is a CTL instruction to enable a pair of AND-gates G365 and G364. If a CTL instruction is being executed, and position $SC_{13}$ of the instruction is a bit 1, only the AND-gate G364 is enabled. Conversely, if a bit 0 is present in position $SC_{13}$, only the AND-gate G365 is enabled in which case a relay puller RP276 is enabled to energize a relay K5 instead of a relay puller RP277 which is connected to a relay K6. When the relay K5 is energized, the terminal 300 is connected to the line 313 through the transfer contact $K5_a$.

The line 313 is connected to transfer contacts $K1_c$, $K2_c$ and $K3_c$ while line 314 is connected to transfer contacts $K1_d$, $K2_d$ and $K3_d$ of three pairs of high-level pair-selector contacts. Contact pair-selector relays K1, K2 and K3 are selectively energized by respective relay pullers RP272, RP273 and RP274 under the control of the positions $SC_{11}$ and $SC_{12}$ of the instruction through decoding AND-gates G357 to G359 when a flip-flop F29 is set in response to a 0-volt signal at the terminal 244 connected to the AND-gate G244 (FIG. 28) associated with the second stage $OD_2$ of the operation-instruction-sequencing section. For example, if a bit 1 is present in both positions $SC_{11}$ and $SC_{12}$, only the relay K3 is energized thereby closing transfer contacts $K3_a$, $K3_b$, $K3_c$ and $K3_d$. The transfer contacts $K3_a$ and $K3_b$ are grouped with low-level pair-selector contacts used for the execution of CVT instructions. If only K5 is energized in the present example, so that only the transfer contact $K3_c$ of the two closed transfer contacts $K3_c$ and $K3_d$ is connected to the terminal 300 through the closed transfer contact $K5_a$. Assuming that the relay K007 had been selectively energized in the matrix 0, six transfer contacts associated with the relay K007 would be closed, but only one output terminal 371 would be connected to the terminal 300. In that manner, a specified voltage source is selectively connected to a load or control device connected to the terminal 371. To further illustrate the role of the contact pair-selector, assume that only the relay K1 is energized by a binary configuration 01 in the flip-flops $SC_{11}$ and $SC_{12}$; then only the transfer contacts $K1_a$, $K1_b$, $K1_c$ and $K1_d$, would be closed. If the relay K077 has been selectively energized, a load 312 is connected to the terminal 300 in order that a specified voltage may be applied thereto.

If an instruction being executed is a CVT instruction, neither relay K5 nor K6 is energized so that the terminal 300 is not connected to either one of the lines 313 or 314 to distribute a voltage signal to a specified load or control device.

The contact pair selector is operated for CVT instructions just as for CTL instructions when the flip-flop F29 is set in response to a 0-volt signal at the terminal 241 connected to the AND-gate G241 (FIG. 20a) associated with the second stage $OD_2$ of the operation-sequence-control section in order that a selected pair of transfer contacts associated with a selectively energized relay may be connected to a pair of lines 311 and 312. For instance, assuming that the relay K070 and the relay K1 have been selectively energized, the six transfer contacts associated in pairs with the relay K070 are closed and the transfer contacts $K1_a$ and $K1_b$ are closed, thereby connecting an analog signal source such as a thermocouple 373 to the lines 311 and 312. In that manner, the transfer contacts of the relays are associated in pairs in order that analog signal sources may be connected to lines 311 and 312 for the execution of a CVT instruction and that the line switch is employed to selectively connect only one of a pair of lines to the terminal 300 for the execution of a CTL instruction.

Output terminals 301 and 302 in the lines 311 and 312 are connected to the analog conditioning channel which includes an analog amplifier. Separating the lines 311 and 312 from the lines 313 and 314 is the isolation switch which is always open during the execution of a CTL instruction in order to prevent a high-voltage source from being connected to the analog amplifier. It is for that reason that the transfer contacts of a given relay matrix, such as the matrix 0, are separated into two groups of high- and low-level pairs. It should be noted that every matrix is connected to the high- and low-level pair-selector contacts, such as the transfer contact $K1_a$, in the same manner as the relay matrix 0 illustrated. The connections to the other relay matrices is suggested by the dotted lines connected to the low- and high-level pair-selector contacts, such as the dotted lines connected to a junction 374.

If a CVT instruction is being executed as specified by a bit 0 in position $SC_1$ of the SC-register, the AND-gate G362 is held disabled but an AND-gate G361 may be enabled if a bit 1 is present in position $SC_{13}$ of the SC-register. If so, a relay puller RP275 is enabled to energize a relay K4 via an OR-gate G363 to close the transfer contacts thereof and thereby connect the high-level pair-selector contacts to the lines 311 and 312 in order that an analog signal source connected to a pair of contacts in a group of high-level signal pairs may be connected to the analog amplifier. In that manner, some of the pairs in a group of high-level pairs of transfer contacts may be employed to connect analog signal sources to the analog amplifier; but, it should be noted that all of the pairs in the groups of low-level pairs must be employed only for connecting analog signal sources to the analog amplifier.

The second type of CTL instructions employed to distribute an analog signal to a specified load or control device, such as a load 211 illustrated in FIG. 34, through a digital-to-analog converter, such as a digital-to-analog converter DA201 associated with the load 211 executed by selectively energizing the relay K15 (FIG. 27) when the binary configuration of the instruction includes a bit 0 in each of the positions $SC_{14}$ to $SC_{17}$ in order that only the relay puller RP284 may be enabled. At the same time that the relay puller RP284 is enabled, an AND-gate G397 is enabled to transmit a +6-volt signal via a pair of inverters I304 and I305 to relay pullers RP201 to RP210 (FIG. 34) thereby enabling the relay pullers to energize associated relays K211 to K220 in accordance with the binary configuration of a group of digital signals in positions $C_{10}$ to $C_{19}$ of the C-register included in the analog-to-digital converter (FIG. 33), thereby translating the group of digital signals to a group of digital-to-analog converters DA201 to DA203 in FIG. 34. Control terminals 201, 202 and 203 of the respective digital-to-analog converters DA201, DA202 and DA203 are connected to relay contacts of pairs associated with the high-level pair-selector contacts illustrated in FIG. 26.

An example will best serve to illustrate the manner in which a CTL instruction of the second type is executed. Assume that the address portion of the CTL instruction specifies that the relay K007 (FIG. 26) is to be selectively energized and that a bit 1 in position $SC_{13}$ enables the relay K6 to be energized. When the relay K16 (FIG. 27) is energized, and a source of −24 volts is connected to the terminal 300, a 24-volt signal is transmitted through the line 314 to only the digital-to-analog converter DA201, thereby enabling only that digital-to-analog converter to receive the group of digital signals from the C-register for conversion to an analog signal to be applied to the load 211.

It should be noted with reference to FIG. 28 that only five of the sixteen possible codes have been utilized to selectively energize one of five relays K5 to K19. The remaining eleven codes not used could be employed for selectively energizing additional relays as required. The subcontrol translator illustrated in FIG. 27 suggests the manner in which additional relays may be provided.

*Analog signal conditioning.*—The analog signal-conditioning channel illustrated in FIG. 29 has three functions: It amplifies the input analog signal to a fixed full-scale output for subsequent conversion to a binary-coded group of digital signals; it provides isolation by converting a two-lead input signal to a single-lead output signal in order that the reference potential or ground of the scanner-distributor need not be maintained at the same reference potential as for the analog signal sources; and it provides high-frequency filtering. It includes an attenuator, a polarity selector and an analog amplifier with selective gain.

The analog amplifier includes the combination of a D.C. preamplifier 306, an integrator comprising an operational amplifier 309 and negative feedback capacitor $C_1$, and a negative feedback circuit including a selective gain changer comprising resistors $R_1$ to $R_6$ and a D.C. transformer comprising capacitors $C_5$ and $C_6$ and resistors $R_8$ and $R_9$. The attenuator precedes the polarity selector and the analog amplifier. It comprises relays K7 to K10 and the polarity selector comprises a relay K11. Control relays K12 to K14 selectively alter the gain changer in the negative feedback circuit of the analog amplifier.

Positions $SC_{15}$ and $SC_{16}$ of a CVT instruction are employed to specify the attenuation to be provided. An AND-gate G382 and relay pullers RP278 to RP280 illustrated in FIG. 30 are employed to decode the binary configuration of bit position $SC_{15}$ and $SC_{16}$ and to energize the relays K7 to K10 according to a table illustrated in FIG. 32.

The gain to be provided by the analog amplifier is specified by positions $SC_{17}$ and $SC_{18}$ of a CVT instruction. Gates G300 and G301 and relay pullers RP291 and RP293 are employed to decode the binary configuration of positions $SC_{17}$ and $SC_{18}$ to energize the relays K12 to K14 in accordance with the table illustrated in FIG. 31.

In order that one analog amplifier designed for signals of a given polarity may be employed for all analog signal sources, a relay switch is provided to switch the input leads to the analog amplifier and thereby select the polarity of the analog signal to be amplified. Position $SC_{19}$ of the instruction specifies the polarity. When a bit 1 is present in that position, a relay puller RP298 (FIG. 30) energizes the relay K11 (FIG. 29).

Decoding of bit positions $SC_{15}$ to $SC_{19}$ and selective energization of relays K7 to K14 is accomplished when a flip-flop F36 (FIG. 30) is set by a 0-volt signal from the AND-gate G241 (FIG. 20a) controlled by the second stage $OD_2$ of the operation-sequence-control section. The flip-flop F36 remains set until a CTL instruction or a new CVT instruction is transferred into the SCR-register. As noted hereinbefore, bit position $SC_{14}$ of a CVT instruction specifies whether a given instruction is new or old; a new instruction includes a bit 0 in position $SC_{14}$ and an old instruction includes a bit 1 in that position. Thus, when the program of instructions is to be executed by the scanner-distributor is prepared and stored in the digital computer, instructions to successively scan a given analog signal source may be provided with a considerable saving in time by inserting a bit 1 in position $SC_{14}$ to cause the flip-flop F36 to remain set during the execution of the successive instructions to scan the same analog signal source and to cause the operation-sequence-control section to jump from the step controlled by the flip-flop $OD_2$ to the step of initiating conversion of the analog signal to a group of digital signals under the control of the flip-flop $OD_6$.

The attenuator is a digitally controlled voltage-dividing circuit consisting of resistors $R_{11}$ to $R_{19}$. When all of the relays are de-energized, maximum attenuation is achieved. When the relay K7 is energized, the resistors $R_{13}$, $R_{14}$ and $R_{15}$ are effectively removed from the circuit thereby decreasing the attenuation by an amount determined by their resistance value. That is accomplished by providing the binary configuration 01 in the positions $SC_{15}$ and $SC_{16}$. When only the relay K8 is energized, the resistors $R_{13}$ to $R_{18}$ are effectively removed from the circuit leaving only resistors $R_{11}$, $R_{12}$ and $R_{19}$. That is accomplished by providing the binary configuration 10 in positions $SC_5$ and $SC_{16}$. When all of the relays K7 to K10 are energized, all of the resistors $R_{11}$ to $R_{19}$ are effectively removed from the circuit. The resistors $R_{11}$, $R_{12}$, $R_{13}$, $R_{14}$, $R_{17}$ and $R_{18}$ each have equal value of 50K ohms to provide four predetermined signal attenuations but other resistance values may be employed. Each pair of resistors $R_{11}$, $R_{12}$, $R_{13}$, $R_{14}$; and $R_{17}$, $R_{18}$ comprise a matched pair of resistors. The resistors $R_{15}$, $R_{16}$ and $R_{19}$ are selected to have resistance values of approximately 6.7K, 7K and 10K ohms, respectively.

The attenuator reduces the amplitude of incoming analog signals to less than 80 millivolt maximum full scale. With all of the relays de-energized, the attenuator provides an attenuation of 3,200 to 1. When all of the relays are energized, the attenuation is reduced to a ratio of 1:1. With only the relay K7 or K8 energized, the attenuation is decreased to ratios of 200:1 or 12.5:1.

The analog amplifier with selective gain is described more fully in a United States patent application Ser. No. 109,605 filed by Frank J. Woolam on May 2, 1961, and assigned to the assignee of the present patent application. For the purpose of understanding the present invention it is sufficient to understand the operation of the analog amplifier from the following description: The D.C. preamplifier 306 is a low-level differential amplifier of the modulated carrier-type having a transformer coupling the synchronous vibrator employed to modulate the D.C. signal by a 375 c.p.s. alternating signal to an A.C. amplifier. The amount of the A.C. amplifier is transformer-coupled to a demodulator synchronized with the synchronous vibrator to provide a signal as the output of the D.C. amplifier 306 which is directly connected to the input of the operational amplifier 309 having a negative feedback capacitor $C_1$ for integration.

The negative feedback circuit of the analog amplifier comprises a voltage-dividing resistor network including the relay-control resistors $R_2$, $R_3$ and $R_4$ which may be selectively switched from a parallel connection with the resistors $R_5$ and $R_6$, across which the feedback signal is derived, to a parallel connection with the resistor $R_1$ such that the feedback signal is given by the following equation:

$$E_F = E_O R_E \left[ \frac{1}{R_2} + \frac{1}{R_3} + \frac{1}{R_4} + \frac{1}{R_5} + \frac{1}{R_6} \right]$$

where $E_O$ is the analog amplifier output signal at an output terminal 303 and $R_E$ is the equivalent impedance of the feedback circuit when its input voltage (the output voltage $E_O$) is reduced to 0 (short circuited). From the following equation, it may be seen that as the resistors $R_2$, $R_3$ and $R_4$ are selectively connected in parallel with the resistor $R_1$, the feedback signal $E_F$ is proportional to the sum of the admittances $$\frac{1}{R_1}, \frac{1}{R_2}, \frac{1}{R_3}, \frac{1}{R_4}, \frac{1}{R_5}, \text{ and } \frac{1}{R_6}$$

which remain in parallel since the equivalent output resistance $R_E$ remains substantially constant as the admittance of the paralleled resistors is selectively altered due to a low resistance of $R_5$ and $R_6$ in parallel (about 100 ohms) relative to the resistances of the resistors $R_1$ to $R_4$ (ranging from 10K to 2.5K ohms), thereby selecting a loop gain for the analog amplifier.

A group of feedback capacitors $C_2$, $C_3$ and $C_4$ are provided for the feedback circuit of the operational amplifier 309 to be connected in parallel with the feedback capacitor $C_1$ in response to the respective energization of relays K14 and K13 and K12. Each capacitor $C_2$, $C_3$ and $C_4$ is operatively associated with the respective resistors $R_2$, $R_3$ and $R_4$ in such a manner that for each combination of the resistors $R_1$, $R_2$, $R_3$ and $R_4$ connected in parallel, a corresponding combination of the capacitors $C_1$, $C_2$, $C_3$ and $C_4$ connected in parallel is provided in the feedback circuit of the operational amplifier in order that the sum of the particular capacitances $C_1$ to $C_4$ connected in parallel is always maintained directly proportional to the sum of the admittances of the particular resistors $R_1$ to $R_4$ connected in parallel. That is accomplished to maintain the gain-crossover frequency of the analog amplifier constant as the loop gain is selectively altered because, since the analog amplifier includes a modulated carrier-type amplifier, the frequencies of input signals must be restricted to a range considerably below the carrier frequency. Accordingly, as the feedback signal $E_F$ is increased in amplitude by connecting resistors $R_2$, $R_3$ and $R_4$ in parallel with the resistor $R_1$, thereby decreasing the analog amplifier loop gain, the high-frequency components of the feedback signal $E_F$ must be suppressed. That is accomplished by designing the analog amplifier to have a gain-crossover frequency well below the carrier frequency of 375 c.p.s. and providing the compensating capacitors $C_2$ to $C_4$ so that as the feedback signal is selectively increased in amplitude, the corner frequency (which is defined as that frequency at which the feedback factor is 70.7 percent of its maximum) is automatically lowered sufficiently to allow the negative-slope portion of the frequency response curve of the amplifiers 306 and 309 in cascade to coincide with the designed frequency response curve of the analog amplifier with all the relays K12 to K14 de-energized.

The capacitor $C_5$ alternately switched by a relay K15 from a parallel connection with the resistors $R_5$ and $R_6$ to a parallel connection with the capacitor $C_6$ functions as a D.C. transformer to isolate the output of the operational amplifier from the input of the D.C. amplifier. The capacitor $C_5$ is charged by a negative feedback signal when in the position shown and discharged into the capacitor $C_6$ when switched to the other position. The capacitor $C_6$ functions as a storage capacitor which discharges through the resistors $R_8$ and $R_9$ to provide the actual feedback signal for the analog amplifier at an amplitude determined by the voltage-dividing ratio between the resistors $R_8$ and $R_9$. In a preferred embodiment of the invention, the resistors $R_8$ and $R_9$ are selected to have resistance values of 450K and 50K ohms, respectively.

Since the attenuator provides four attenuation values and the analog amplifier provides four gain values, sixteen attenuation and gain combinations are provided. The design of the analog signal conditioning channel provides a full-scale output signal at the terminal 303 of the analog amplifier of 10.23 volts for all ranges, but the attenuation and gain combinations are programmed with the assumption that ten volts constitutes a full scale with the resulting tolerance or safety factor of .23 volt. The following table shows the sixteen full-scale ranges of analog signals and the sixteen attenuation and gain combinations required to provide the sixteen full-scale ranges.

| Code in $SC_{15}$ to $SC_{18}$ | Attenuation | Gain | Volts (d-c) Input | |
|---|---|---|---|---|
| | | | For 1,000 Counts Output | For Maximum Output |
| 0000 | 3,200:1 | 125 | 256 v. | 261.0 v. |
| 0001 | 3,200:1 | 250 | 128 v. | 130.9 v. |
| 0010 | 3,200:1 | 500 | 64 v. | 65.47 v. |
| 0011 | 3,200:1 | 1,000 | 32 v. | 32.74 v. |
| 0100 | 200:1 | 125 | 16 v. | 16.37 v. |
| 0101 | 200:1 | 250 | 8 v. | 8.184 v. |
| 0110 | 200:1 | 500 | 4 v. | 4.092 v. |
| 0111 | 200:1 | 1,000 | 2 v. | 2.046 v. |
| 1000 | 12.5:1 | 125 | 1 v. | 1.023 v. |
| 1001 | 12.5:1 | 250 | 500 mv. | 511.5 mv. |
| 1010 | 12.5:1 | 500 | 250 mv. | 255.75 mv. |
| 1011 | 12.5:1 | 1,000 | 125 mv. | 127.875 mv. |
| 1100 | 1:1 | 125 | 80 mv. | 81.84 mv. |
| 1101 | 1:1 | 250 | 40 mv. | 40.92 mv. |
| 1110 | 1:1 | 500 | 20 mv. | 20.46 mv. |
| 1111 | 1:1 | 1,000 | 10 mv. | 10.23 mv. |

The first column of the table shows the binary configuration of the digital signals in positions $SC_{15}$ to $SC_{18}$ of a CVT instruction in the SC-register. The second column shows the attenuation provided by the different configurations, the attenuation being controlled by the binary configuration of the digital signals in positions $SC_{15}$ and $SC_{16}$. The third column shows the gain values provided by the binary configuration of the digital signals in positions $SC_{17}$ and $SC_{18}$. The gain value is to be interpreted as the minimum gain 125, 250, 500 and 1,000 for 80, 40, 20 and 10 millivolts full scale, respectively. The output signal of the analog amplifier is applied to the analog-to-digital converter illustrated in FIG. 33 to provide a binary number having the same value as the analog signal. The fourth column of the foregoing table shows the voltage input to the analog-to-digital converter required to provide a full-scale binary number having a value of 1,000 for the different attenuation and gain combinations. The last column illustrates the maximum analog voltage signal which may be converted by the analog-to-digital converter.

*Analog-to-Digital conversion.*—A comparator amplifier CA200 of the analog-to-digital converter illustrated in FIG. 33 has an input terminal connected to the output terminal 303 of the analog amplifier (FIG. 29) and a second input terminal connected to a digital-to-analog converter 380 having current switches driven by flip-flops $CV_{10}$ to $CV_{19}$. During the process of converting an analog signal to binary-coded digital signals, a binary configuration of digital signals stored in the flip-flops $CV_{10}$ to $CV_{19}$ is altered until the output of the digital-to-analog converter provides an analog signal which is equal to the input analog signal at the terminal 303. The comparator amplifier CA200 normally provides a +6-volt signal at an output terminal 200 but provides a 0-volt signal when the signal from the digital-to-analog converter exceeds the input analog signal at the terminal 303 in absolute magnitude. The comparator amplifier and its operation is described hereinbefore with reference to FIG. 13 and the digital-to-analog converter and its operation is described hereinbefore with reference to FIG. 10.

The analog-to-digital converter transforms a negative analog input signal at terminal 303 with a predetermined full scale of 10 volts to a group of digital signals comprising a binary number having a value equivalent to that of the input signal. However, it should be noted that the configuration of the digital signals stored in flip-flops $CV_{10}$ to $CV_{19}$ is the binary equivalent of the analog voltage at the terminal 303 which is the output terminal of the analog amplifier, and not the analog voltage signal at the input terminals 301 and 302 of the analog signal-conditioning channel (FIG. 29). In order to obtain the true value of the analog voltage signal from the transducer, the binary number in the flip-flops $CV_{10}$ to $CV_{19}$ must be multiplied by the attenuation and gain values of the signal-conditioning channel. That is accomplished in the digital computer after the group of digital signals in the flip-flops $CV_{10}$ to $CV_{19}$ are transferred to the A-register of the digital computer in response to an RCV instruction as described hereinbefore with reference to FIGS. 1 and 2 and in more detail with reference to FIG. 19. The flip-flops $CV_{10}$ to $CV_{19}$ may store a binary number having a value as great as 1,023 since together they provide ten binary digit positions for a maximum binary number of 1111111111 which corresponds to an analog amplifier output signal at the terminal 303 of 10.23 volts.

The analog-to-digital converter illustrated in FIG. 33 is one of several different types which may be employed. The particular type illustrated may be referred to as the successive-approximation type because the process of converting an analog signal to a binary number begins by first placing a binary number in the flip-flops $CV_{10}$ to $CV_{19}$ equal to 512 by inserting a bit 1 in the flip-flop $CV_{10}$ after all of the flip-flops are first reset. The digital-to-analog converter 380 immediately converts the binary number equal to 512 into an analog signal which is compared with the analog signal at the terminal 303. If the output of the digital-to-analog converter exceeds the analog input, the output terminal 200 provides a 0-volt signal which is inverted to a +6-volt signal by an inverter I216 to allow the flip-flop $CV_{10}$ to be reset. Otherwise, the output terminal 200 remains at +6 volts and the flip-flop $CV_{10}$ remains set. The setting and resetting of the flip-flop $CV_{10}$ is controlled by the C-register comprising flip-flops $C_9$ to $C_{20}$.

The next step consists of adding 256 to the number stored in the flip-flops $CV_{10}$ to $CV_{19}$ by inserting a bit 1 in the flip-flop $CV_{11}$. The new number, then equal to either 768 or 256, depending upon whether the flip-flop $CV_{10}$ remained set or was reset in the preceding step, is converted to an analog signal and compared as before. If the converted signal exceeds the input analog signal, the flip-flop $CV_{11}$ is reset; otherwise, the flip-flop $CV_{11}$ remains set. In the remaining eight steps, a bit 1 is similarly inserted into the remaining flip-flops $CV_{12}$ to $CV_{19}$ in succession each time adding to the binary number stored a number having a value depending on the binary order of the flip-flop being operated upon during a given step and subsequently subtracting that number by resetting the flip-flop if the sum exceeds in value the analog input signal at the terminal 303. In that manner, conversion of an analog signal to a group of binary-coded digital signals is accomplished in a predetermined number of steps, the number being determined solely by the number of orders in the group of digital signals into which the analog signal is being converted.

As just noted, the C-register is provided to sequence the ten steps necessary to convert an analog signal to a group of binary-coded digital signals. Before the first of the ten steps is taken, a bit 1 is entered into the flip-flop $C_9$ and a flip-flop F23 is set in response to a 0-volt signal at the terminal 247 connected to the AND-gate G247 (FIG. 20b) which is controlled by the stage $OD_6$ of the operational-sequence-control section. As described hereinbefore, the flip-flop $OD_6$ is set to initiate the analog-to-digital converting process. The set flip-flop F23 enables an AND-gate G204 (FIG. 33) to translate $T_{23}'$ pulses derived from the flip-flop $T_{23}$ of the counter illustrated in FIG. 22 to shift the bit 1 entered into the flip-flop $C_9$ successively through the remaining stages of the C-register until the last stage flip-flop $C_{20}$ is set, at which time the flip-flop F23 is reset and analog-to-digital conversion is complete.

The first $T_{23}'$ pulse shifts the bit 1 in the flip-flop $C_9$ to the flip-flop $C_{10}$. The false output terminal of the flip-flop $C_{10}$ provides a positive-going (0 to +6 volts) signal to the set trigger input terminal of the flip-flop $CV_{10}$ which is enabled by a +6-volt signal continuously distributed by a line 381, thereby inserting a bit 1 in the flip-flop $CV_{10}$. Immediately upon being set, the flip-flop $CV_{10}$ actuates a current switch in the digital-to-analog converter to provide an analog signal to the comparator amplifier CA200 having a value of 512. If that signal exceeds the input analog signal at the terminal 303, the flip-flop $CV_{10}$ is immediately reset; otherwise, it remains set. However, it should be noted that the flip-flop $CV_{10}$ is not reset in response to the output of the comparator amplifier until the second $T_{23}'$ pulse transfers the bit 1 in the C-register in the flip-flop $C_{10}$ to the flip-flop $C_{11}$, at which time the false output terminal of the flip-flop $C_{11}$ goes to +6 volts to trigger the flip-flop $CV_{10}$ to its reset state if the output of the inverter I216 is at +6 volts while at the same time triggering the flip-flop $CV_{11}$ to its set state.

Upon the occurrence of the third consecutive $T_{23}'$ pulse the bit 1 in the flip-flop $C_{11}$ of the C-register is transferred to the flip-flop $C_{12}$ so that the signal at its false output terminal increases from 0 to +6 volts. That positive-going signal triggers the flip-flop $CV_{12}$ into the set state through the enabled set steering circuit and triggers the flip-flop $C_{11}$ into the reset state through its reset steering circuit if enabled by a +6-volt signal from the output of the inverter I216.

The same step is repeated until the bit 1 in the C-register is transferred to the flip-flop $C_{19}$ to set the flip-flop $CV_{19}$ and reset the flip-flop $CV_{18}$ if the digital-to-analog converter output exceeds the analog input. Thereafter, an additional $T_{23}'$ pulse shifts the bit 1 from the flip-flop $C_{19}$ into the flip-flop $C_{20}$ to reset the flip-flop F23, disable the AND-gate G204 and also reset the flip-flop $CV_{19}$ if the digital-to-analog converter output exceeds the analog input at the terminal 303. In addition, an AND-gate G205 is enabled when the flip-flop $C_{20}$ is set to transmit a $\phi A'$ signal through an inverter I250 to the AND-gate G248 (FIG. 20b) in the operation-sequence-control section to set the OC flip-flop and thereby signal to the computer that the analog-to-digital conversion has been completed. Thereafter, a BOC control to branch when the operation is complete detects the presence of an OC' signal from the flip-flop OC and enables the digital computer to execute an RCV instruction to read the content of the CV-registers into the A-register in parallel as described hereinbefore with reference to FIG. 1 and in more detail with reference to FIG. 19.

If desired, the analog-to-digital conversion may be tested for an overflow by testing for a +6-volt signal at the output terminal 200 of the comparator amplifier after conversion is complete. That may be accomplished by providing a BCO instruction to branch if the converter overflowed following a BOC instruction. The BCO instruction provides a BCO' command signal to the branch decision section 17 (FIG. 1) to initiate a test for the presence of a +6-volt signal at the output terminal 200 of the comparator amplifier. If the analog-to-digital converter overflowed in that a bit 1 was entered in every flip-flop $CV_{10}$ to $CV_{19}$ and the analog input signal still exceeds the signal from the digital-to-analog signal, the BCO instruction introduces an alternative sequence of instructions to correct the overflow as by executing another CVT instruction for the same analog signal source but with greater attenuation specified in the signal-conditioning channel.

The group of digital signals which represent the value of an analog signal remain stored in the flip-flops $CV_{10}$ to $CV_{19}$ until execution of a new CVT instruction causes the AND-gate G246 (FIG. 20b) to provide a 0-volt signal at the terminal 246 connected to an OR-gate G206 or until a CVT instruction which includes a bit 1 in position $SC_{14}$ is executed to cause the AND-gate G237 (FIG. 28) to provide a 0-volt signal at the input terminal OCD to which the OR-gate G206 is connected. A 0-volt signal at an input terminal of the OR-gate G206 is translated through a group of inverters, such as the inverter I218, to reset input terminals of the flip-flops $CV_{10}$ to $CV_{19}$. Another group of inverters, such as the inverter I219, serially transmits a 0-volt signal to the reset input terminals of the C-register.

*Distributing digital-to-analog converters.*—Digital-to-analog converters employed to distribute analog signals to load or control devices are illustrated in FIG. 34, as noted hereinbefore. The digital computer provides the group of digital signals to be converted to an analog signal by a selected one of a group of digital-to-analog converters, such as the digital-to-analog converters DA201 to DA203. That is accomplished by first transferring a group of digital signals to the A-register in response to LDA instructions, as described hereinbefore with reference to FIG. 1. The group of digital signals is then transferred to the C-register (FIG. 33) in response to an LCA instruction which, upon being decoded, provides an LCA' signal from the instruction decoder 13 illustrated (FIG. 1) to an AND-gate G201 and an AND-gate G202 (FIG. 33). The first $L_0'$ pulse to occur thereafter is translated by the AND-gate G201 through the OR-gate G206 and two groups of inverters such as the inverter I218 and I219 to reset both the group of flip-flops $CV_{10}$ to $CV_{19}$ and the C-register. The reason for resetting the group of flip-flops $CV_{10}$ to $CV_{19}$ when a group of digital signals is transferred into the C-register from the A-register of the digital computer is that upon transferring a group of digital signals into the C-register, the false output terminal of those flip-flops receiving a bit 1 provides a positive-going (0 to +6 volts) signal to the trigger input terminal of the set steering circuit of the corresponding ones of the group of flip-flops $CV_{10}$ to $CV_{19}$ to thereby set each one of those flip-flops not previously set since a +6-volt signal is continuously provided to the set steering input terminals by a line 381. The next $L_{12}'$ pulse is translated by the enabled AND-gate G202 through a pair of inverters I220 and I221 to a group of AND-gates G210 to G219 to transfer the group of digital signals from the flip-flops $A_{10}$ to $A_{19}$ of the A-register into the flip-flops $C_{10}$ to $C_{19}$ of the C-register.

The C-register functions as a buffer register for a group of digital signals to be transferred into a selected digital-to-analog converter. When the digital-to-analog converter has been selected in the manner described hereinbefore, and the group of digital signals in the flip-flops $C_{10}$ to $C_{19}$ of the C-register transferred thereto in response to +6-volt signals at terminals 304 and 305 from the subcontrol translator (FIG. 27) an analog signal is provided to the load or control device specified. The C-register is not cleared again until another CVT instruction is executed or until another CTL instruction is executed to transfer a group of digital signals to a specified digital-to-analog converter in the same manner.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. In an electronic information handling system for selectively scanning a number of variables the values of which are manifested by analog signals, the combination comprising:

a plurality of analog signal sources providing analog signals the amplitudes of which are functions of the respective ones of said variables;

a stored-program digital computer having a memory section for storing instructions and an instruction register for controlling the operation of said digital computer;

an external instruction storage register independent of said digital computer for storing an instruction to scan the analog condition of a specified variable and to transfer its value in digital form to said computer;

transfer means for transferring an instruction to said external instruction storage register, said instruction having an address portion specifying the variable to be scanned whereby scanning the analog condition of a specified variable and transferring its value in digital form to said digital computer may be controlled in accordance with the instruction in said external instruction storage register;

an analog-to-digital converting means for amplifying an analog signal to a predetermined full-scale signal and for converting the amplified signal into digital form;

addressing means coupled to said external instruction storage register and responsive to the address portion of said instruction transferred thereinto for selectively coupling the analog signal source of said specified variable to said analog-to-digital converting means; and a means coupled to said storage register and responsive to said instruction for transferring a group of digital signals representative of the value of said specified variable from said analog-to-digital converting means to said digital computer.

2. In an electronic information handling system for selectively scanning the analog condition of a number of variables manifested by analog signals having amplitudes which may vary within different ones of a number of distinct full-scale ranges, the combination comprising:

a plurality of analog signal sources providing analog signals the amplitudes of which are functions of the respective ones of said variables;

a stored-program digital computer having a memory section for storing instructions and an instruction register for controlling the operation of said digital computer;

an external instruction storage register independent of said digital computer for storing an instruction to scan the analog condition of a specified variable and to transfer its scaled value in digital form to said computer;

transfer means for transferring instruction to said external instruction storage register, said instruction having an address portion specifying the variable to be scanned and an operation portion specifying the manner in which the analog signal manifesting the variable condition to be scanned is to be scaled both with respect to amplitude and polarity, whereby scanning the analog condition of a specified variable in transferring its scaled absolute value in digital form to said digital computer may be controlled in accordance with the instruction in said storage register;

an analog signal conditioning means for scaling the analog signal manifesting the condition of the variable specified by the address portion of said instruction and for providing a scaled absolute value thereof;

addressing means coupled to such external instruction storage register and responsive to the address portion of said instruction transferred thereinto for selectively coupling the analog signal source of said specified variable to said analog signal conditioning means;

operation control means coupled to said external instruction storage register and responsive to the operation portion of said instruction transferred thereinto for selecting the gain of said analog signal conditioning means and for selectively inverting the analog signal therein in accord with the operation portion of said instruction, whereby the scale and polarity is controlled by the operation portion of said instruction to provide a scaled absolute value manifesting the condition of said specified variable;

an analog-to-digital converting means for converting the signal output from said analog signal conditioning means for converting the scaled signal representing an absolute value into digital form; and a means for transferring a group of digital signals representative of the value of said specified variable from said analog-to-digital converting means to said digital computer.

3. In an electronic information handling system for selectively scanning a plurality of primary measuring devices associated with variables the values of which differ within a range of values, said devices producing output signals the magnitudes of which are functions of the values of the associated variables on different scales, the combination comprising:

a stored-program digital computer having a memory section for storing instructions some of which are employed to selectively scan said measuring devices, a given instruction to scan a specified measuring device including an address portion to specify the measuring device and an operation portion to specify the manner in which an output signal from the measuring device specified is to be conditioned to provide a predetermined full-scale output signal and an instruction register for controlling the operation of said digital computer;

an external instruction storage register for storing said given instruction to scan a specified measuring device;

transfer means for transferring to said external instruction storage register said given instruction having an address portion and operation portion;

signal-conditioning means coupled to said external instruction storage register and responsive to the operation portion of said external instruction transferred thereinto for selectively conditioning an analog signal coupled thereto with respect to amplitude to provide a predetermined full-scale output signal at an output terminal thereof; and addressing means coupled to said external instruction storage register and responsive to the address portion of said instruction transferred thereinto for selectively coupling the measuring device specified to said analog signal conditioning means.

4. In an electronic information handling system for selectively scanning a plurality of primary measuring devices associated with variables the values of which differ within a range of values, said devices producing output signals the magnitudes of which are functions of the values of the associated variables on different scales and for converting an analog signal from a device scanned into digital form, the combination comprising:

a stored-program digital computer having a memory section for storing instructions some of which are employed to selectively scan said measuring devices, a given instruction to scan a specified measuring device including an address portion to specify a measuring device, an operation portion to specify the manner in which an output signal from the measuring device specified is to be conditioned to provide a predetermined full-scale output signal, and an additional portion to specify whether the current instruction is the same as its preceding instruction, said digital computer including an instruction register for controlling the operation of said digital computer;

an external instruction storage register independent of said digital computer for storing said given instruction to scan a specified measuring device;

transfer means for transferring to said external instruction storage register said given instruction having an address portion, an operation portion and an additional portion;

signal-conditioning means coupled to said external instruction storage register and responsive to the operation portion of said instruction transferred thereinto for selectively conditioning an analog signal coupled thereto with respect to amplitude to provide a predetermined full-scale output signal at an output terminal thereof;

addressing means coupled to said external instruction storage register and responsive to the address portion of said instruction transferred thereinto for selectively coupling a measuring device specified to said analog signal conditioning means;

an analog-to-digital converter coupled to said output terminal of said analog signal conditioning means for converting a conditioned analog signal to a group of digital signals representing a number the value of which is proportional to the conditioned analog signal amplitude;

an operation-sequence-control means coupled to said external instruction storage register and responsive to the transfer of an instruction thereinto for initiating the generation of sequence-control signals to said addressing means, signal-conditioning means and analog-to-digital converter to control the operations of scanning, conditioning and converting to digital form an analog signal; and means coupled to said external instruction storage register and responsive to the additional portion of said instruction transferred thereinto for altering the mode of operation of said operation-sequence-control means to clear the analog-to-digital converter and initiate the operation of converting to digital form a conditioned analog signal when the additional portion of said instruction specifies that the current instruction is the same as the preceding instruction and to clear the addressing means, the signal-conditioning means and the analog-to-digital converter before initiating the operations of selecting, conditioning and converting to digital form an analog signal if the additional portion specifies that the current instruction is not the same as the preceding instruction.

5. In an electronic information handling system for selectively scanning a plurality of primary measuring devices associated with variables the values of which differ within a range of values, said devices producing output signals the magnitudes of which are functions of the values of the associated variables on different scales, the combination as defined in claim 4 wherein said signal-conditioning means includes means for conditioning an analog signal coupled thereto with respect to polarity to provide a predetermined full-scale output signal of a predetermined polarity at an output terminal thereof.

6. In an industrial process control system, the combination for coupling a selected one of a plurality of voltage sources to a specified one of a plurality of control devices under programmed control comprising:
- a stored-program digital computer having a memory section for storing instructions and an internal instruction register for controlling the operation of said digital computer;
- an external instruction storage register independent of said digital computer for storing an instruction to couple a selected voltage source to a specified one of said control devices;
- transfer means for transferring an instruction to said external instruction storage register from said computer, said instruction having an address portion specifying the control device to which a selected voltage source is to be coupled and an operation portion specifying the voltage source;
- a plurality of control devices, different ones being adapted to be rendered operative by different ones of said voltage sources;
- addressing means connected to said external instruction storage register and responsive to the address portion of said instruction transferred thereinto for coupling the voltage source specified to a specified control device; and
- operation control means coupled to said external instruction storage register and responsive to the operation portion of said instruction transferred thereinto for selecting the voltage source to be coupled to said specified control device.

7. In a process control system as defined by claim 6 wherein said external instruction transferred to said storage register includes a delay-period portion specifying one of a plurality of different delay periods during which said selected voltage source is to be coupled to said control device, the combination including:
- a source of periodic pulses;
- counting means coupled to said source of periodic pulses for counting said periodic pulses;
- decoding means coupled to said external instruction storage register and responsive to the delay-period portion of said instruction transferred thereinto for determining the delay period specified;
- means coupled to said counting means and to said decoding means for producing a delay-complete signal at an output terminal when the sum of the periods between said periodic pulses counted by said counting means equals the delay period specified; and
- means coupled to said output terminal and responsive to said delay-complete signal thereat for disabling said addressing means, whereby the specified control device is uncoupled from the selected voltage source.

8. In a process control system as defined by claim 6 wherein said instruction transferred to said external instruction storage register includes a delay-period portion specifying one of a plurality of different delay periods during which said selected voltage source is to be coupled to said control device, the combination including:
- a periodic pulse generator;
- counting means coupled to said periodic pulse generator for counting periodic pulses generated thereby;
- a sequence control means connected to said transfer means and responsive to the transfer of an instruction to said external instruction storage register for enabling said operation control means, said addressing means and said periodic pulse generator to perform their respective functions, said periodic pulse generator being enabled to generate periodic pulses in substantial time coincidence with connection of a selected voltage source to a specified control device through said addressing means;
- decoding means coupled to said external instruction storage register and responsive to the delay-period portion of said instruction transferred thereinto for determining the delay period specified;
- means coupled to said counting means and to said decoding means for producing a delay complete signal at an output terminal when the sum of the periods between said periodic pulses counted by said counting means equals the delay period specified; and
- terminating means coupled to said output terminal and responsive to said delay complete signal thereat for disabling said addressing means, whereby the specified control device is uncoupled from the selected voltage source.

9. In a process control system as defined by claim 8 wherein one of said delay periods specified by said delay-period portion of an instruction in said external instruction storage register is an indefinite period, the combination including means coupled to said decoding means and to said terminating means for preventing said terminating means from being disabled when an indefinite delay period is specified until a new instruction is transferred into said external instruction storage register.

10. In an industrial process control system, the combination for coupling a selected one of a plurality of voltage sources to a selected one of a plurality of control devices under computer programmed control comprising:
- a stored-program digital computer having a memory section for storing instructions and an internal instruction register for controlling the operation of said digital computer;
- an external instruction storage register independent of said digital computer for storing an instruction to provide a selected voltage source to a specified one of said control devices;
- transfer means for transferring an instruction to said external instruction storage register from said computer, said instruction having an address portion specifying the control device to which a selected voltage source is to be coupled and an operation portion specifying the voltage source;
- a plurality of control devices, different ones being adapted to be rendered operative by different ones of said voltage sources;
- addressing means connected to said external instruction storage register and having an input terminal and a plurality of output terminals, said addressing means being responsive to the address portion of said instruction transferred into said external instruction storage register for coupling said input terminal to an output terminal connected to a specified control device; and
- an operation control means coupled to said external instruction storage register and having an output terminal connected to the input terminal of said addressing means, said operation control means being responsive to the operation portion of said instruction transferred into said storage register for selecting the voltage source to be coupled to said specified control device.

11. In a process control system as defined by claim 10 wherein said instruction transferred to said external instruction storage register includes a delay-period portion specifying one of a plurality of different delay periods during which said selected voltage source is to be coupled to said control device, the combination including:
- a source of periodic pulses;
- counting means coupled to said source of periodic pulses for counting said periodic pulses;
- decoding means coupled to said external instruction storage register and responsive to the delay period portion of said instruction transferred thereinto for determining the delay period specified;
- means coupled to said counting means and to said decoding means for producing a delay complete signal at an output terminal when the sum of the periods between said periodic pulses counted by said counting means equals the delay period specified; and
- means coupled to said output terminal and responsive to said delay complete signal thereat for disabling said addressing means, whereby the specified control device is uncoupled from the selected voltage source.

12. In an industrial process control system the combination for coupling a selected one of a plurality of voltage sources to a selected one of a plurality of control devices under computer programmed control comprising:
- a stored program digital computer having a memory section for storing instructions and an internal instruction register for controlling the operation of said digital computer;
- an external instruction storage register independent of said digital computer for storing an instruction to couple a selected voltage source to a specified one of said control devices;
- transfer means for transferring an instruction to said external instruction storage register from said computer, said instruction having an address portion specifying the control device to which a selected voltage source is to be coupled, an operation portion specifying the voltage source, and a delay-period portion specifying one of a plurality of different delay periods during which said selected voltage source is to be coupled to the specified control device;
- a plurality of control devices, different ones being adapted to be rendered operative by different ones of said voltage sources;
- means connected to said external instruction storage register and responsive to the address portion and the operation portion of said instruction transferred thereinto for coupling the voltage source specified to a specified control device;
- a periodic pulse generator;
- counting means coupled to said period pulse generator for counting periodic pulses generated thereby;
- a sequence control means connected to said transfer means and responsive to the transfer of an instruction to said external instruction storage register for enabling said selecting means and said periodic pulse generator to perform their respective functions, said periodic pulse generator being enabled to generate periodic pulses in substantial time coincidence with connection of a selected voltage source to a specified control device through said selecting means;
- decoding means coupled to said external instruction storage register and responsive to the delay-period portion of said instruction transferred thereinto for determining the delay period specified;
- means coupled to said counting means and to said decoding means for producing a delay-complete signal at an output terminal when the sum of the periods between the periodic pulses counted by said counting means equals the delay period specified; and
- means coupled to said output terminal and responsive to said delay-complete signal thereat for disabling said selecting means, whereby the specified control device is uncoupled from the selected voltage source.

13. In an industrial process control system, the combination for translating a group of digital signals from a storage register to a selected one of a plurality of digital-to-analog converters, thereby providing an analog control signal to a load device associated with the selected digital-to-analog converter under programmed control comprising:
- a stored-program digital computer having a memory section for storing instructions and an internal instruction register for controlling the operation of said digital computer;
- an external instruction storage register independent of said digital computer for storing an instruction to translate a group of digital signals from said storage register to a selected one of said digital-to-analog converters;
- transfer means for transferring an instruction to said external instruction storage register from said computer, said instruction specifying the digital-to-analog converter to which a group of digital signals is to be translated;
- a plurality of gating means, one gating means for each digital-to-analog converter, for coupling said register to each digital-to-analog converter, each gating means having a gating input terminal for receiving a gating signal, whereby a gating signal applied to the gating input terminal of a selected gating means actuates it to translate said group of digital signals to the digital-to-analog converter coupled thereto; and
- addressing means connected to said external instruction storage register and responsive to the instruction transferred thereinto for transmitting a gating signal to a specified one of said gating means.

14. In an industrial process control system, the combination for translating a group of digital signals from a storage register to a selected one of a plurality of digital-to-analog converters as defined in claim 13, the combination further comprising:
- a sequence control means connected to said transfer means and responsive to the transfer of an instruction to said external instruction storage register for enabling said addressing means; and
- means connected to said sequence control means for enabling said plurality of gating means to be responsive to a gating signal.

15. In an electronic information handling system for performing two types of operations, the first type being employed for selectively scanning analog signal sources and the second type being employed for selectively distributing control signals to load devices, the combination comprising:
- a plurality of analog signal sources;
- a plurality of distinct voltage signal sources;
- a plurality of load devices, different ones being adapted to be energized by different distinct voltage signals;
- a stored-program digital computer having a memory section for storing instructions and an internal instruction register for controlling the operation of said digital computer;
- an external instruction storage register independent of said digital computer for storing an instruction, said instruction having a command portion specifying one of said two types of operations, an address portion specifying the analog signal source to be scanned for an operation of the first type and specifying the load device to which a voltage signal is to be applied for an operation of the second type and an operation portion specifying the manner in which an analog signal scanned is to be conditioned in an operation of the first type and specifying one of said plurality of distinct voltage signal sources to be coupled to a specified load device for an operation of the second type;

transfer means for transferring an instruction from said memory section to said external instruction storage register;

an analog signal conditioning means including an analog-to-digital converter for amplifying an analog signal to a predetermined full scale and for converting the amplified signal into digital form;

a time-shared addressing means coupled to said external instruction storage register and responsive to the address portion of an instruction transferred thereinto for selectively coupling a specified analog signal source to said analog signal conditioning means for an operation of the first type and for coupling a specified load device to a voltage signal source for an operation of the second type; and operation control means coupled to said external instruction storage register and responsive to the command portion and the operation portion of an instruction transferred thereinto for controlling said signal-conditioning means for an operation of the first type and for selecting one of said plurality of distinct voltage signal sources to be coupled to a specified load device for an operation of the second type.

16. In an electronic information handling system, the combination as defined in claim 15 wherein predetermined ones of said load devices are digital-to-analog converters selectively enabled to receive coded groups of digital signals for conversion to analog signals to drive associated loads, the combination including:

a means for storing a coded group of digital signals connected in parallel to each of said predetermined ones of said load devices which are digital-to-analog converters, each digital-to-analog converter being adapted to receive a group of digital signals from said means in response to a voltage signal selectively applied thereto by an instruction specifying an operation of the second type, whereby an operation of the second type may be employed to selectively distribute a group of digital signals to a specified digital-to-analog converter to drive an associated load.

References Cited by the Examiner

UNITED STATES PATENTS

| 2,932,471 | 4/1960 | Exner et al. | 235—150 |
| 3,034,101 | 5/1962 | Loewe | 235—151 |
| 3,034,718 | 5/1962 | Freitas et al. | 235—154 X |
| 3,034,719 | 5/1962 | Anfenger et al. | 235—150 |
| 3,142,820 | 7/1964 | Daniels | 340—172.5 |

OTHER REFERENCES

Korn and Korn: "Electronic Analog Computers," McGraw-Hill, pp. 226–227, 1952.

McKnight and Adamson: "Multichannel Analog Input-Output Conversion System for a Digital Computer," I.R.E. Convention Record, part 7, 1953, pp. 2 to 5.

E. C. Nelson: "A Digital Computer for Airborne Applications," I.R.E. Transactions on Electronic Computers, pp. 2 to 4, December 1952.

ROBERT C. BAILEY, *Primary Examiner.*

MALCOLM A. MORRISON, *Examiner.*

B. D. REIN, P. L. BERGER, *Assistant Examiners.*